(12) United States Patent
Li et al.

(10) Patent No.: US 12,155,541 B2
(45) Date of Patent: Nov. 26, 2024

(54) DATA SAMPLE TEMPLATE (DST) MANAGEMENT FOR ENABLING FOG-BASED DATA PROCESSING

(71) Applicant: CONVIDA WIRELESS, LLC, Wilmington, DE (US)

(72) Inventors: Xu Li, Plainsboro, NJ (US); Chonggang Wang, Princeton, NJ (US); Quang Ly, North Wales, PA (US); Lu Liu, Conshohocken, PA (US)

(73) Assignee: Convida Wireless, LLC, Wilmington, DE (US)

( * ) Notice: Subject to any disclaimer, the term of this patent is extended or adjusted under 35 U.S.C. 154(b) by 152 days.

(21) Appl. No.: 17/271,626

(22) PCT Filed: Aug. 21, 2019

(86) PCT No.: PCT/US2019/047442
§ 371 (c)(1),
(2) Date: Feb. 26, 2021

(87) PCT Pub. No.: WO2020/046667
PCT Pub. Date: Mar. 5, 2020

(65) Prior Publication Data
US 2021/0336862 A1 Oct. 28, 2021

Related U.S. Application Data

(60) Provisional application No. 62/723,219, filed on Aug. 27, 2018, provisional application No. 62/754,872, filed on Nov. 2, 2018.

(51) Int. Cl.
*H04L 43/022* (2022.01)
*H04L 12/28* (2006.01)
(Continued)

(52) U.S. Cl.
CPC ........ *H04L 43/022* (2013.01); *H04L 12/2823* (2013.01); *H04L 43/04* (2013.01);
(Continued)

(58) Field of Classification Search
CPC ............... H04L 12/2823; H04L 43/022; H04L 43/04; H04L 67/10; H04L 67/12; H04L 67/125;
(Continued)

(56) References Cited

U.S. PATENT DOCUMENTS 7,428,699 B1 9/2008 Kane et al.
10,031,500 B1 7/2018 Diaz et al.
(Continued)

FOREIGN PATENT DOCUMENTS

CN 104950837 A 9/2015
CN 108353034 A 7/2018
(Continued)

OTHER PUBLICATIONS

Mukherjee et al. "Survey of Fog Computing: Fundamental, Network Applications, and Research Challenges", IEEE Comm'ns Survey and Tutorials, vol. 20, Issue 3, pp. 1826-1857, Mar. 12, 2018 [retrieved on Aug. 20, 2022]. Retrieved from the Internet: <URL: https://ieeexplore.ieee.org/document/8314121>. (Year: 2018).*
(Continued)

*Primary Examiner* — Thomas J Dailey
(74) *Attorney, Agent, or Firm* — BakerHostetler

(57) ABSTRACT

A Data Sample Collection Service (DSCS) may be configured to receive various data sample collection requests from users and to process the one or more requests on behalf of the users. In order to properly describe what kind of Ready-to-Use Data Samples (RDS) a user needs, the DSCS may adopt a Data Sample Template (DST). By using the DST, the user can clearly depict what their desired data samples look like, along with various quality requirements regarding the (Continued)

data samples. The DSCS can further provide a DST Management function to users. In general, DST management involves the processes of DST creation, DST update, DST deletion and DST activation/de-activation. For example, a user may create a DST based on its data sample collection needs. Later, the created DST can also be updated and/or deleted based on dynamic changes to the needs of the user.

14 Claims, 29 Drawing Sheets

(51) Int. Cl.
```
H04L 43/04      (2022.01)
H04L 67/10      (2022.01)
H04L 67/12      (2022.01)
H04L 67/125     (2022.01)
H04L 67/289     (2022.01)
H04L 67/51      (2022.01)
H04L 67/62      (2022.01)
H04W 4/38       (2018.01)
H04W 4/70       (2018.01)
```
(52) U.S. Cl.
CPC .............. *H04L 67/10* (2013.01); *H04L 67/12* (2013.01); *H04L 67/125* (2013.01); *H04L 67/289* (2013.01); *H04L 67/51* (2022.05); *H04W 4/38* (2018.02); *H04W 4/70* (2018.02); *H04L 67/62* (2022.05); *Y04S 40/00* (2013.01); *Y04S 40/18* (2018.05)

(58) Field of Classification Search
CPC ....... H04L 67/289; H04L 67/51; H04L 67/62; H04W 4/38; H04W 4/70; Y04S 40/00; Y04S 40/18
See application file for complete search history.

(56) References Cited

U.S. PATENT DOCUMENTS

| | | | |
|---|---|---|---|
| 2014/0222813 A1* | 8/2014 | Yang | G06F 16/95 707/736 |
| 2014/0365517 A1 | 12/2014 | Calo et al. | |
| 2015/0281319 A1 | 10/2015 | Maturana et al. | |
| 2015/0332010 A1* | 11/2015 | Olson | G16H 10/60 705/2 |
| 2017/0006141 A1* | 1/2017 | Bhadra | H04W 4/70 |
| 2017/0060574 A1* | 3/2017 | Malladi | G06F 9/542 |
| 2017/0200240 A1 | 7/2017 | Marinelli et al. | |
| 2018/0220279 A1* | 8/2018 | Jung | H04L 67/12 |
| 2019/0349253 A1* | 11/2019 | Zhang | H04L 67/125 |
| 2019/0369984 A1 | 12/2019 | Malladi et al. | |

FOREIGN PATENT DOCUMENTS

| | | | |
|---|---|---|---|
| JP | 2016-528583 A | 9/2016 | |
| JP | 2018-010421 A | 1/2018 | |
| KR | 10-2018-0067502 A | 6/2018 | |
| WO | 2017/189527 A1 | 11/2017 | |

OTHER PUBLICATIONS

Hu et al. "Survey on fog computing: architecture, key technologies, applications and open issues", Journal of Network and Computer Applications, vol. 98, pp. 27-42, Nov. 15, 2017. (Year: 2017).*

Zou et al., D3W: Towards Self-Management of Distributed Data-Driven Workflows with QoS Guarantees, 2016 IEEE 9th International Conference on Cloud Computing (Cloud), IEEE, pp. 148-155, (Jun. 27, 2016).

* cited by examiner

Data Sample Template (DST) Creation Panel

Please input the following parameters for your DST:

a. Interested_Area b. Data_Sample_Frequency c. RDS_Production_Schedule d. RDS_Context Please input the following parameters for your first Data Element (DE):

a. Raw_Data_Type b. Data_Processing_Operation c. Customized_Processing_Details d. QoS_Requirements If you want to add more DEs, please click this button: [Add more DEs]

[Submit]

FIG. 17

DS Identification and RDS Production Monitoring Panel

Please indicate which Local Fog Area you want to check:

Please select which type of roles you intend to monitor:

a. ☐ Data Source Discover (DSD)

b. ☐ Raw Data Collector (RDC)

c. ☐ Raw Data Processor (RDP)

If you want to see a full-list of registered capabilities of a specific Local Fog Node (LFN), please input the ID of this LFN:

[ Submit ]

FIG. 25

DATA SAMPLE TEMPLATE (DST) MANAGEMENT FOR ENABLING FOG-BASED DATA PROCESSING

CROSS-REFERENCE TO RELATED APPLICATIONS

This application is the National Stage of International Patent Application No. PCT/US2019/047442, filed Aug. 21, 2019, which claims the benefit of U.S. Provisional Application No. 62/723,219, filed Aug. 27, 2018 and U.S. Provisional Application No. 62/754,872, filed Nov. 2, 2018, the disclosures of which are incorporated herein by reference in their entireties.

BACKGROUND

In recent years, the amount of data in our world has been exploding in various fields. For example, a web search engine may process hundreds of Petabytes (PBs) of searching data and a social network application may generate over 10 PBs of log data per month. As a result of the explosive global data, the term "big data" has been coined to describe enormous datasets. Compared with traditional datasets, big data typically includes massive unstructured data which needs to be analyzed in order to gain an in-depth insight from this data, such as how to discover potential buys from customers' shopping history records.

SUMMARY

Methods and systems are disclosed for implementing a Data Sample Collection Service (DSCS). The DSCS may be configured to receive various data sample collection requests from users and to process the one or more requests on behalf of the users. In order to properly describe what kind of Ready-to-Use Data Samples (RDS) a user needs, the DSCS may adopt a Data Sample Template (DST). By using the DST, the user can clearly depict what their desired data samples look like, along with various quality requirements regarding the data samples.

The DSCS can further provide a DST Management function to users. In general, DST management involves the processes of DST creation, DST update, DST deletion and DST activation/de-activation. For example, a user may create a DST based on its data sample collection needs. Later, the created DST can also be updated and/or deleted based on dynamic changes to the needs of the user. The changes made on a DST may also lead to the changes on the corresponding data samples of the corresponding DST.

Methods and systems are further disclosed for collaborative data source (DS) identification and ready to use data sample (RDS) production for a fog-based Service Layer (SL). During a collaborative DS identification procedure, for each of the data elements (DEs) in a RDS corresponding to a data sample collection request (DSCR), there could be thousands of potential DSs in a local fog area (LFA) that need to be discovered and/or evaluated to determine whether they are the desired DSs for serving this DSCR. Different Local Fog Nodes (LFNs) in a LFA that can act as Data Source Discovers (DSDs) may have different DS identification and discovery capabilities. Accordingly, methods and systems are provided that allow multiple LFNs (as DSDs) in one or more LFAs to collaboratively work together in order to identify the desired DSs for a given DSCR.

A given LFN may have DS identification capabilities, but may not have the data collection capability, such as to collect data from a desired/identified DS, or the specific data processing capability, such as to process the raw data for producing RDSs. Therefore, the DS identification process disclosed herein not only refers to identifying the desired DSs for each of DEs in the RDSs as required by a given DSCR, but also refers to finding appropriate LFNs that can act as the Raw Data Collectors (RDCs) for collecting raw data from those identified DSs as well as to find appropriate LFNs that can act as Raw Data Processors (RDPs) for processing raw data for producing RDSs. The methods and systems for collaborative DS identification disclosed herein include but are not limited to DS identification with RDC discovery, DS identification result integration and RDC/RDP job assignment.

During an RDS production procedure, raw data collected from the DSs may be in a large amount and the data processing on the massive raw data may also need to be done collaboratively. For a given DSCR, its data processing may cross multiple RDPs since different LFNs may have various data processing capabilities that are required for producing RDSs for this DSCR. The primary solutions for collaborative RDS production disclosed herein include but are not limited to triggering a RDS production for a given DSCR, RDS production for a given DE, and RDS assembling for a given DSCR.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 17 shows an example user interface;

FIG. 25 shows an example user interface;

DETAILED DESCRIPTION OF ILLUSTRATIVE EMBODIMENTS

Compared with traditional datasets, big data typically includes massive unstructured data which needs to be analyzed in order to gain an in-depth insight from this data, such as how to discover potential buys from customers' shopping history records. In general, there is a popular definition of big data which refers to several "Vs":

Volume: with the generation and collection of masses of data, data scaling becomes increasingly large (e.g., the data generated by Internet companies can easily reach tens of PBs per day).

Variety: indicates the various types of data, which includes semi-structured and unstructured data such as audio, video, webpage, and text, as well as traditional well-defined structured data like database tables.

Velocity: the timeliness of big data (e.g., data collection and analysis) must be processed in a timely manner so as to maximize the commercial value of big data.

Value: there is useful knowledge and insights hidden in the data, but they may be in very low density.

It is worth noting that the emergence of Machine-to-Machine (M2M) and Internet of Things (IoT) communications, which typically refers to, for instance, sensors and devices embedded in the physical world and connected by networks to computing resources, is a major trend driving the growth in big data. For example, the number of connected IoT nodes deployed in the world is expected to grow at a rate exceeding 30 percent annually. Those massive IoT nodes are expected to produce a large amount of data, which requires a cost-efficient solution for IoT data processing.

Edge computing allows data produced by IoT devices to be processed closer to where it is created instead of sending it across long routes to data centers or clouds.

Edge computing deployments may be ideal in a variety of circumstances. One example scenario is when IoT devices have poor connectivity and it is not efficient for the IoT devices to be constantly connected to a central cloud. Other scenarios may have to do with latency-sensitive processing of information. Edge computing reduces latency because data does not have to traverse over a network to a data center or cloud for processing.

Figure 1:
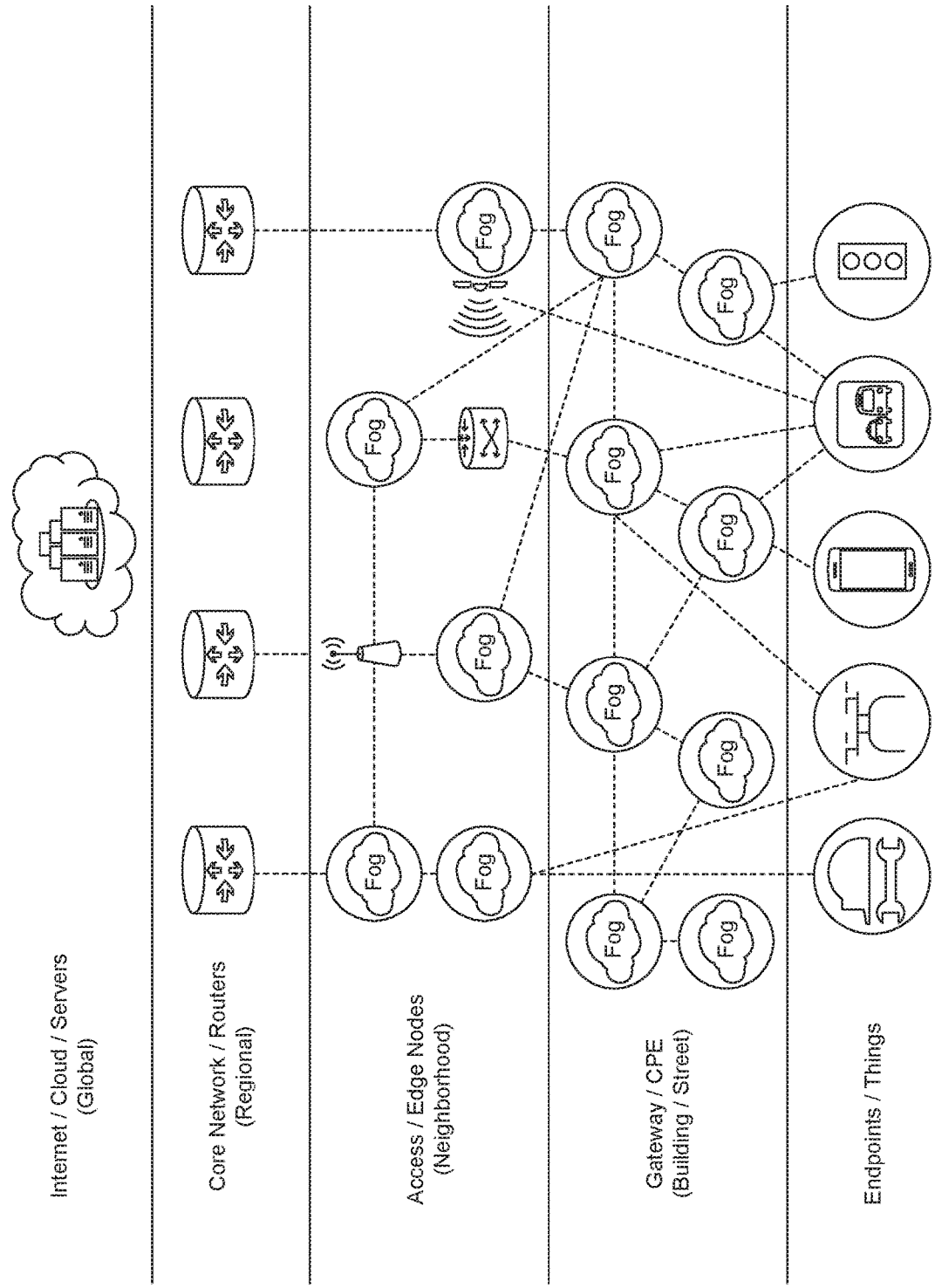
FIG. 1 shows a block diagram of an example Fog Computing System Architecture.

Fog computing refers to the network connections between edge devices and the cloud. Edge computing, on the other hand, refers more specifically to the computational processes being done close to the edge devices. Thus, fog computing may include edge computing, but fog computing may also incorporate the network needed to get processed data to its final destination. Formally, fog computing (or briefly, fog) is a system-level architecture that moves resources and services such as computing, storage, control and networking closer to the end users along the continuum from Cloud to Things. An example fog enabled continuum is shown in FIG. 1.

In general, "data analytics" is a broad term. Therefore, there are many types of data analytics products on the market (e.g., Google Analytics, IBM Watson, the open-source Apache Hadoop eco-system for distributed data processing, etc.).

Microsoft Azure IoT Edge is an example product that moves cloud analytics and custom business logic to devices at the edge. In general, Azure IoT Edge is made up of three components:

IoT Edge modules are containers that run Azure services, 3rd party services, or a developer's own code. They may be deployed to IoT Edge devices and executed locally on those devices. IoT Edge modules are units of execution, currently implemented as Docker compatible containers, that run users' business logic at the edge. Multiple modules can be configured to communicate with each other, creating a pipeline of data processing;

The IoT Edge runtime runs on each IoT Edge device and manages the modules deployed to each device; and A cloud-based interface enables the user to remotely monitor and manage IoT Edge devices.

AWS Greengrass is software that lets users run local compute, messaging, and data caching capabilities for connected devices. With AWS Greengrass, connected devices can run AWS Lambda functions (an event processing service), keep device data in sync, and communicate with other devices securely even when not connected to the Internet.

AWS Greengrass lets users build IoT solutions that connect different types of devices with the cloud and each other. Devices running AWS Greengrass Core act as a hub that can communicate with other devices that are running Amazon FreeRTOS or have the AWS IoT Device SDK installed.

AWS Greengrass Core devices, AWS IoT Device SDK-enabled devices, and Amazon FreeRTOS devices can be configured to communicate with one another in a Greengrass Group at the edge. If the Greengrass Core device loses connectivity to the cloud, devices in the Greengrass Group can continue to communicate with each other over the local network. A Greengrass Group may represent, for example, one floor of a building, one truck, or an entire mining site.

Figure 2:
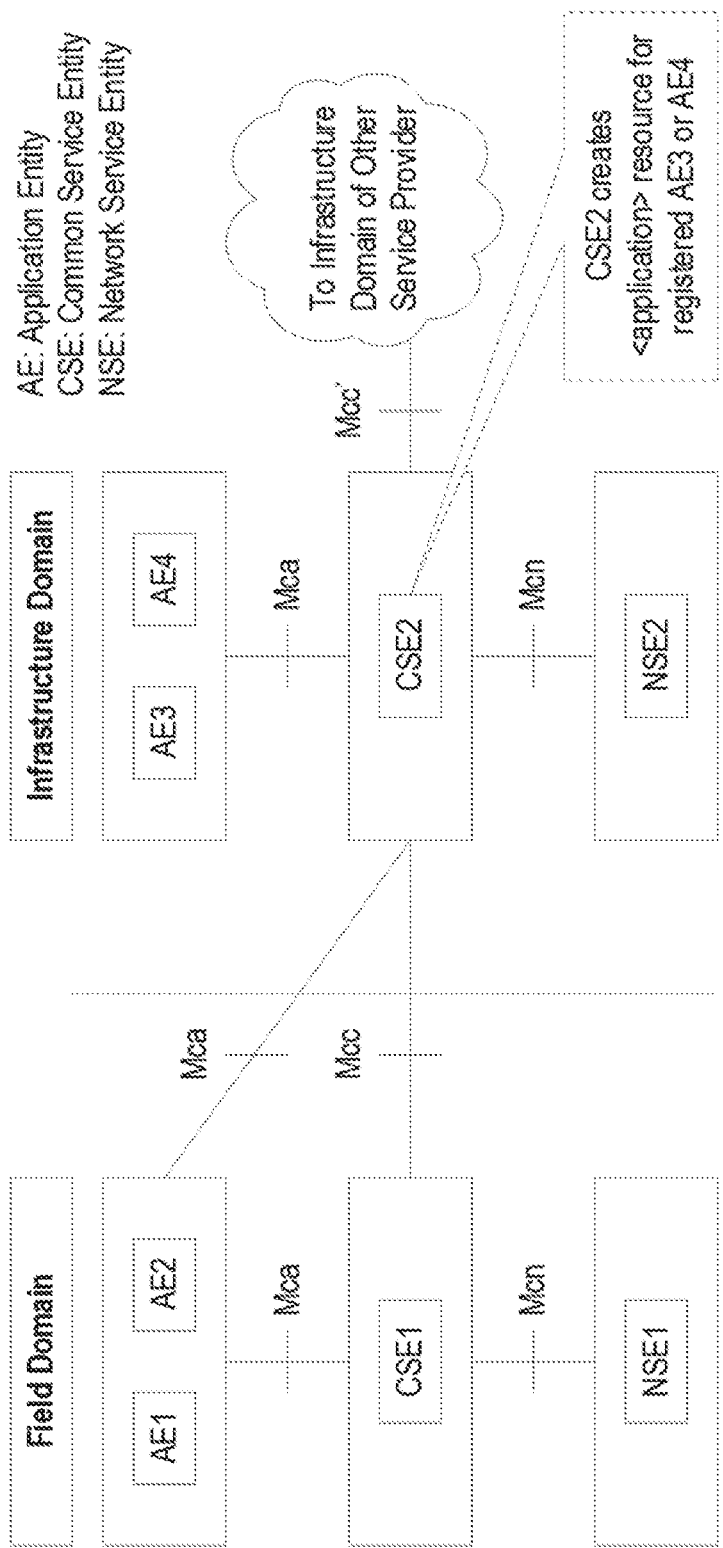
FIG. 2 shows a block diagram of an example oneM2M Architecture.

The oneM2M standard under development defines a Service Layer called a "Common Service Entity (CSE)" (see oneM2M-TS-0001 oneM2M Functional Architecture—V3.8.0). The purpose of the Service Layer is to provide "horizontal" services that can be utilized by different "vertical" M2M systems and applications. The CSE supports four reference points, as shown in FIG. 2. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering.

Figure 3:
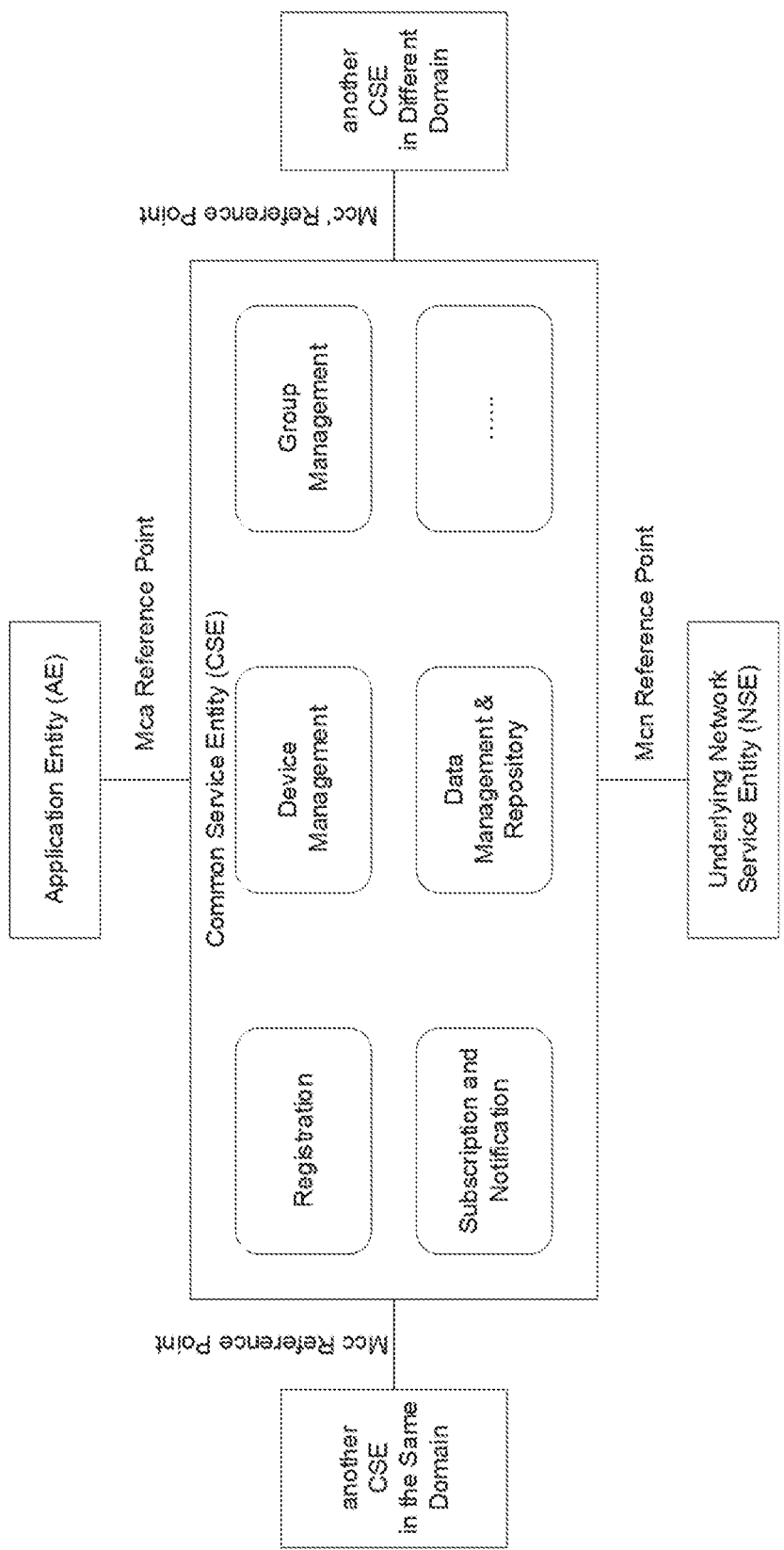
FIG. 3 shows a block diagram of a example oneM2M Common Service Functions (CSFs)

The CSE contains multiple logical functions called "Common Service Functions (CSFs)" such as "Discovery" and "Data Management & Repository". FIG. 3 illustrates some of the CSFs defined by oneM2M.

The oneM2M architecture enables the following example types of Nodes:

Application Service Node (ASN): an ASN is a Node that contains one CSE and contains at least one Application Entity (AE). Example of physical mapping: an ASN could reside in an M2M Device.

Application Dedicated Node (ADN): an ADN is a Node that contains at least one AE and does not contain a CSE. There may be zero or more ADNs in the Field Domain of the oneM2M System. Example of physical mapping: an Application Dedicated Node could reside in a constrained M2M Device.

Middle Node (MN): a MN is a Node that contains one CSE and contains zero or more AEs. There may be zero or more MNs in the Field Domain of the oneM2M System. Example of physical mapping: a MN could reside in an M2M Gateway.

Infrastructure Node (IN): an IN is a Node that contains one CSE and contains zero or more AEs. There is exactly one IN in the Infrastructure Domain per oneM2M Service Provider. A CSE in an IN may contain CSE functions not applicable to other node types. Example of physical mapping: an IN could reside in an M2M Service Infrastructure.

Non-oneM2M Node (NoDN): a non-oneM2M Node is a Node that does not contain oneM2M Entities (neither AEs nor CSEs). Such Nodes represent devices attached to the oneM2M system for interworking purposes, including management.

Figure 4:
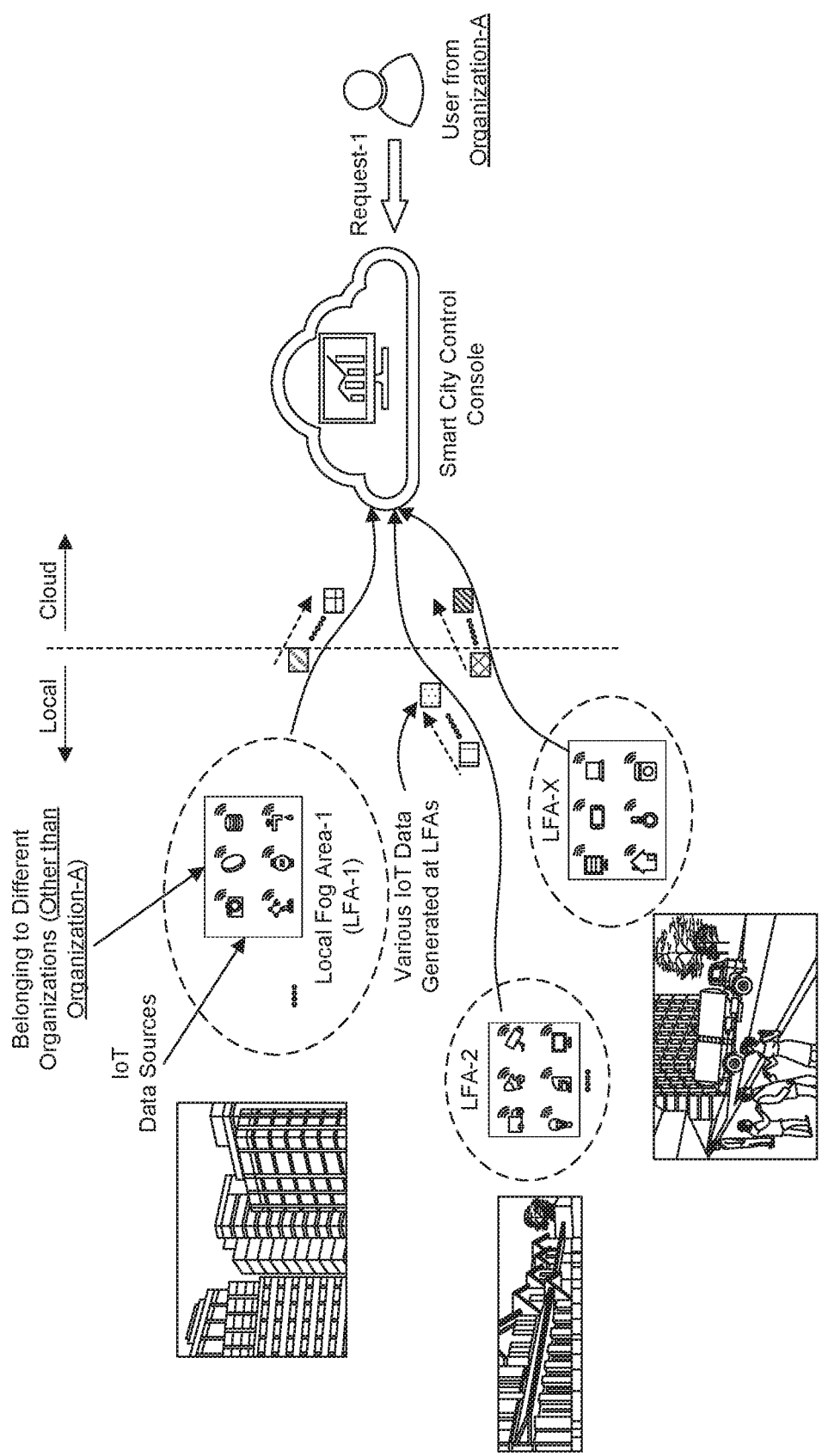
FIG. 4 shows a flow chart of an example smart city analytics use case.

An example smart city analytics use case is shown in FIG. 4. In order to build a smart city, the city authority adopts a standard-based Service Layer (SL) platform (such as oneM2M) and has deployed many IoT sensors and devices on city public infrastructure (such as on roads and streets, in public buildings, on buses and subways, etc.). In the meantime, due to the limited budget, the city authority also calls for the participation of private organizations and individuals for this smart city initiative. Accordingly, those IoT devices installed on private properties (such as private cars, cellphones, etc.) are also integrated into the system, which can generate a large amount of comprehensive IoT data that reflects the real-time running status of the city.

A city may have many geographical regions, such as Central Business District (CBD), a suburban residential area, etc., which may be referred to as Local Fog Areas (LFA). Massive amounts of IoT devices may be deployed in those LFAs and a large amount of IoT data may be generated from those LFAs. From a communication network perspective, different city regions constitute multiple LFAs (e.g., the CBD corresponds to LFA-1 and a suburban residential area corresponds to LFA-2, as shown in FIG. 4).

A smart city control console is deployed in the cloud that allows users to pose various data analytics requests based on their needs. For example, a user from Organization-A may have a request (denoted as Request-1) which intends to evaluate the current weather and environmental pollution status for a given area (e.g., LFA-X as shown in FIG. 4, which is an area under large-scale roadwork and building construction). In reality, data analytics results are usually represented through various charts (e.g., a line chart or a bar chart). In addition to what type of analytic charts the user intends to see, they may also specify what the data samples should be, which are the inputs for drawing the chart. In order to prepare those data samples for drawing the charts, the related raw data needs to be collected from various IoT devices in LFAs (such as temperature sensors, humidity sensors, pollution sensors, noise sensors, etc.). In particular, those sensors or devices may be installed by different organizations other than Organization-A (which the user is affiliated with). When dealing with interoperation across different organizations, it is a major challenge to do this in an efficient way by considering the various constraints (e.g., complexities in interoperation across different organizations) and the potential incurred communication and processing costs of massive IoT data.

In an example, assume that in Request-1, the user intends to see a line chart for a LFA-X, which requires one data sample for every 3 minutes. In particular, each data sample may be constituted by the following two data elements, and each of the data elements may be associated with a quality requirement:

Data Element (DE)-1: The average temperature of LFA-X in the last 3 minutes.

Quality Requirement of DE-1: The temperature readings need to be collected from at least 100 different temperature sensors deployed in LFA-X in order to guarantee the accuracy.

DE-2: The average noise level of LFA-X in the last 3 minutes.

Quality Requirement of DE-2: The noise readings need to be collected from noise sensors deployed at 30 major traffic intersections in LFA-X.

In order to draw the line chart on the smart city control console deployed in the cloud, a data sample with the format of (DE-1, DE-2, Timestamp) will be needed for every 3 minutes.

The following technical challenges may be identified in connection with the above use case:

Issue 1: a straight-forward solution for realizing the smart city analytics use case is to collect all the needed IoT data from the LFAs and conduct centralized data processing in the cloud. For example, considering the DE-1 in the early example, 100 temperature readings will be collected from a LFA every 3 minutes and then transferred to the cloud, in which the data processing (e.g., calculating the average value of those 100 readings) will be conducted. As can be seen, centralized data processing leads to considerable communication overhead due to the large amount of data movement from LFAs to the cloud.

Issue 2: the user may not have knowledge about the available IoT data sources in the LFAs. For example, in the smart city use case, the deployed SL platform also integrates many IoT devices from different organizations and individuals. Accordingly, the user from the cloud side may not be the same party that deployed those IoT devices. As a result, the user has to explore the LFAs by itself in order to identify the desired IoT devices that can be used as the data sources for their desired data samples. Such a requirement poses extra burden to the user especially if they do not have the appropriate discovery capability in LFAs.

Issue 3: the existing IoT Edge products may not be useful due to the fact that the user may not have "edge-to-cloud" configuration capabilities. For example, most of the existing products (such as Microsoft Azure IoT Edge or Amazon Greengrass) are configured to support a relatively simple case where users normally have knowledge and configuration capabilities for the devices/nodes (e.g., sensors at edge, gateways, etc.) in LFAs. In other words, when a user wants to build an edge analytics application for their own use, they may know what edge devices should be connected and may also have the capability to configure those nodes (e.g., gateways) in order to run analytics processing code/unit for conducting data processing directly at the edge side. However, this is not the case in an example where the user is not the owner of many of the IoT devices in the LFAs or does not have any capability for configuring any nodes in the LFAs which may be owned by other different parties or organizations. As a result, the existing IoT edge products cannot work in such a heterogeneous scenario.

Overall, from a service layer perspective, a SL-based platform is often supposed to be a horizontal platform that enables applications across different domains. In other words, such a horizontal platform should be good at integrating resources from different parties and/or organizations, which is a desired characteristic for the heterogeneous application scenario. In order to do so, SL-based platforms (such as oneM2M) often provide many types of common services, which can enable users to conduct different types of operations (such as discovering, device management, etc.) without allowing or requiring users to be involved in the details. However, the existing SL-based platform solutions currently do not provide common service or capability for supporting efficient data sample collection and processing by leveraging a fog computing paradigm.

Disclosed herein is a Data Sample Collection Service (DSCS) for the fog-based Service Layer (SL). The DSCS is a service at the SL based on the Fog Computing paradigm. With the DSCS, users of the DSCS can specify their needs for what type of RDS(s) they intend to receive and the DSCS may be configured to handle everything in the LFAs and produce the desired RDS(s).

Also disclosed is a Data Sample Template (DST). A DST describes all the details about what type of RDS(s) a user intends to receive, which will be the guideline for the DSCS to conduct IoT raw data collection and raw data processing in the LFAs.

Also disclosed are methods and systems for "DST Management" which may involve one or more of the following aspects:

A number of example solutions are disclosed herein for a "DST Creation Process" which can be used in different application scenarios, including but not limited to:
  Scenario 1: DST Creation with Reactive DS Identification in LFAs;
  Scenario 2: DST Creation with Proactive DS Identification in LFAs;
  Scenario 3: DST Creation through DE Re-use; and
  Scenario 4: DST Creation with DST Splitting.

A number of solutions are disclosed for a "DST Update/Deletion Process," including but not limited to:
  A DST update process for adding new DEs to an existing DST or simply updating some information in an existing DST; and
  A DST update process for deleting one or more DEs at an existing DST or deleting an entire DST.

A number of solutions are disclosed for a "DST Activation Process," including but not limited to:
  A given DST can be activated based on the parameter indicated in the "RDS_Production_Schedule" parameter in a DST;
  A given DST can be activated based on a signal from a user itself, and
  A given DST can be activated based on the events that occurred in LFAs.

Described below are example definitions for some of the terms used throughout this disclosure:

Cloud Node (CN): a node with cloud capabilities that manages the operations of other fog nodes lower in the deployment hierarchy. Note that the term "cloud" may be used to refer to a Cloud Node. Furthermore, the cloud oversees and manages the interactions between different fog nodes that together enable a fog service layer for applications.

Local Fog Area (LFA): a geographic region (e.g., a city) can be divided into multiple LFAs depending on different applications scenarios. For example, in a smart city scenario, a specific residential area can be a LFA, or a CBD in a downtown area can be a LFA.

Local Fog Node (LFN): a LFN can be a node in a LFA that has compute, storage, and communication capabilities. A LFN can communicate and interact with a LFNL in its corresponding LFA. For example, a LFN can be a cellphone of a person, a moving bus, or a home gateway of a house, etc. The LFN is a type of FN that is at the lowest level of the network. A LFN can interact and collaborate with other LFNs in the LFA and can conduct discovering, obtaining and processing data from DSs.

Data Source (DS): a node can be a DS if it is a source of IoT data. For example, a DS may be a sensor, a camera, a traffic light, or any IoT devices that produces data. A road-side unit can also be a DS since it generates sensory data related to road surface. In the meantime, the road-side unit can also be a LFN since it can conduct certain data processing capability and/or can communicate with a LFNL. A node in a LFA that not only has sensing, but also has computing, storage and communication capabilities may be a LFN as well as a DS.

LFN Leader (LFNL): a given LFA may have an LFN leader in the fog area. A LFNL manages all the LFNs within that LFA and is also connected to FNs that are on a higher level. For example, in the smart city example, a LFNL could be the main gateway of a specific residential area.

Fog Node (FN): a node that has any fog resource such as compute, storage, communication, analytics, etc. A fog node may have at least one of these resources and may also have other software or services that are running on the fog node. A FN is assumed to be deployed at one level higher than the level of a LFN. There may be several levels of FN deployments with the CN being at the highest level. For example, in the smart city use case, a FN could be a router at a higher level in the network.

It is worth noting that although the ideas proposed in this disclosure are described using fog-related terms, the ideas proposed in this disclosure can also be applied to the edge scenario. For example, a LFA could also interpreted as a specific area at the edge, a LFN can be a node at the edge side, a LFNL can be a gateway at the edge or a roadside unit at the edge, etc.

Figure 5:
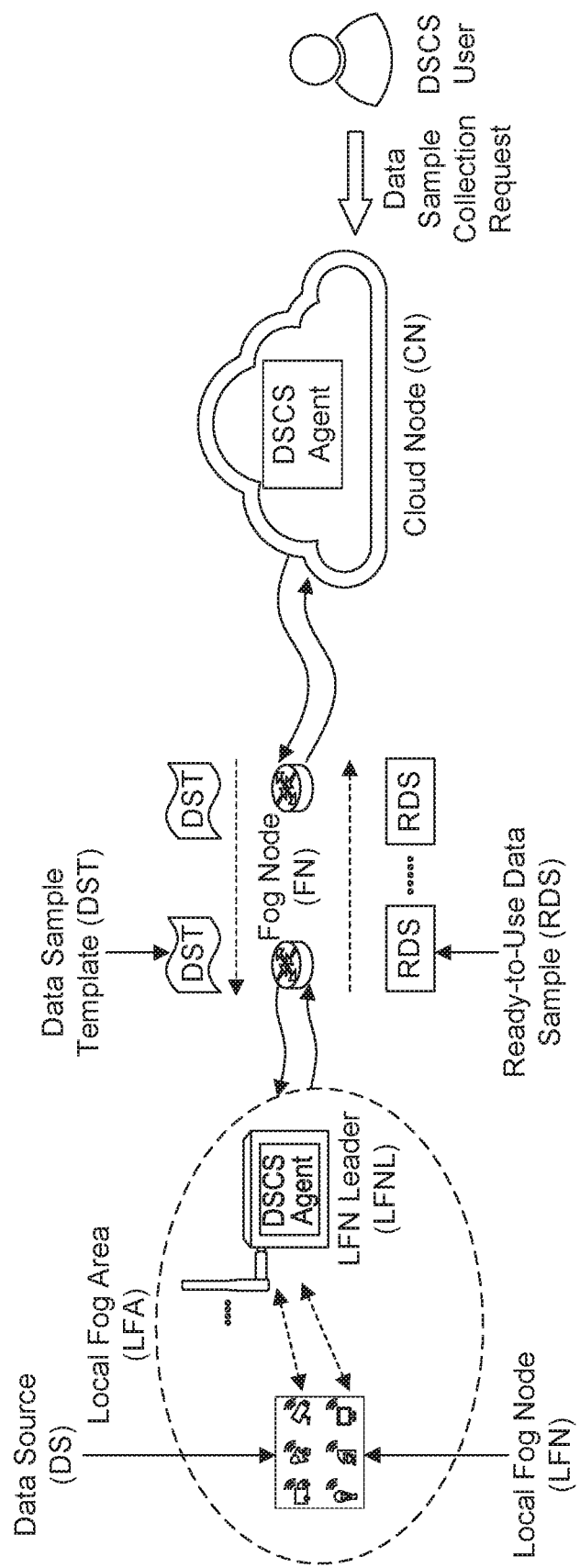
FIG. 5 shows a flow chart of an example high level architecture for a data sample collection service (DSCS) using a data sample template (DST)

Disclosed herein is a new common service for the service layer, which may be referred to as the Data Sample Collection Service (DSCS). A high-level architecture of DSCS is shown in FIG. 5. The disclosed DSCS may have one or more of the following capabilities:

The DSCS can receive various data sample collection requests from users and handle all the details on behalf of its users;

In order to properly describe what kind of Ready-to-Use Data Samples (RDS) a user needs (e.g., for drawing a line chart on the control console), the DSCS adopts a new concept called the Data Sample Template (DST). By using the DST, the user can clearly depict what their desired data samples look like, along with various quality requirements regarding the data samples;

The DSCS can provide a DST Management function to users. In general, DST management involves the processes of DST creation, DST update, DST deletion and DST activation/de-activation. For example, a user may create a DST based on its data sample collection needs. Later, the created DST can also be updated and/or deleted based on the dynamic changes to the needs. The changes made on a DST may also lead to the changes on the corresponding data samples of this DST; and The DSCS can provide interfaces to users for activating or deactivating a created DST. Note that in one example the real RDS production of a DST may not be started until this DST is in an activated status.

An example method may comprise a first agent of a data sample collection service configured to perform operations comprising: receiving a request to create a data sample template, the request to create the data sample template comprising information associated with one or more data elements; creating, based on the information associated with the one or more data elements, the data sample template; sending, to a second agent of the data sample collection service, a request to identify one or more data sources associated with the one or more data elements, wherein the second agent of the data sample collection service is located on a local fog node; receiving, from the second agent of the data sample collection service, information associated with the one or more data sources; and configuring, based on the information associated with the one or more data sources, the data sample template.

The request to create the data sample template may comprise an indication of a type of data sample to be created. The request to create the data sample template may further comprise an indication of one or more parameters, the one or more parameters comprising: a targeted region associated with the data sample; a frequency associated with the data sample; a production schedule associated with the data sample; and a context associated with the data sample. The method may further comprise determining, based on the one or more parameters, which of a plurality of local fog nodes to target. The information associated with the one or more data elements may comprise one or more of: a raw data type of the data element; a unit of the data element; a data processing operation of the data element; one or more customized processing details of the data element; and one or more quality requirements of the data element. The method may further comprise sending, to the second agent of the data sample collection service, the configured data sample template. The second agent of the data sample collection service may be configured to generate, based on the configured data sample template, a ready to use data sample.

An example method may comprise a first agent of a data sample collection service configured to perform operations comprising: generating, based on a first data sample template, a second data sample template and a third data sample template, wherein the second data sample template is associated with a first set of data elements and the third data sample template is associated with a second set of data elements; sending, to a second agent of the data sample collection service, a request to identify a first set of data sources associated with the first set of data elements, wherein the second agent of the data sample collection service is located at a first local fog node; sending, to a third agent of the data sample collection service, a request to identify a second set of data sources associated with the second set of data elements, wherein the third agent of the data sample collection service is located at a second local fog node; receiving, from the second agent of the data sample collection service, information associated with the first set of data sources; receiving, from the third agent of the data sample collection service, information associated with the second set of data sources; and configuring, based on one or more of the information associated with the first set of data sources and the information associated with the second set of data sources, at least one of the second data sample template and the third data sample template.

The method may further comprise receiving a request to create a data sample template, the request to create the data sample template comprising information associated with one or more data elements; and creating, based on the information associated with the one or more received data elements, the second data sample template and the third data sample template. The information associated with the one or more received data elements may comprise information associated with the first set of data elements and information associated with the second set of data elements. The method may further comprise determining, based on the information associated with the one or more received data elements, one or more of a plurality of local fog nodes to target. Each of the second data sample template and the third data sample template may comprise one or more of the following parameters: a targeted region associated with the respective set of data samples; a frequency associated with the respective set of data samples; a production schedule associated with respective set of data samples; and a context associated with the respective set of data samples. The method may further comprise sending, to the second agent of the data sample collection service, the configured second data sample template; and sending, to the third agent of the data sample collection service, the configured third data sample template. The second agent of the data sample collection service may be configured to generate, based on the configured second data sample template, a first ready to use data sample. The third agent of the data sample collection service may be configured to generate, based on the configured third data sample template, a second ready to use data sample.

An example method may comprise a first agent of a data sample collection service configured to perform operations comprising: receiving a request add a new data element to an existing data sample template, the existing data sample template being associated with a ready to use data sample that comprises a plurality of data elements; updating, based on the new data element, the existing sample template; sending, to a second agent of the data sample collection service, a request to identify one or more data sources associated with the new data element, wherein the second agent of the data sample collection service is located on a local fog node; receiving, from the second agent of the data sample collection service, information associated with the one or more data sources; and configuring, based on the information associated with the one or more data sources, the updated data sample template.

The request to add the new data element may comprise one or more of an identifier of the existing data sample template and a targeted region for the new data element. The information associated with the new data element comprises one or more of: a raw data type of the data element; a unit of the data element; a data processing operation of the data element; one or more customized processing details of the data element; and one or more quality requirements of the data element. The request to add the new data element may comprise a request to update an existing data element. The request to update data element may comprise one or more of an identifier of the existing data sample template and one or more parameters of the data element to be updated. The method may further comprise deactivating, prior to updating the data sample template, the data sample template.

In order to implement the capabilities of DSCS as mentioned above, the following details are described:

In general, a service layer node (such as one implemented on a LFN, a FN or a CN) may have a DSCS agent if this node intends to provide a data sample collection related service. A DSCS agent on a SL node is a piece of software that can not only interact with DSCS users but also can collaborate with other DSCS agents in order to conduct various data sample collection tasks posed by users;

Regarding the interaction between a DSCS agent and a DSCS user, the DSCS agent can provide interfaces to the DSCS user in order to support DST management in terms of DST creation, DST update and DST deletion. For example, as shown in FIG. 5, a DSCS agent (e.g., DSCS Agent-1) is deployed in the CN, which can accept analytics requests from different users in the CN;

There may also be interactions and collaborations between DSCS agents. For example, a DSCS agent may also need to be deployed in the LFNL of an LFA (which can handle all the raw data collection and processing in that LFA). Typically, the DSCS Agent-1 in the CN may create a DST based on users' needs and figure out which LFA(s) this DST should be deployed to. For example, if a user just wants to collect data samples from a specific LFA, the DST may then be deployed to the DSCS agent in that LFA (e.g., DSCS Agent-2). During deployment, certain work threads (e.g., code snippets) may be set up on the DSCS Agent-2. In particular, DSCS Agent-2 may be responsible for identifying the desired DSs in this LFA, conducting the required data processing operations, producing RDS, and only sending RDSs back to the users in the CN. Overall, those DSCS agents can work together in order to serve various data sample collection requests; and As a common service in the SL, the DSCS can realize a fog computing paradigm even if the system integrates resources (in terms of devices, nodes, etc.) from different parties or organizations. More importantly, the DSCS can help users to collect the raw data in LFAs and to analyze/process the raw data directly on the DSCS agent deployed in LFAs. In other words, throughout this process, the users may not have to be involved in any details regarding how to identify the qualified DSs in LFAs and how to configure the LFNs in those LFAs for raw data processing. As a result, the user may only need to specify their needs for the desired RDSs by creating a DST. All other remaining processing may be handled by the disclosed DSCS.

When a DSCS user has a need for collecting data samples from LFAs, they can describe their needs in a data sample collection request, which may be sent to a DSCS agent. Accordingly, a DST can be created which includes all the details about how to conduct a RDS production for this DST. As shown below, Table 1 gives the detailed definitions for a DST.

TABLE 1

Definition of a Data Sample Template (DST)

Part 1: Parameters for The Overall Information and Requirements for A Data Sample Collection Task
Note that, in a DST, some of the parameters shown below may be provided by DSCS users, while other parameters may be set by the DSCS.

| Parameters | Multiplicity | Description |
| --- | --- | --- |
| DST_ID | 1 | The "DST_ID" is the identifier of this DST. |
| DST_Initiator | 1 | The "DST_Initiator" is to indicate who initiated the creation of this DST. For example, if User-1 sends a request to a DSCS agent for a specific data sample collection need, a corresponding DST (e.g., DST-1) may be created by the DSCS agent, and therefore, User-1 may be the initiator of DST-1. |
| DST_Users | 1...N | The "DST_Users" is to indicate who intends to consume the RDSs of this DST. For example, in addition to User-1 (who is the initiator of DST-1), other users may also want to receive RDSs of DST-1. In other words, a created DST can be shared with others and a potential benefit is that it can avoid repeated raw data collection and processing. |
| Type_of_DST | 1 | The "Type_of_DST" is to indicate the type of this DST, which includes but is not limited to:<br>1. Root DST (R-DST). In general, if a user wants to create a DST for his/her data sample collection need, a Root DST may be created. |

TABLE 1-continued

Definition of a Data Sample Template (DST)

| | | |
|---|---|---|
| | | 2. Sub DST (S-DST). For a given created R-DST, it is possible that the raw data to be collected may be from multiple LFAs. In this case, the R-DST may be further split into multiple S-DSTs, each of which may be deployed to a corresponding LFA. For example, a user creates DST-1 for data samples having two DEs (e.g., DE-1, DE-2). In particular, DE-1 and DE-2 are to be produced by using the raw data collected from LFA-1 and LFA-2 respectively. Accordingly, DST-1 may be split into two S-DSTs, one being deployed to LFA-1 for producing the DE-1 part in a RDS, and the other one being deployed to LFA-2 for producing DE-2 part in a RDS. In general, a R-DST is often created due to the request from a DSCS user, which means a R-DST is available for DSCS users to check, retrieve, query, etc. However, a S-DST may just be an internal DST used by the DSCS itself, which may not be known by DSCS users. Therefore, this parameter may be just a parameter for internal usage of the DSCS. |
| Targeted_Region | 1 | The "Targeted_Region" is to indicate from which region the RDSs are to be collected. As an example used in the smart city analytics use case, the user may want to evaluate the current weather and environmental pollution status for LFA-X. Accordingly, the targeted region in this case may be LFA-X. In the meantime, it is also possible that the user may not know how LFAs are defined but just know a geographical region. In this case, the user may just specify the geographical information (e.g., a specific residential area name) and the DSCS can help to identify which LFAs are involved (e.g., one targeted geographical region could be constituted of more than one LFA). |
| Involved_LFAs | 0 . . . 1 | If the "Targeted_Region" refers to a geographic region not the LFAs, the DSCS may need to figure out which LFAs are involved and fill them in the "Involved_LFAs" parameter. In other words, this parameter may be used to further indicate which LFAs are involved in the targeted region. This parameter is optional in the sense that it is only needed when "Targeted_Region" is a geographical region as specified by the user. |
| Sub_DST_List | 1 | If the "Type_of_DST" indicates that this DST is a R-DST and that this R-DST has been split into multiple S-DSTs, then the "Sub_DST_List" includes a list of DST_IDs of those S-DSTs. This parameter is optional. |
| Parent_DST_ID | 1 | If the "Type_of_DST" indicates that this DST is a S-DST, then the "Parent_DST" indicates the parent of this S-DST. This parameter is optional and only appears in a S-DST. |
| Creating_DSCS_Agent_ID | 1 | When a DSCS agent receives a DST creation request, it may create a DST (e.g., DST-1). This DSCS Agent is the creating DSCS agent for DST-1 and may host DST-1 for others to check, retrieve, query, etc. |
| In_Field_Manager_ID | 1 | After a DST-1 is created (e.g., by DSCS Agent-1 on a CN), DSCS Agent-1 (as the creating DSCS agent) may further contact another DSCS agent in the involved LFAs (e.g., DSCS Agent-2 in a LFA). In other words, DSCS Agent-2 in this case is the in-field manager of DST-1. Note that, for a given DST, its in-field manager may be involved with tasks related to DS Identification and/or RDS production in the corresponding LFAs. In addition, this parameter is a parameter for internal usage of the DSCS, which means it does not have to be exposed to users. |

TABLE 1-continued

| | Definition of a Data Sample Template (DST) | |
|---|---|---|
| Data_Sample_Frequency | 1 | The "Data_Sample_Frequency" is to indicate how frequently RDSs should be produced. For example, a user may need a RDS for every one minute. In another example that is used in the smart city analytics use case, since two DEs are to calculate the average temperature and humidity for every 3 minutes respectively, an RDS should be created every 3 minutes. In general, the setting of "Data_Sample_Frequency" should be consistent or aligned with the requirements/definitions of DEs in this DST. |
| DST_Status | 1 | The "DST_Status" is to indicate the current working status of this DST. Note that even if a DST is deployed on a LFNL in a LFA, it does not mean the real RDS production for this DST may be started immediately. Instead, the RDS production can be triggered or activated in a later time through a number of approaches (as described herein).<br>In general, a given DST may have the following status:<br>  1. Inexecutable. This status means this DST has been created, but the DS identification process is not complete yet for this DST.<br>  2. Executable. This status means the DSs for this DST have been successfully identified, but the corresponding RDS production process is currently not activated.<br>  3. Activated. This status means the RDS production process is currently running, (e.g., the RDSs of this DST are being produced).<br>Additional information may be found, for example, at FIG. 14 and the corresponding description herein. |
| RDS_Production_Schedule | 0 . . . 1 | This is an optional parameter. The "RDS_Production_Schedule" is to indicate when the RDS production for this DST should be conducted. In fact, this is one of the approaches regarding how to control the RDS production of this DST. For example, this parameter may indicate that the RDS production should only be conducted between 8am-10am, 5pm-8pm every day. |
| RDS_Production_Trigger | 0 . . . 1 | This is also an optional parameter. The "RDS_Production_Trigger" indicates how to trigger a RDS production for this DST if it should be activated based on certain events instead of based on a schedule.<br>The events could be anything that is happening in the cloud side or in the LFAs. Accordingly, if the trigger is an event on the cloud side, the DSCS agent on the cloud side may be the one monitoring the occurrence of the event. For example, a RDS production of a specific DST may be activated if any of the users of this DST is logged into the system. In the meantime, the trigger can also be an event from LFAs and the in-field manager of this DST may be the one monitoring the occurrence of the event. For example, a RDS production may be activated for real-time downtown noise-level monitoring when traffic jams have been detected in that area. |
| RDS_Context | 1 | This is to indicate that for a single RDS of this DST, in addition to all the DEs to be included, what other context information should also be included in a RDS. For example, it may be necessary to embed the timestamp and DST_ID information in a RDS such that others can know this RDS is compliant to which DST and is generated for which time interval. In general, any useful context information should be carried in RDSs if they are needed for later usage. |

TABLE 1-continued

Definition of a Data Sample Template (DST)

| | | |
|---|---|---|
| RDS_Sending_Address_List | | Therefore, a given RDS-1 may have the following form:<br>RDS-1 = (DE-1, DE-2 . . . DE-N, RDS-context-1, RDS-Context-2, . . . )<br>If this DST is a R-DST, this attribute indicates a list of addresses where the RDSs may be sent to. In other words, those addresses are set by the users of this DST. In general, when a DST is activated and producing RDSs, if a specific user (as indicated in DST_Users parameter) wants to receive RDSs, it may add its RDS sending address to this list. Otherwise, if a user does not want to receive RDSs of this DST that is shared with others and is currently producing RDSs, it may not include its own RDS sending address to this list.<br>If this DST is a S-DST, this attribute could indicate the address of the in-field manager of its parent R-DST such that the RDSs for the DEs included in this S-DST may be further sent to the in-field manager of its parent R-DST for processing (e.g., for RDS assembling). |

Part 2: Each of the DEs in this DST may have the following items which define all the details for this DE.
Note that, if a R-DST has been split into multiple S-DSTs, all the information about a given DE as defined below may also be included in the S-DST that this DE belongs to.

| | | |
|---|---|---|
| DE_ID | 1 | The "DE_ID" is the identifier of a DE in this DST. Note that, this DE ID may only be valid within this DST. As an example used in the smart city analytics use case, there are two DEs in a DST, and DE-1 and DE-2 are their DE_IDs, respectively. |
| Reused | 1 | This is to indicate whether this DE is defined by re-using a DE in another existing DST. |
| Reused_Info | 0 . . . 1 | If "Reused" is True, this parameter further shows which DE are reused for creating this DE. For example, when creating DST-2, one of its DE (e.g., DE-3) is defined by reusing the DE-1 in an existing DST-1. |
| Raw_Data_Type | 1 | This is to indicate which type of raw data should be collected for this DE. As an example used in the smart city analytics use case, the raw data type of DE-1 may be the temperature. |
| Unit | 1 | This is to indicate what the unit of this DE should be. As an example used in the smart city analytics use case, the raw data type of DE-1 is temperature. In particular, although the raw data of DE-1 may either be in Celsius or in Fahrenheit, it is required that in RDSs, the DE-1 part should be in Celsius (which is the unit of DE-1). |
| Data_Processing_Operation | 1 | This is to indicate for a given DE in one RDS, which type of data processing operations should be conducted over the raw data collected for this DE. The common operations include but are not limited to: average, max, min, etc. As an example used in the smart city analytics use case, the data processing type of DE-1 should be "determining the average aggregation operation".<br>The user may also use customized data processing operations. In this case, this parameter may have the value of "customized". |
| Customized_Processing_Details | 1 | If the "Data_Processing_Operation" has the value of "customized," this parameter may indicate how to conduct such customized data processing operations. For example, it may have the following operations:<br>   1. The user works out a mathematical formula or model, which is obtained through a machine learning process. This model can be used to process the raw data collected for this DE. In this case, the formula may be directly embedded in this parameter. |

TABLE 1-continued

Definition of a Data Sample Template (DST)

| | | |
|---|---|---|
| | | 2. The user has its own data processing code snippet, which can be run by the LFNL in the LFA to process the raw data collected for this DE. In this case, this parameter may indicate the stored location (e.g., URI) of the data processing code snippets. |
| Quality_Requirements | 1(L) | This is to indicate any quality requirements for this DE. As an example used in the smart city analytics use case, for DE-1 in a single RDS, it is required that the temperature readings need to be collected from at least 100 different temperature sensors deployed in LFA-X in order to guarantee the accuracy. |

In a first aspect of the disclosure, methods and systems are disclosed for a DST creation process.

For a given DST to be created, there could be a large number (e.g., thousands) of potential DSs in a LFA that need to be discovered and evaluated to determine whether they are the desired DSs for this DST (such a process is may be referred to as a DS Identification Process). In the meantime, the raw data collected from those DSs may also be a large amount, and the data processing on the massive raw data for producing RDSs may be referred to as an RDS Production Process. Compared to DST management (as a control plane issue), DS identification and RDS production are more like "Data Plane" issues for real RDS generation.

In a first example, a DST creation process with reactive DS identification in LFAs is discussed. In this example, the DS identification may not be conducted until there is a DST creation request that needs the desired DSs in LFAs to be identified. This may be applicable to the scenario in which the DSCS agents in LFAs only have limited energy or processing capability or the availably of DSs in LFAs changes frequently (for example, if DSs are equipped on mobile vehicles, those DSs may travel across different LFAs in the sense that they may be available in different LFAs during different time intervals).

Figure 6:
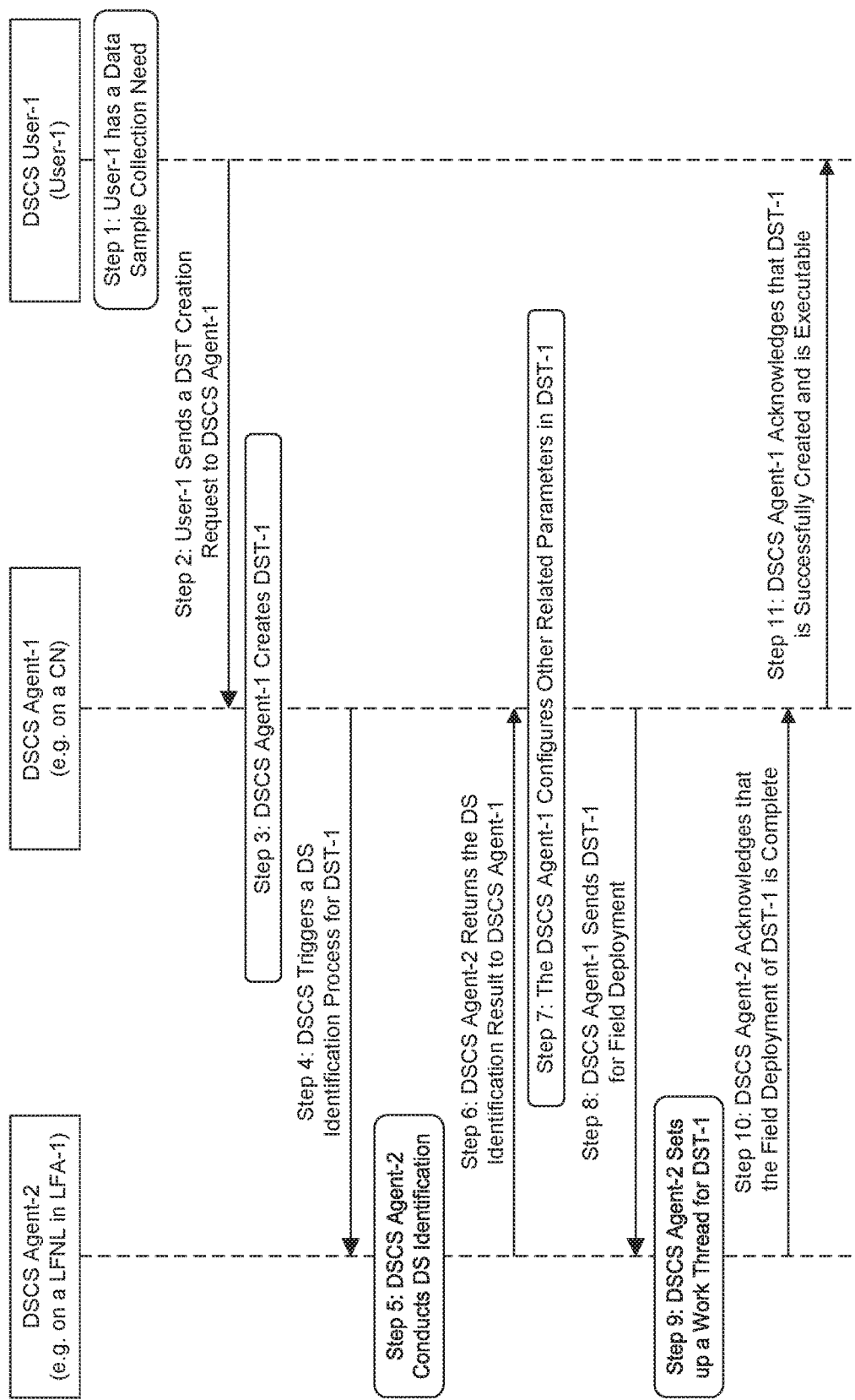
FIG. 6 shows a flow chart of an example procedure for DST creation with Reactive DS Identification in LFAs.

FIG. 6 illustrates an example procedure for the DST creation process with reactive DS identification in LFAs:

At step 1, in this example system, there is a DSCS agent on the CN. User-1 has a data sample collection need and intends to use the DSCS provided by the SL. Accordingly, User-1 decides to contact the DSCS Agent-1 on the CN.

At step 2, User-1 sends a DST creation request to DSCS Agent-1, along with the information about what type of data sample it would like to receive. In particular, the message may include one or more of the following parameters (as further explained in Table 1):

Targeted_Region;
Data_Sample Frequency;
RDS_Production_Schedule; and
RDS_Context.

For each of the DEs to be included in the desired RDSs, the request may have the following parameters which describe the details for this DE:

Raw_Data_Type;
Unit;
Data_Processing_Operation;
Customized_Processing_Details; and
Quality_Requirements.

At step 3, based on the information from User-1, DSCS Agent-1 creates DST-1. DSCS Agent-1 also needs to configure other information in DST-1 which is not provided by User-1, including "DST_Users" (e.g., User-1), "DST Initiator" (e.g., User-1), and "Creating_DSCS_Agent_ID" (e.g., DSCS Agent-1). However, the status of DST-1 may be set to "inexecutable" in the "DST_Status" parameter since until now, the DSs have not been identified for DST-1. Accordingly, DSCS Agent-1 decides which LFAs are involved in this DST-1. For example, based on the details included in the "Targeted_Region" parameter, the DSCS Agent-1 can figure out that the geographical region that is interested by User-1 corresponds to which LFAs from a communication network standpoint. In this example, only one LFA is involved (e.g., LFA-1). In addition, the Type_of_DST may be set with value of R-DST since DST-1 will not be split. Next, DSCS Agent-1 needs to contact the DSCS Agent on a LFNL in LFA-1 (e.g., DSCS Agent-2) in order to trigger a DS identification process for DST-1.

At step 4, based on the information from User-1 about each of the desired DEs, DSCS Agent-1 sends a request to DSCS Agent-2 for triggering DS identification for DST-1, along with other detailed information, such as what type of data processing operation is to be performed on the raw data and the related quality requirements. In other words, DSCS Agent-2 in this case is the "in-field manager" of DST-1. Note that, for a given DST that is not going to be split (as considered in Scenario 1), its in-field manager may be the central controller for conducting DS identification and RDS production in the corresponding LFAs. In particular, if a DST is a R-DST (such as DST-1 in this case), then its in-field manager may be the location where the raw data of the corresponding DEs in this DST are processed (using the data processing operations as indicated in the Data_Processing_Operation parameters for each of those DEs in DST-1), which leads to the generation of an RDS for this whole DST-1.

At step 5, after receiving the request from DSCS Agent-1, DSCS Agent-2 in LFA-1 conducts DS identification to see if the desired DSs can be identified for all of the DEs in DST-1 (for example, DSCS Agent-2 can coordinate/manage other LFNs in LFA-1 to conduct the DS identification).

At step 6, DSCS Agent-2 returns the DS identification result to DSCS Agent-1. In this example, it is assumed that the desired DSs have been identified for all of the DEs in DST-1. In the case where DS identification failed (e.g., the desired DSs has not been identified for all of the DEs in DST-1), the DST creation process may be terminated, and DSCS Agent-1 may acknowledge to the User-1 (e.g., in Step 11) that the DST creation was not successful.

At step 7, DSCS Agent-1 may also need to configure other information in the DST-1, including the "In_Field_Manager_ID" (e.g., DSCS Agent-2 in this example). DSCS also marks DST-1 as an "executable" DST in the "DST_Status" parameter.

At step 8, once the DST-1 has been fully configured, DSCS Agent-1 sends DST-1 to DSCS Agent-2 for field deployment.

At step 9, DSCS Agent-2 conducts certain set-up or configurations in order to start a work thread for DST-1 for the upcoming RDS production operation. For example, if User-1 has provided a code snippet for processing the raw data for a specific DE, such code snippet may be installed on DSCS Agent-2 or another LFNs which are managed by the LFNL in LFA-1.

At step 10, DSCS Agent-2 confirms that the field deployment of DST-1 is complete.

As an alternative, at step 5, the DSCS Agent-1 may also indicate whether the work thread of DST-1 can be set up directly (as in Step 9) if the desired DSs has been identified for all of the DEs in DST-1 during step 6. In this case, step 8 and step 10 may not be needed.

At step 11, DSCS Agent-1 acknowledges to User-1 that DST-1 is successfully created and is also executable now, along with certain information (e.g., DST_ID).

In a second example, a DST creation process with proactive DS identification in LFAs is discussed. In this example, the DSCS agents in LFAs can proactively conduct DS identification even if there is no DST creation request. This solution may be applicable to the scenario in which the DSCS agents in LFAs have sufficient energy and powerful processing capability, or the availabilities of DSs do not change frequently so that they can be identified in advance.

Figure 7:
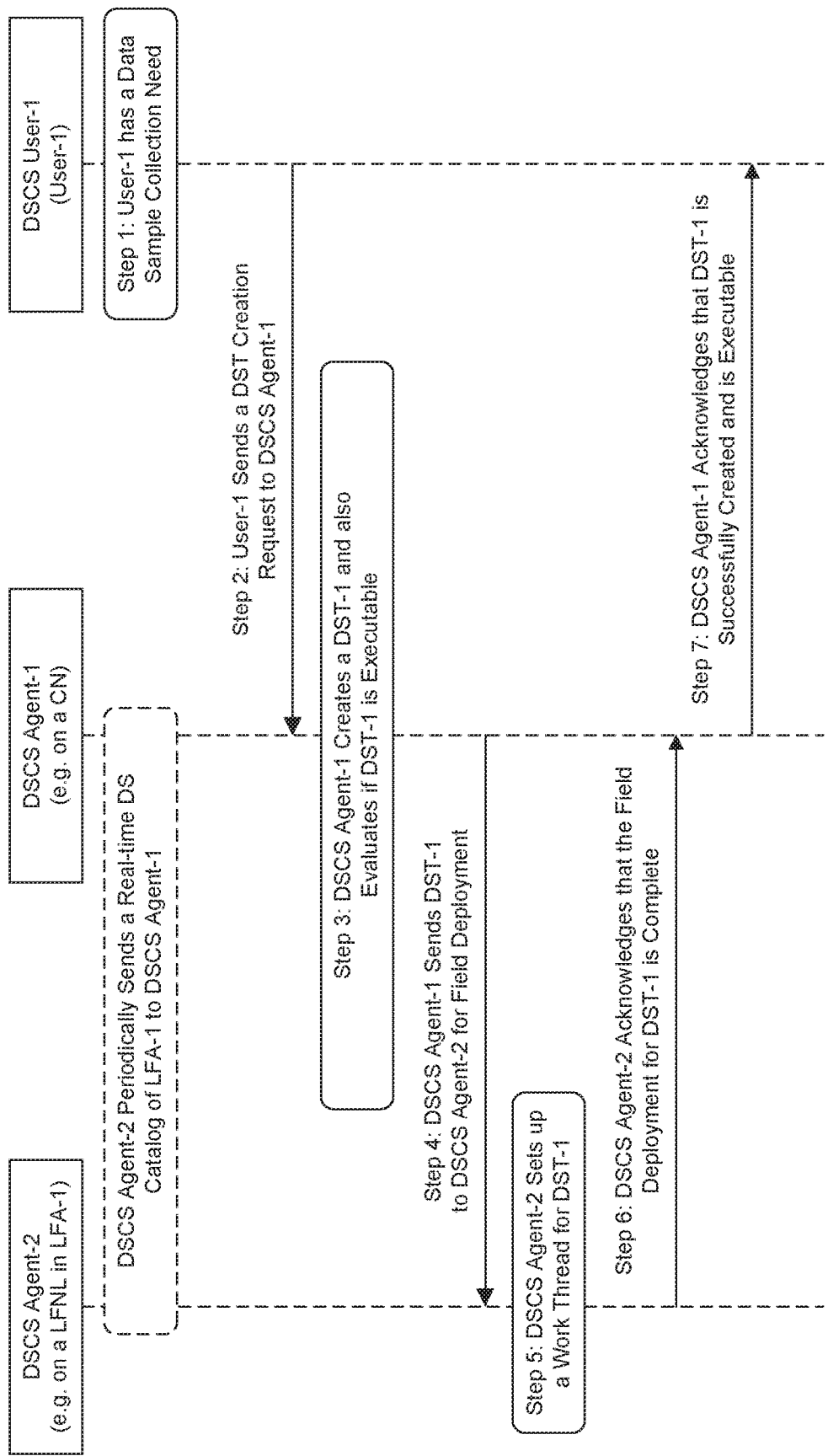
FIG. 7 shows a flow chart of an example procedure for DST creation with Proactive DS Identification in LFAs.

FIG. 7 illustrates an example procedure for the DST creation process with proactive DS identification in LFAs:

As a pre-condition, DSCS Agent-2 may periodically send a real-time DS catalog of LFA-1 to DSCS Agent-1.

Step 1 may be the same as step 1 of FIG. 6.

Step 2 may be the same as step 2 of FIG. 6.

At step 3, based on the information from User-1, DSCS Agent-1 creates a DST-1. DSCS Agent-1 may also need to configure some other information in DST-1, which is not provided by User-1, including "DST_Users" (e.g., User-1), "DST_Initiator" (e.g., User-1), "Creating_DSCS_Agent_ID". DSCS Agent-1 may also decide which LFAs (e.g., LFA-1 in this example) are involved in DST-1 and then the DSCS Agent-1 may check the latest DS catalog sent from the LFNL of the involved LFAs (e.g., DSCS Agent-2 in this example). Based on this catalog, if the desired DSs can be identified for all of the DEs in DST-1, DST-1 may be marked as an "executable" DST. After DST-1 has been fully configured, it may be sent to DSCS Agent-2 (which is the field manager of DST-1 in this example) for field deployment.

Step 4 may be the same as step 8 of FIG. 6.
Step 5 may be the same as step 9 of FIG. 6.
Step 6 may be the same as step 10 of FIG. 6.
Step 7 may be the same as step 11 of FIG. 6.

In a third example, DST creation through DE Re-use is discussed. In this example, when different DSTs have already been created on a DSCS agent, it can host or store those DSTs in a DST Repository. Accordingly, it is possible that for a new DST (e.g., DST-100) to be created, it may have overlapped DEs that are already included in one or more existing DSTs stored in the repository. As a result, those DEs can be re-used for creating a DST-100, which can save significant efforts for conducting DS identification process for those DEs in DST-100 that can be reused.

Figure 8:
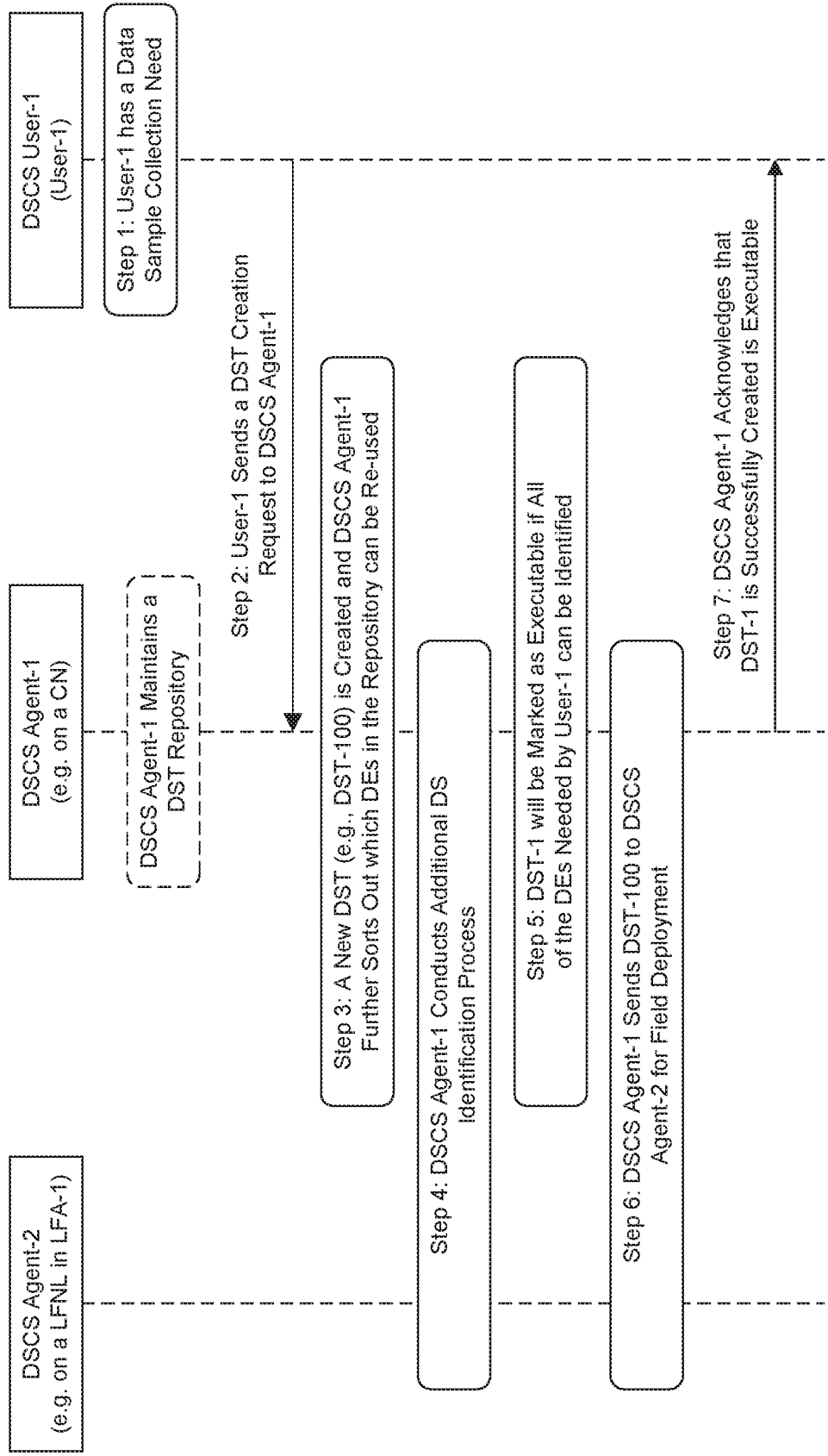
FIG. 8 shows a flow chart of an example procedure for DST creation through Re-Use.

FIG. 8 illustrates an example procedure for the DST creation process through DE re-use:

As a pre-condition, DSCS Agent-1 maintains a DST Repository, which stores all the existing DSTs that have already been created.

Step 1 may be the same as step 1 of FIG. 6.

Step 2 may be the same as step 2 of FIG. 6. Alternatively, DSCS Agent-1 may directly provide the access interface to DSCS users for them to check and query the existing DSTs stored in the repository. In this case, User-1 may first query the repository and sort out which DEs in the existing DSTs can be re-used. Then, in this step, when describing what the desired RDS User-1 would like to receive, it can directly indicate which DEs in the existing DSTs should be re-used.

At step 3, based on the information from User-1, DSCS Agent-1 creates a DST-100. If User-1 did not indicate which DEs should be re-used in step 2, then DSCS Agent-1 further searches the repository and sorts out which DEs in the existing DSTs can be re-used for the needed DEs in DST-100. In particular, since each DE has a number of characteristics and quality requirements when it is defined in a DST, it may be necessary to evaluate this information when evaluating whether one DE in an existing DST can be further re-used in another newly-created DST. For example, assuming that DST-100 created for User-1 has three DEs (e.g., a RDS of DST-1 has the following format: (DE-1, DE-2, DE-3, RDS_Context)), it is possible that in the DST Repository, DE-6 in an existing DST-1 can be reused as DE-2 in DST-100 while DE-27 in DST-3 can be used as DE-3 in DST-100 since all their characteristics and quality requirements are matched. All the detailed descriptions of those re-used DEs in the existing DSTs may be cloned to DST-100. In addition, the corresponding parameters may be configured for each of those DEs in DST-100. For example, the "Reused" parameter may be set with "True" for DE-2 and DE-3 of DST-100, and "Reused Info" parameter may be set with "DE-6 in DST-1" and "DE-27 in DST-3" for DE-2 and DE-3 in DST-100 respectively.

At step 4, DSCS Agent-1 may further conduct a DS identification process only for the DEs (e.g., DE-1 in DST-100) for which no available DEs in the existing DSTs can be re-used. This step includes steps 4-6 of FIG. 6. In the meantime, the "Reused" parameter should be set with "False" for DE-1 in DST-100. Note that, in this example shown in FIG. 8, only one LFA is involved, but in general, the DS identification process may also be involved in multiple LFAs by using the solution described below.

Step 5 may be the same as step 7 of FIG. 6.

Step 6 may be the same as steps 8-10 of FIG. 6. In particular, the work thread for DST-100 can be built by leveraging the existing work threads which were created by others and are responsible for generating RDS data for those re-used DEs in DST-100.

Step 7 may be the same as step 11 of FIG. 6.

In a fourth example, DST creation through R-DST is discussed. In the previous three examples, it was assumed that the raw data of DST-1 comes from a single LFA-1. In this example, a more advanced scenario is considered in which the raw data of DST-1 may come from multiple LFAs. In this case, DST-1 may be a R-DST, which may be split into multiple S-DSTs. In particular, after DST-1 is created (e.g., in step 3 of FIGS. 6-8), the DSCS Agent-1 may figure out which LFAs are involved and a S-DST may be further created for each of involved LFAs. In each S-DST, it includes the DEs only if the raw data of those DEs will be collected from the corresponding LFA of this S-DST.

Figure 9:
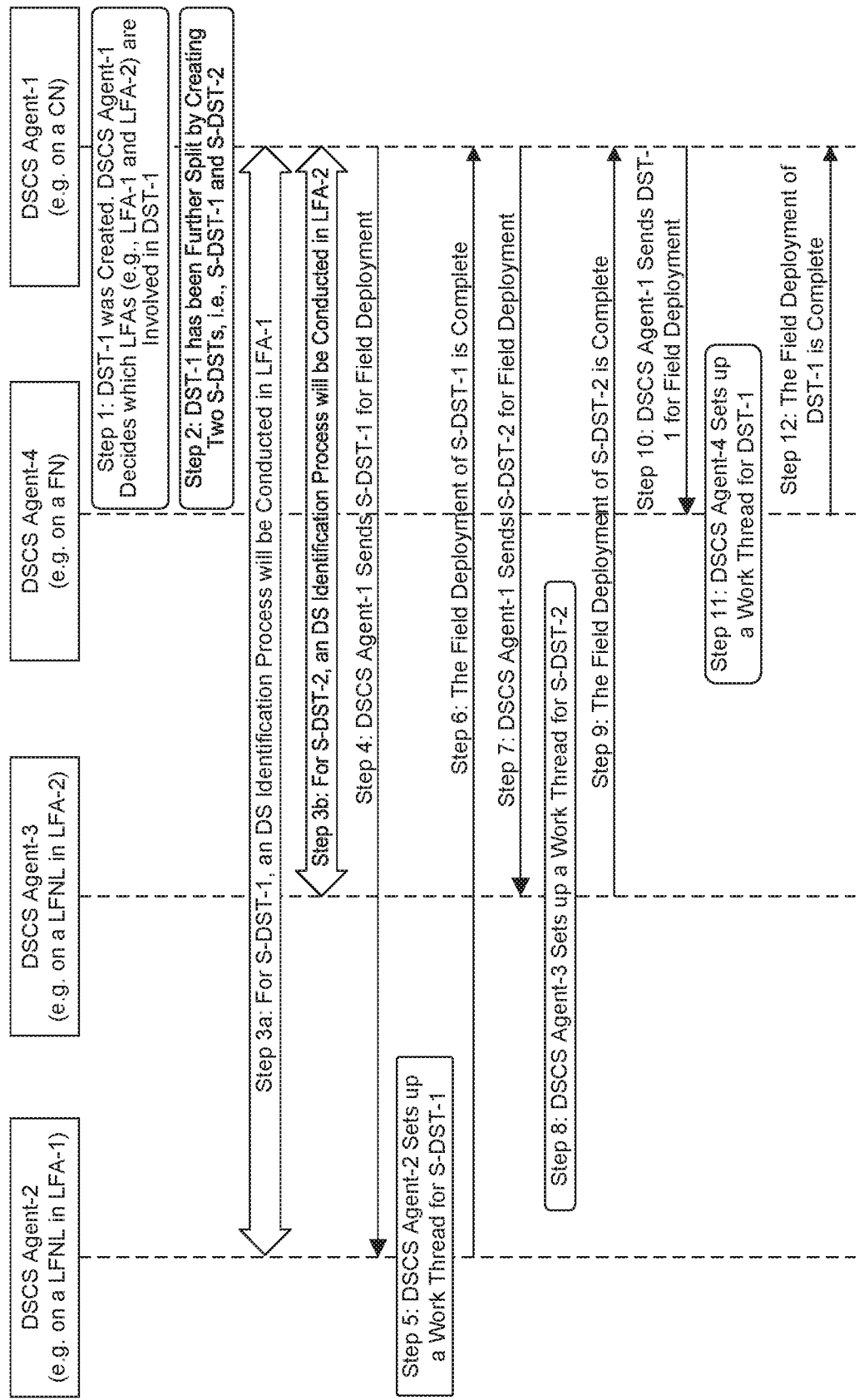
FIG. 9 shows a flow chart of an example procedure for DST creation using R-DST Splitting.

FIG. 9 illustrates an example procedure for the DST creation process with R-DST splitting:

At step 1, DSCS Agent-1 receives a DST creation request from User-1 and a DST-1 was created. This step corresponds step 3 of FIGS. 6-8. Next, DSCS Agent-1 also decides which LFAs (e.g., LFA-1 and LFA-2 in this example) are involved in this DST-1.

At step 2, DST-1 has been further split by creating two S-DSTs (e.g., S-DST-1 for LFA-1 and S-DST-2 for LFA-2). The DSCS Agent-1 configures the related parameters in DST-1, S-DST-1 and S-DST-2. For example, the parameters of S-DST-1 and S-DST-2 may have the following example settings:

DST_Initiator: Since the two S-DSTs are created based on their parent R-DST (e.g., DST-1), in which the initiator was User-1, then the DST initiator of those two S-DSTs may also be User-1.

DST_Users: For the same reason, the DST user of those two S-DSTs may also be User-1 in this example.

Type_of_DST: S-DST

Targeted_Region: For S-DST-1, its targeted region may be LFA-1 while the targeted region of S-DST-2 may be LFA-2.

Parent_DST_ID: the parent DST ID of both S-DST-1 and S-DST-2 may be DST-1.

Creating_DSCS_Agent_ID: DSCS Agent-1 in this example.

Data_Sample_Frequency: Same as the corresponding setting in DST-1.

DST_Status: Same as the corresponding setting in DST-1.

RDS_Production_Schedule: Same as the corresponding setting in DST-1.

RDS_Production_Trigger: Same as the corresponding setting in DST-1.

RDS_Context: Same as the corresponding setting in DST-1.

At steps 3a and 3b, for each S-DST, an DS identification process may be conducted in the corresponding LFA (step 3a for S-DST-1 and step 3b for S-DST-2). For this step, the methods disclosed in connection with FIGS. 6-8 may be fully re-used. For example, DSCS Agent-1 may send a DS identification request to the DSCS Agent-2 in LFA-1 or DSCS Agent-1 may re-use the DEs in the existing DSTs stored in a DST repository. Once DS identification processes are done, DSCS Agent-1 may further configure the related parameters in DST-1, S-DST-1 and S-DST-2 (e.g., to mark the statuses of those DSTs as executable) and is ready to deploy them to the field.

The following steps (e.g., steps 4-6 for LFA-1 and steps 7-9 for LFA-2) are similar to the DST field deployment related steps in the previous figures (e.g., Steps 8-10 of FIG. 6) with the addition of some further configurations. Alternatively, steps 4-6 for LFA-1 can be done simultaneously or after step 7-9 for LFA-2.

At step 4, DSCS Agent-1 sends S-DST-1 to DSCS Agent-2 in LFA-1 for field deployment.

At step 5, DSCS Agent-2 conducts configurations to set up a work thread for S-DST-1. Some further configurations regarding where the data are processed are also done based on the details as described in step 10.

At step 6, DSCS Agent-2 acknowledges that the field deployment of S-DST-1 is set up.

At step 7, DSCS Agent-1 sends S-DST-2 to DSCS Agent-3 in LFA-2 for deployment.

At step 8, DSCS Agent-3 conducts configurations to set up a work thread for S-DST-2. Some further configurations regarding where the data are processed may be performed based on the details as described in step 10.

At step 9, DSCS Agent-3 acknowledges that the field deployment of S-DST-2 is complete.

At step 10, DSCS Agent-1 sends DST-1 to DSCS Agent-4 on FN for deployment. When a DST-1 has been split into multiple S-DSTs, it may need to be decided how the data processing should be conducted during RDS production.

In one example, DST-1 may be a R-DST and its in-field manager may be the DSCS Agent-4 on FN. In particular, there may be no DS identification process initiated for DST-1 since DST-1 has already been split into two S-DSTs and DS identification may be conducted for S-DST-1 and S-DST-2. DSCS Agent-4 may only be involved in certain data processing operations and the final RDSs of DST-1 may be generated at DSCS Agent-4.

In another example, the in-field managers may be DSCS Agent-2 and DSCS Agent-3 for S-DST-1 and S-DST-2, respectively. Those in-field mangers may be responsible for the DS identification process for S-DST-1 and S-DST-2 in the corresponding LFAs (e.g., LFA-1 and LFA-2) respectively. However, for a specific DE in a S-DST, conducting RDS production processes for DE-1 may comprise one or more of the following three cases (e.g., Case_1, Case_2 and Case_3):

In Case_1, Data_Processing_Operation parameters of a DE have been set in a S-DST and the in-field manager of this S-DST-1 may also be the location where the raw data of this DE is "fully processed". This means that the in-field manager may generate the incomplete RDSs that only include this DE. After that, the in-field manager of this S-DST may send those incomplete RDSs to the in-field manager of its parent R-DST, where the final RDSs of the R-DST may be produced by assembling those incomplete RDSs collected from different LFAs.

Figure 10:
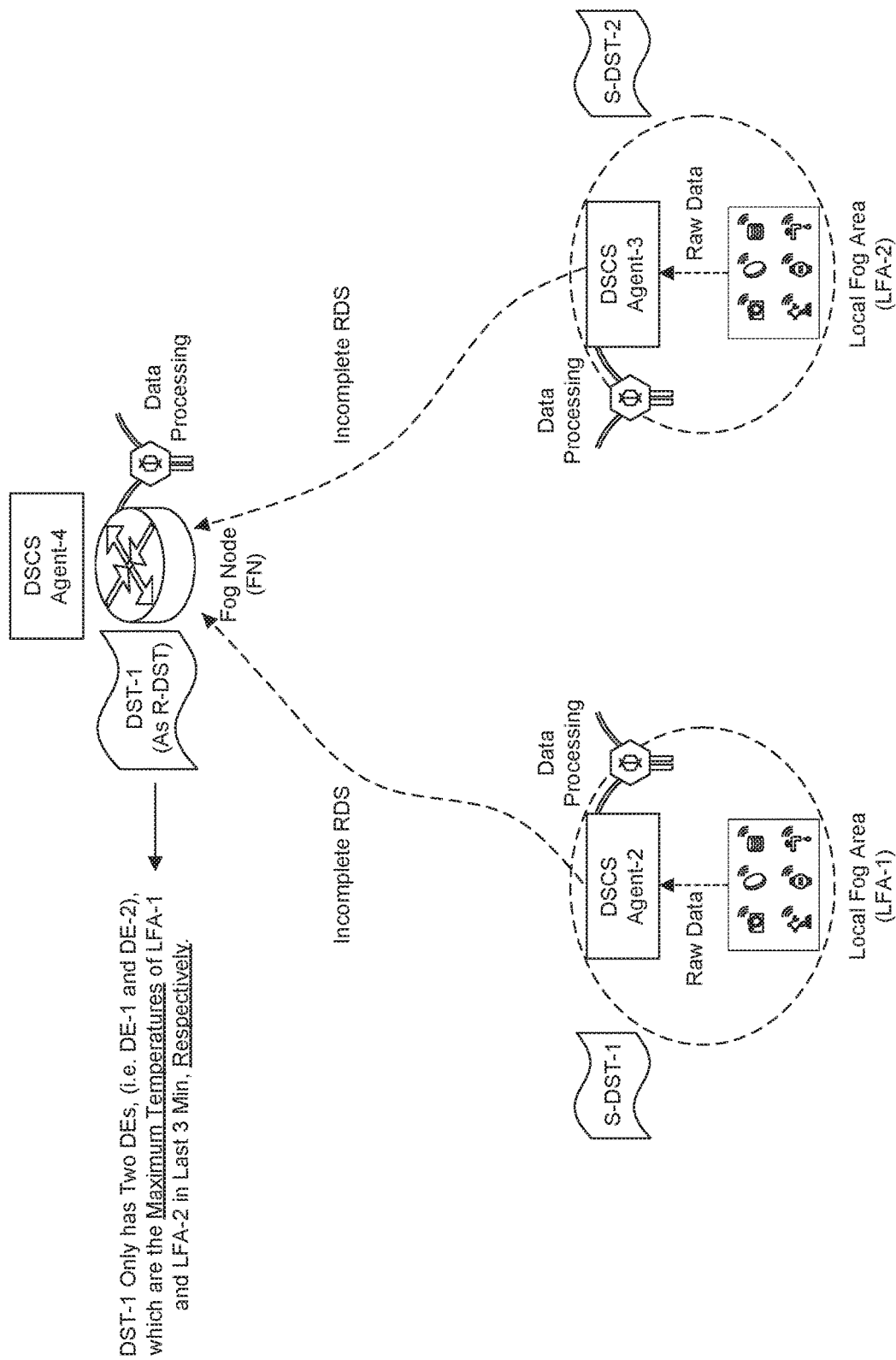
FIG. 10 shows a first example configuration for an RDS production.

FIG. 10 shows an example implementation for Case_1. In this example, the DST-1 has two DEs (e.g., DE-1 and DE-2). For example, a RDS of DST-1 has the form of (DE-1, DE-2, RDS_Context). In particular, DE-1 and DE-2 are the maximum temperature of LFA-1 and LFA-2 in the last 3 minutes respectively. Accordingly, DST-1 has been split into two S-DSTs (e.g., S-DST-1 and S-DST-2). Those two S-DSTs have been deployed on the DSCS Agent-2 in LFA-1 and DSCS Agent-3 in LFA-2. The R-DST (e.g., DST-1 itself) is deployed on the DSCS Agent-4 on a higher-level FN. Since DE-1 and DE-2 may only be used to calculate the maximum temperature in the respective LFAs, then the raw data collected from LFA-1 and LFA-2 can be fully processed by DSCS Agent-2 and DSCS Agent-3, respectively. In other words, the maximum temperature in the respective LFAs can be directly calculated at DSCS Agent-2 or DSCS Agent-3. Then, DSCS Agent-2 may send the incomplete RDS (e.g., the fully processed data for the DE-1 part) to DSCS Agent-4 (same as DSCS Agent-3). Finally, DSCS Agent-4 may produce each single RDS of DST-1 by assembling one piece of data from DSCS Agent-2 and one piece of data from DSCS Agent-3 based on the information in RDS_context.

In Case_2, the Data_Processing_Operation parameters of a DE have been set in a S-DST and its in-field manager can conduct some data processing on the raw data. However, the raw data can only be "partially processed." After that, the in-field manager of this S-DST may send the partially-processed data to the in-field manager of its parent R-DST, from where the final RDSs may be produced by further processing the partially-processed data collected from different LFAs.

Figure 11:
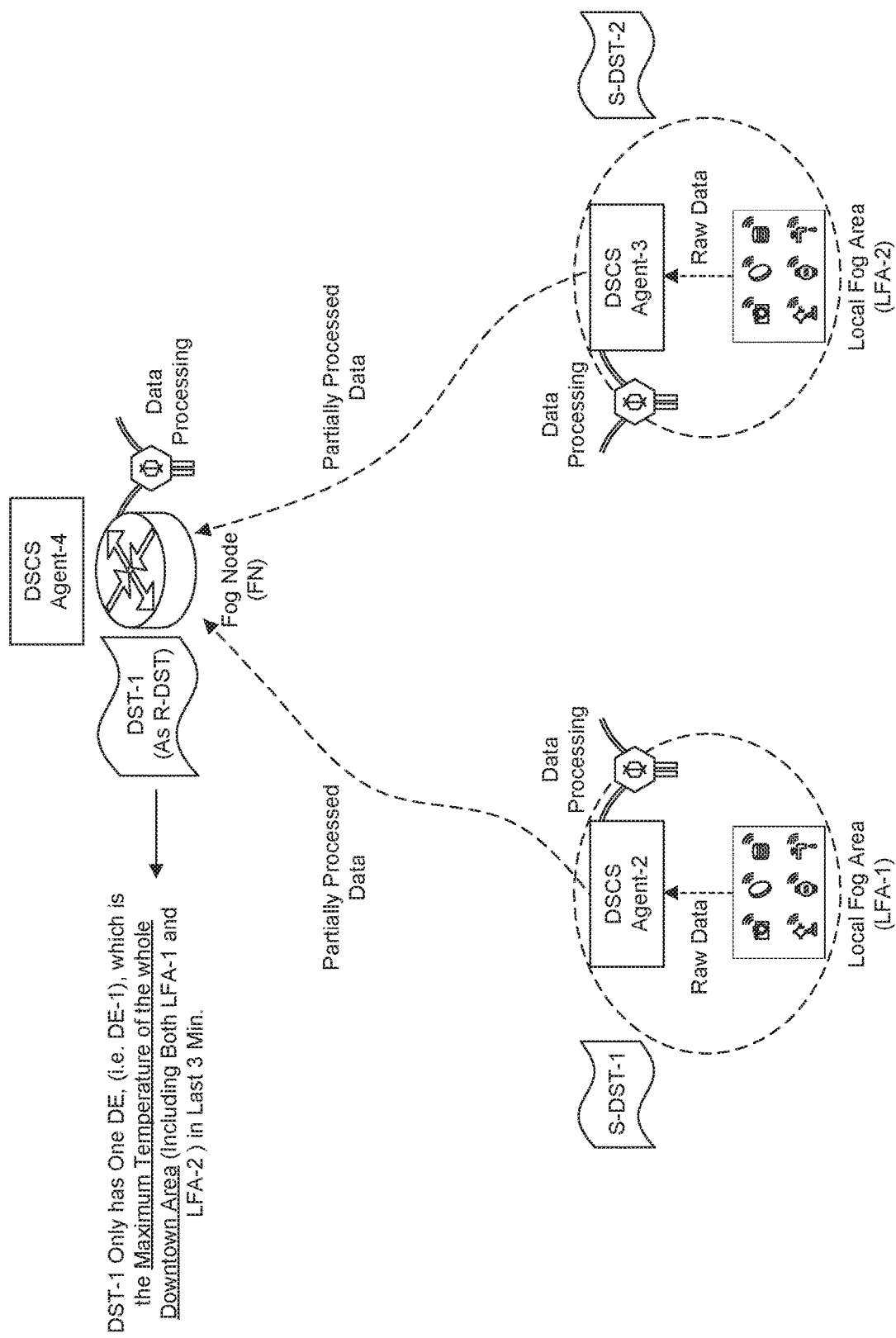
FIG. 11 shows a second example configuration for an RDS production.

FIG. 11 shows an example implementation for Case_2. In this example, the DST-1 only has one DE (e.g., DE-1) and a RDS of DST-1 has the form of (DE-1). In particular, DE-1 is the maximum temperature of the whole downtown area (which are covered by LFA-1 and LFA-2) in the last 3 minutes. In this case, DST-1 has also been split into two S-DST (e.g., S-DST-1 and S-DST-2). Those two S-DSTs have been deployed on the DSCS Agent-2 in LFA-1 and DSCS Agent-3 in LFA-2. The R-DST (e.g., DST-1 itself) is deployed on the DSCS Agent-4 on a higher-level FN. Since DE-1 is to calculate the maximum temperature for the whole area covering both LFA-1 and LFA-2, the raw data collected from LFA-1 and LFA-2 can only be partially processed by DSCS Agent-2 and DSCS Agent-3, respectively. For example, DSCS Agent-2 can process the raw data collected from LFA-1, which can only calculate the maximum temperature of LFA-1, which is a partially-processed data since this is not the maximum temperature for the whole area (same for DSCS Agent-3). At DSCS Agent-4, further data processing may be needed based on the collected partially-processed data. For example, given two maximum temperature data collected from LFA-1 and LFA-2 during the same time interval, the largest one among those two values may be the final maximum temperature for the whole area, which may be the fully processed data for DE-1.

In Case_3, the Data_Processing_Operation parameters of a DE have not been set in a S-DST, and its in-field manager may simply forward all the raw data of this DE to the in-field manager of its parent R-DST, which could be a DSCS agent on a higher-level fog node for example. In other words, all the raw data may be processed at the in-field manager of the R-DST.

Still using the same example for Case_2 as shown in FIG. 11. This time, the DSCS Agent-2 and Agent-3 may not have sufficient data processing capability. Accordingly, the Data_Processing_Operation parameters of DEs in S-DST-1 and S-DST-2 may not be set. Through such a configuration, DSCS Agent-2 and Agent-3 may not be involved in any data processing. Instead, they may directly forward all the raw data to DSCS Agent-4. DSCS Agent-4 may be the one conducting all the data processing and produce RDSs for DST-1.

In general, DSCS Agent-4 can be hosted on any node higher than LFNs in the fog hierarchy. In one example, DSCS Agent 4 can be even at the root CN node (In this case, DSCS Agent-4 is same as DSCS Agent-1). Overall, the benefit of deploying DSCS Agent-4 to the edge as much as possible is to enable local/distributed data processing in order to save potential processing and communication overhead.

Returning to FIG. 9:

At step 11, DSCS Agent-4 on a FN conducts configurations to set up a work thread for DST-1.

At step 12, DSCS Agent-4 acknowledges that the field deployment of DST-1 is complete. After this step, the DSCS Agent-1 can acknowledge to the user of DST-1 that DST-1 was successfully created and is executable.

Note that FIGS. 9-11 used an example scenario in which the DSCS users are from the cloud side while the IoT raw data collection and processing are done in the LFAs. It is understood that additional or alternative scenarios may be used, in which users may interact directly with LFAs. For example, a user sitting in a mobile vehicle may want to see some real-time city weather and pollution analytics/monitoring charts. In this case, it may directly send a request to the DSCS agent hosted on a road-side unit in order to collect desired RDSs. The user may send their RDS data sample collection request directly to the DSCS Agents in the FLAs.

It is understood that no matter which DST creation approach is adopted, DS identification is an important process which may be to identify desired DSs for a DST. A DST may be in an executable status only if the desired DSs can be identified for all the DEs in this DST. In particular, for a given executable DST, the DSCS agent may need to keep tracking whether all the identified DSs are still available and/or meet the desired quality requirements considering the fact that there could be dynamic changes on the availabilities of DSs in the field. If not, an executable DST may become an inexecutable DST and a new DS identification may need to be conducted.

A number of solutions are disclosed for the DST update and deletion process. Note that if a DST (as well as its related S-DSTs) is to be updated/deleted, this DST may first need to be in "executable" status, not in "activated" status. In other words, an activated DST may first need to be de-activated before conducting any DST update/deletion process on this DST.

Figure 12:
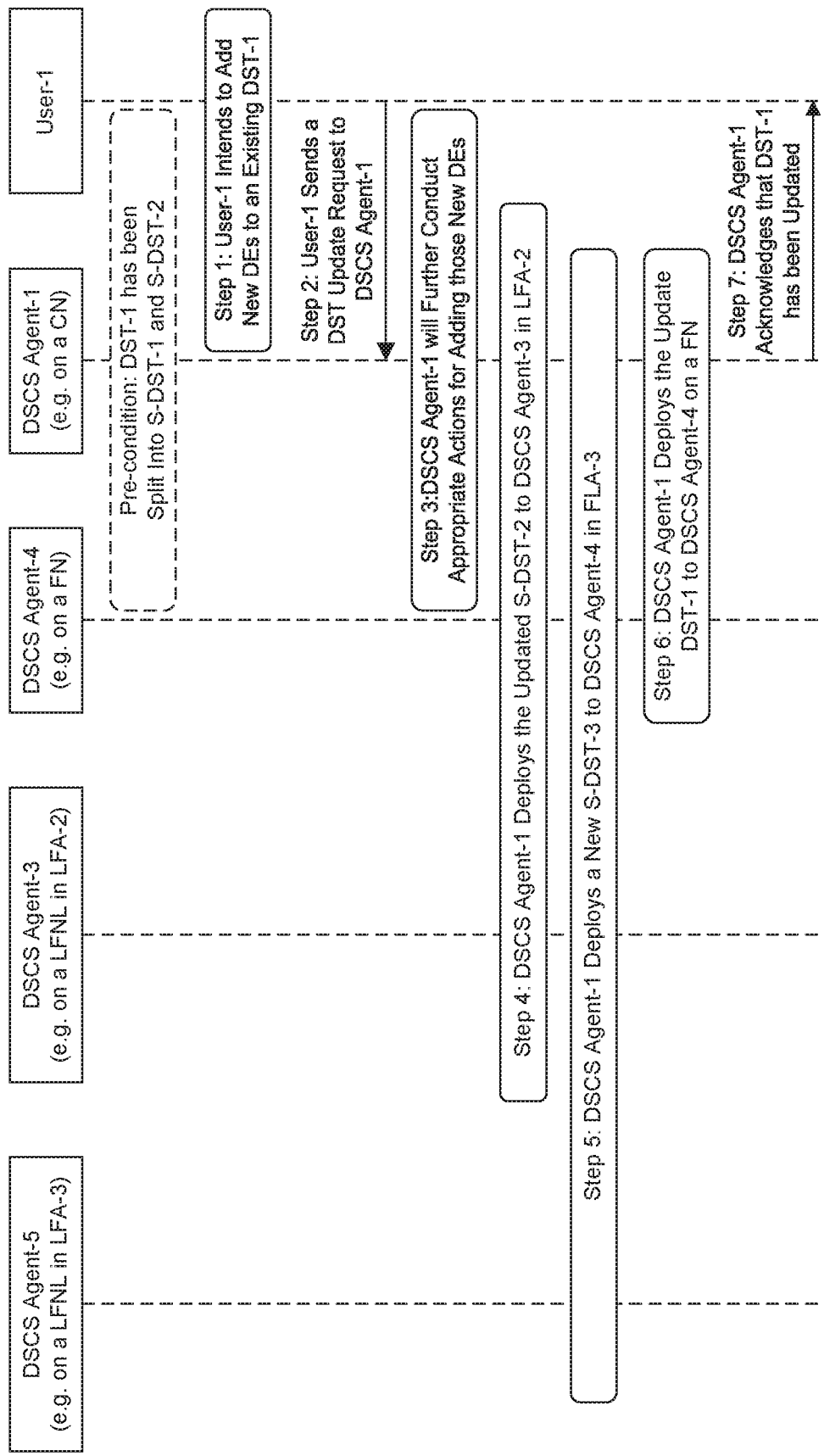
FIG. 12 shows a flow chart of an example procedure for DST update for adding one or more new data elements (DEs) to an existing DST.

FIG. 12 illustrates an example procedure for a DST update process in order to add one or more new DEs to an existing DST (e.g., DST-1). Note that this example can also be used for updating some information in an existing DST.

As a pre-condition, DST-1 has been created by User-1 and a RDS of DST-1 has two DEs (e.g., DE-1 and DE-2). DST-1 has been split into two S-DST (e.g., S-DST-1 and S-DST-2), which were deployed on DSCS Agent-2 in LFA-1 and DSCS Agent-3 in LFA-2 (which is not shown in FIG. 12). In particular, S-DST-1 is responsible for producing RDSs related to DE-1 part while S-DST-2 is responsible for producing RDS related DE-2 part.

At step 1, due to a new need, User-1 intends to add one or more new DEs to the existing DST-1. For example, in addition to the existing DE-1 and DE-2, User-1 also wants to add DE-3 and DE-4 to DST-1. In other words, a RDS of the updated DST-1 may have the form of (DE-1, DE-2, DE-3, DE-4, RDS_Context).

At step 2, User-1 sends a DST update request to DSCS Agent-1 along with the necessary information. In particular, the message may include the following related parameters (as shown for example in Table 1):

DST_ID: this parameter indicates which existing DST is to be updated; and

Targeted_Region: if the new DEs to be added leads to the change of a targeted region, this parameter may also need to be updated. For example, in addition to the LFA-1 and LFA-2 that were already included in this parameter in DST-1, a new LFA-3 may be involved since part of the new DEs to be added may be collected from LFA-3.

Each of the DEs to be added may have the following parameters which define the details for this DE:

Raw_Data_Type;

Unit;

Data_Processing_Operation;

Customized_Processing_Details; and

Quality_Requirements.

Instead of adding new DEs, User-1 may just want to update some information in an existing DST (e.g., not adding new DEs). In this case, the message may include the following related parameters:

DST_ID: this parameter indicates which existing DST is to be updated; and

New_Parameter_Values: this includes the parameters to be updated and their new values.

At step 3, DSCS Agent-1 first checks whether DST-1 (and its related S-DSTs) is in an "activated" status. If so, DSCS Agent-1 may first need to de-activate DST-1 (and its related S-DSTs). Then, based on different application scenarios, DSCS Agent-1 may further conduct appropriate actions for adding those new DEs. In general, there may be two example cases as detailed below:

In Case_1, DST-1 can be updated for the following scenarios:

DST-1 was created under the Scenario 1 as discussed above, in which DSCS agents in LFAs only start to conduct DS identification when there is a DST creation request. In this case, Steps 3-6 of the procedure shown in FIG. 6 for DS identification may be conducted for the new DEs to be added;

DST-1 was created under the Scenario 2 as discussed above, in which the DSCS agents in LFAs can proactively conduct DS identification even if there is no DST creation request. In this case, the Step 3 of the procedure shown in FIG. 7 for DS identification may be conducted for the new DEs to be added;

DST-1 was created under the Scenario 3 as discussed above, in which a DST repository exists and one or more DEs in the existing DSTs may potentially be re-used. In this case, the Steps 3-5 of the procedure shown in FIG. 8 for DS identification may be conducted for the new DEs to be added; and DST-1 was created under the Scenario 4 as discussed above, in which a DST can be split into multiple S-DSTs. In this case, the Steps 3 of the procedure shown in FIG. 9 for DS identification may be conducted for the new DSs to be added. Note that, the remaining steps after Step 3 shown in FIG. 12 are mainly based on this scenario. As an example, it is assumed that the raw data for DE-3 can be collected from LFA-2. Accordingly, the existing S-DST-2 may be updated by incorporating the newly-added DE-3, and the updated S-DST-2 may also need to be deployed to the in-field manager of S-DST-2. In the meantime, a new S-DST-3 may be created since the raw data for DE-4 can be collected from a new LFA-3. Accordingly, the S-DST-3 may be sent to DSCS Agent-5 in LFA-3 for field deployment. In addition, the DST-1 itself may also need to be updated since currently DST-1 has been split into three S-DSTs and the updated DST-1 may also need to be sent to DSCS Agent-4 for field deployment.

In Case_2, DST-1 cannot be updated. It is worth noting that DST-1 may not be updated due to the DST update request from User-1. It may be possible that DST-1 may be currently being used by more than one user (e.g., not just by User-1). Accordingly, if DST-1 is modified without others' awareness, the RDSs produced by the updated DST-1 may not be understood by the users other than User-1. In this case, before doing any actions as shown in Case_1, the following actions may first need to be performed:

The DSCS Agent-1 may need to check with all the users of DST-1 as indicated in the DST_Users parameter of DST-1. The DST-1 can be updated only if all the users agrees to update DST-1; and If not all of the users of DST-1 agrees to update DST-1, this update request may be rejected. Alternatively, another advanced solution is to create a new DST-2, which may be the exact clone of DST-1 except that the DST_Users parameter of DST-2 may only include User-1 (the User-1 may also be deleted from the user list of DST-1). Then, the new DEs may be added into DST-2. With this newly-created DST-2, DSCS Agent-1 can further split DST-2 into multiple S-DSTs. Accordingly, when deploying those S-DSTs of DST-2, their corresponding work threads may be set up by the in-field managers of related LFAs. For a given S-DST-X in DST-2, depending on specific implementations, the work thread of S-DST-X in DST-1 may be fully re-used and no new work thread may be needed (since those two S-DSTs are exactly same). However, if S-DST-X in DST-2 has new DEs compared to S-DST-X in DST-1, a new work thread may be built based on the existing work thread of S-DST-X in DST-1.

Instead of adding new DEs, User-1 may just want to update some information in an existing DST (e.g., not to add one or more DEs). In this case, the above solutions can also be re-used. For example, if User-1 intends to update the Data_Sample_Frequency parameter of DST-1 or the Quality_Requirements of DE-1 in DST-1, it may also trigger new DS identification process to be conducted in order to be compliant to the new values of those parameters. Once those parameters get updated, the updated DST-1 may be re-deployed, such that the corresponding work thread of DST-1 may start to work according to the latest/updated DST-1. However, if the updates on those parameters cannot be done due to the fact that DST-1 is currently shared by other users, the update request may be rejected or new DST(s) may be created, which includes the new values of those parameters as discussed above.

When adding one or more new DEs in connection with Case_1, Steps 4-6 illustrate the steps assuming DST-1 got updated by adding one or more DEs during Step 3:

At step 4, DSCS Agent-1 deploys the updated S-DST-2 to DSCS Agent-3 in LFA-2, in which one or more newly-added DEs were included. The Steps 7-9 in FIG. 9 may be reused.

At step 5, DSCS Agent-1 deploys a new S-DST-3 to DSCS Agent-5 in LFA-3.

At step 6, DSCS Agent-1 deploys the updated DST-1 to DSCS Agent-4 on a FN, in which all of the newly-added DEs were included. Similarly, the Steps 10-12 in FIG. 9 may be reused.

For Case 2, if DST-1 cannot be updated and a new DST-2 is created during Step 3, what may need to be done is to deploy the newly-created DST-2 as well as its related S-DSTs to the appropriate LFAs or FNs. In this case, a DST update process is transformed to a DST creation process.

At step 7, DSCS Agent-1 acknowledges that DST-1 has been updated. Or if a new DST-2 is created during Step 3, DSCS Agent-1 may inform User-1 that the new DST is created for serving its new need. If previously DST-1 was in "activated" status before Step 3, DST-1 may be reactivated.

A DST update process for deleting one or more DEs at an existing DST or deleting a whole DST is disclosed. Note that the solution disclosed can be applied to the different scenarios as discussed during the DST creation process.

Figure 13:
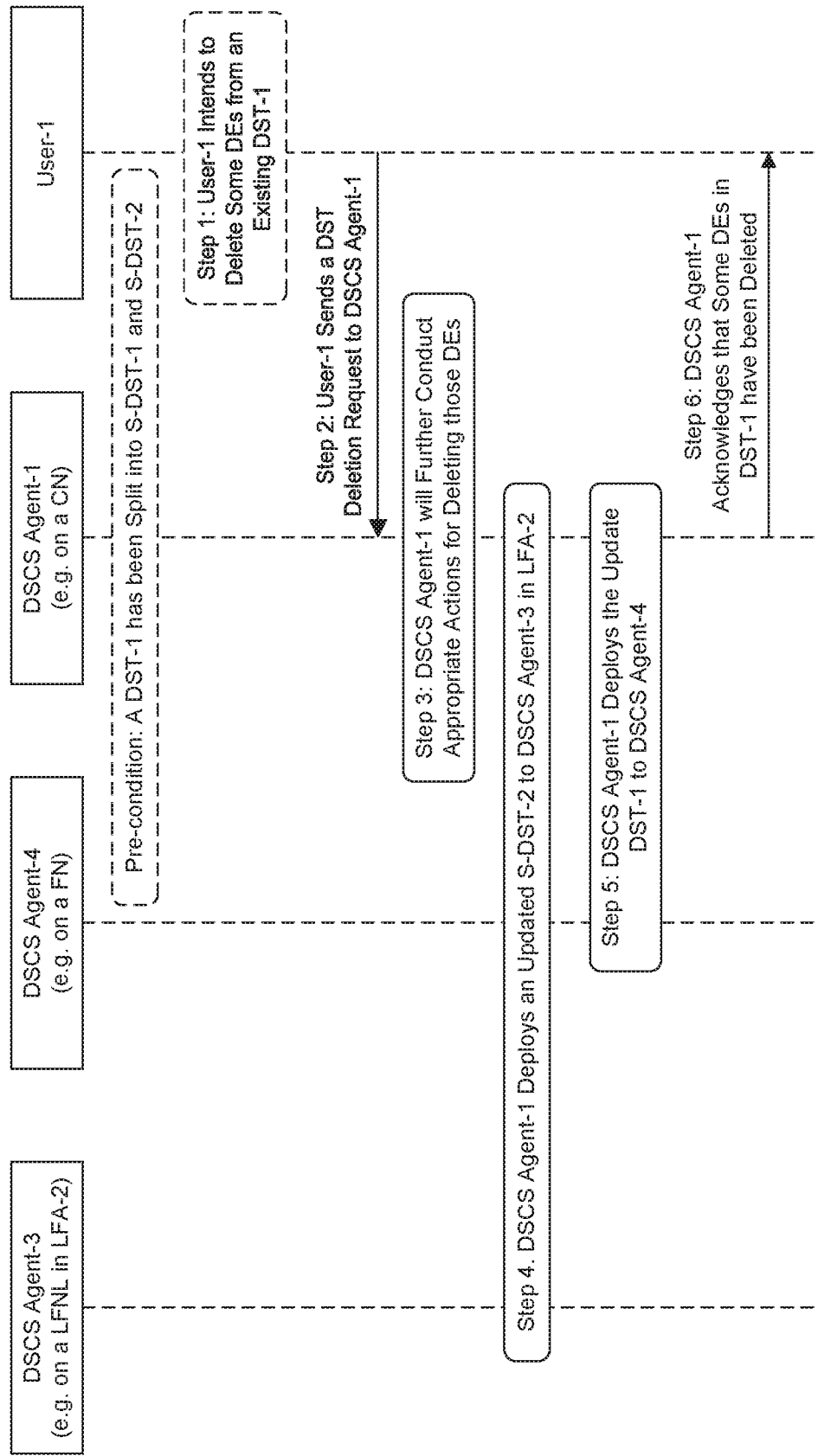
FIG. 13 shows a flow chart of an example procedure for DST update or deleting one or more DSTs or deleting an entire DST.

FIG. 13 illustrates an example procedure for the DST deletion process in order to delete one or more DEs at an existing DST (this procedure can also be used for deleting a whole DST) and the detailed descriptions are discussed as follows:

As a pre-condition, it is assumed that DST-1 has been created by User-1 and the RDS of DST-1 has four DEs (e.g., DE-1, DE-2, DE-3 and DE-4). DST-1 has been split into two S-DSTs (S-DST-1 and S-DST-2), which were deployed on DSCS Agent-2 in LFA-1 and DSCS Agent-3 in LFA-2. In particular, S-DST-1 is responsible for producing RDS for DE-1 while S-DST-2 is responsible for producing RDS for DE-2, DE-3, and DE-4

(the complete RDSs may be assembled by DSCS Agent-1 on a FN). DST-1 and S-DST-2 will be the major focus in the example shown in FIG. 13.

At step 1, due to a new need, User-1 intends to delete one or more DEs from an existing DST-1. For example, User-1 wants to delete DE-3 and DE-4 from DST-1.

At step 2, User-1 sends a DST deletion request to DSCS Agent-1 along with the necessary information. In particular, the message may include the following related parameters (as shown for example in Table 1):

DST_ID: this parameter indicates which existing DST is to be updated; and

Deletion_List: this is a list of DEs to be deleted. If the whole DST is to be deleted, this parameter may be set to "ALL".

At step 3, DSCS Agent-1 first checks whether DST-1 (and its related S-DSTs) is in "activated" status. If so, DSCS Agent-1 may first need to de-activate DST-1 (and its related S-DSTs). Based on different application scenarios, DSCS Agent-1 may further conduct appropriate actions for deleting those DEs. In general, for a given DE in the deletion list, it may have the following three cases:

For Case_1, a DE (e.g., DE-3) in DST-1 may be deleted and the corresponding actions need to be taken in the corresponding LFA. This happens in the following possible scenarios:
1. User-1 is the only user of DST-1 and in the meantime DE-3 has never been re-used in any other DSTs; or
2. User-1 is the only user of DST-1 and this DE-3 is a re-used DE which was initially created in another DST. In this case, it may be necessary to update the DST-1 and S-DST-2 by deleting DE-3 and deploy the updated S-DST-2 to DSCS Agent-3 in LFA-2.

For Case_2, a DE (e.g., DE-4) in DST-1 cannot be deleted and a new DST is created. This happens in the scenario where DST-1 may be currently used by more than one users (e.g., not just by User-1). Accordingly, if DST-1 is modified without others' awareness, the RDSs produced by the updated DST-1 cannot be understood by the users other than User-1. In this case, before doing any actions as shown above, the following actions need to be performed first:

The DSCS Agent-1 needs to check with all the users of DST-1 as indicated in the DST_Users parameter of DST-1. The DST-1 can be updated for deleting those DEs only if all the users agrees to update DST-1.

If not all of the users of DST-1 agree to delete DEs from DST-1, the deletion request may be rejected. Alternately, another solution is to create a new DST-2, which may be the exact clone of DST-1 except that the DST_Users parameter of DST-2 may only include User-1 (the User-1 may also be deleted from the user list of DST-1). Then, the related DEs may be deleted from DST-2. With this newly-created DST-2, DSCS Agent-1 can further split DST-2 into multiple S-DSTs and send them for field deployment.

For Case_3, DE in DST-1 cannot be deleted. This happens in the scenario where User-1 is the only user of DST-1 but this DE has been re-used in other DSTs. In this case, no action needs to be done specifically for this DE.

Overall, DSCS Agent-1 may check each of the DEs to be deleted. If any one of them fall into Case_2 as mentioned above, then a new DST may be created. Otherwise, if all the DEs to be deleted only fall into Case_1 or Case_3, the original S-DST-2 may be modified accordingly by conducting appropriate actions for each of those DEs to be deleted.

For the case where User-1 wants to delete the whole DST-1 (e.g., deleting all the DEs), the whole DST (as well as the corresponding work threads) may be really deleted if all the DEs fall into Case_1. Otherwise, it may follow the solutions as mentioned in Case_2 and Case_3 above.

Steps 4-5 illustrates the steps assuming DST-1 (as well as S-DST-2) were updated during Step 3.

At step 4, DSCS Agent-1 sends the updated S-DST-2 to DSCS Agent-3 in LFA-2 for field deployment, and the existing work thread of S-DST-2 may also be modified such that the RDS data produced for S-DST-2 may not include the deleted DEs.

At step 5, DSCS Agent-1 sends the updated DST-1 to DSCS Agent-4 on a FN for field deployment.

If a new DST-2 was created during Step 3, it may need to deploy DST-2 as well as its related S-DSTs to the appropriate LFAs and all the previous procedures for DST creation process can be re-used. In other words, in this case, a DST deletion process is internally transformed to a DST creation process.

At step 6, DSCS Agent-1 acknowledges that one or more of DEs in DST-1 have been deleted. Or if a new DST-2 is created during Step 3, DSCS Agent-1 may inform User-1 that the new DST is created based on its need.

It is worth noting that for a given DST-1, User-1 may want to add one or more new DEs while deleting one or more existing DEs at the same time. For such a case, the procedures as disclosed in FIG. 12 and FIG. 13 can be integrated together. For example, for the Step 2 of in FIG. 12 and FIG. 13, User-1 can directly indicate that it needs to not only add one or more DEs to DST-1 but also delete one or more DEs from DST-1. After receiving such a DST update request, DSCS Agent-1 can combine the actions to be done in FIG. 12 and FIG. 13 for both adding DEs and deleting DEs. In this way, User-1 can just send out one DST update request, and DSCS Agent-1 can complete all the needed actions as introduced in FIG. 12 and FIG. 13.

Figure 14:
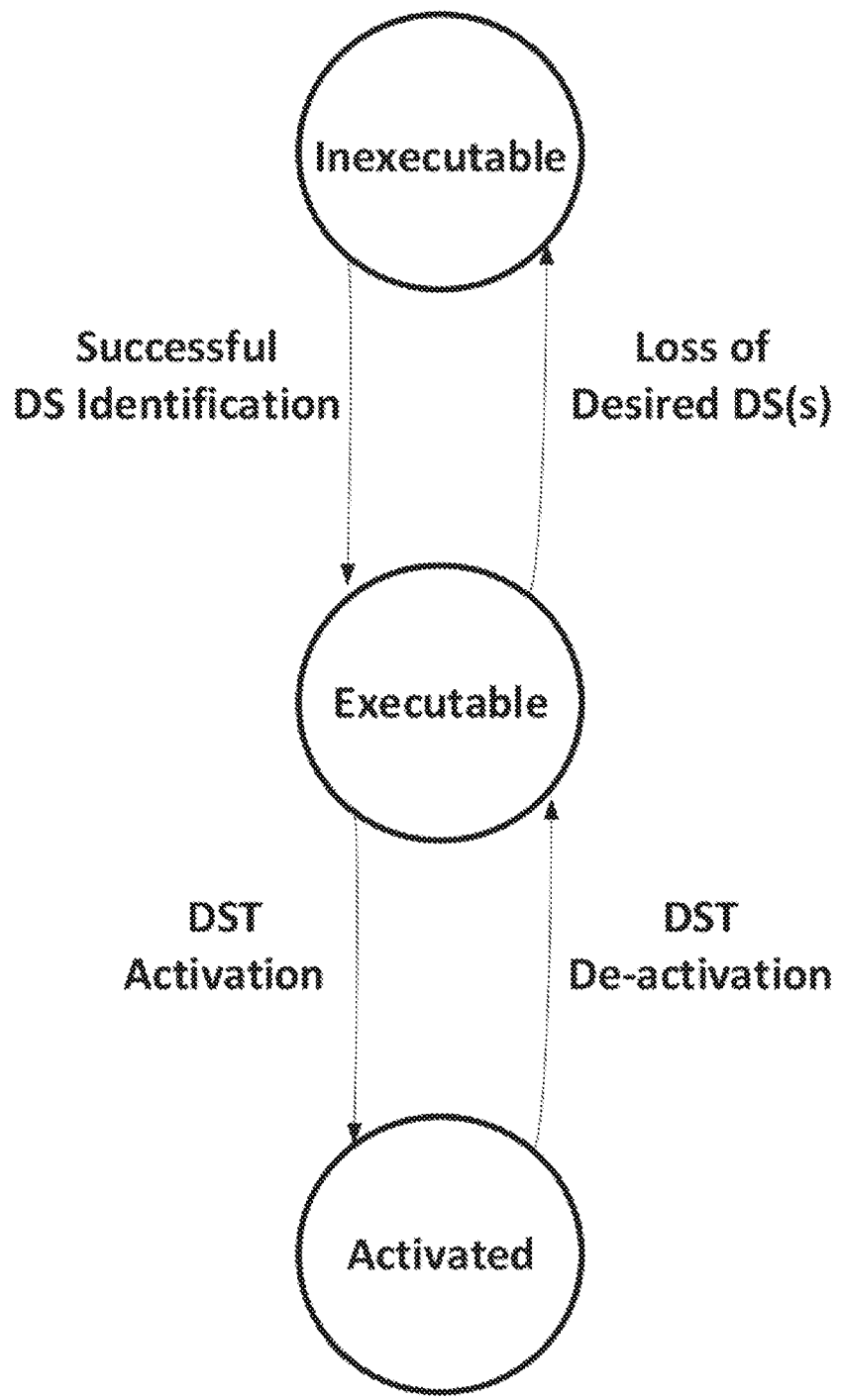
FIG. 14 shows a block diagram of an example State Machine Model of DST Status.

For a created DST, after it is deployed to its in-field manager, it still may not be an activated DST. In particular, the RDS production process of a DST is not started until this DST is activated. FIG. 14 shows the state machine model of DST status. For example, when a DST was created, it may be in an "inexecutable" status. If the DS identification can be done successfully for this DST, it may be changed to the "executable" status. Similarly, for an executable DST, if any of its desired DS(s) gets lost or is not available anymore, this DST may be back to "inexecutable" status and a further DS identification may need to be conducted. In the meantime, through the DST activation operation, an executable DST may be in "activated" status, which means the real RDS production starts.

In general, there are a number of ways to activate a DST, which are listed as follows (which is not an exhaustive list):
(1) A given DST can be activated based on the parameter as indicated in the "RDS_Production_Schedule" parameter. As an example shown in FIG. 6, once DST-1 is deployed to DSCS Agent-2 in LFA-1, this agent may get to know the RDS production schedule for DST-1, accordingly DSCS Agent-2 may activate the corresponding work thread of DST-1 based on this schedule. In the meantime, every time a DST is activated or de-activated, the DST_Status parameter of DST-1 hosted on the Creating_DSCS_Agent (e.g., the DSCS Agent-1 in CN as shown in FIG. 6) may also need to be updated in order to reflect its latest status.

In the meantime, if a given DST has been split, the above process may also be conducted accordingly. As another example shown in FIG. 10, a DST-1 has been split into two S-DSTs (e.g., S-DST-1 and S-DST-2). Accordingly, all the corresponding work threads (e.g. those for DST-1 on FN, S-DST-1 on a LFNL in LFA-1 and S-DST-2 on a LFNL in FLA-2) may also be activated or de-activated based on the "RDS_Production_Schedule" parameter in the parent R-DST (e.g., DST-1).

In this case, when a user is creating a DST, it can directly provide the its RDS sending address when sending the DST creation request (it may then be included in the "RDS_Sending_Address_List" parameter). Later, if another user also wants to re-use this whole DST, this new user may just send a request to DSCS agent by adding its ID to the "DST_Users" of this DST, and also add the its own RDS sending address to the "RDS_Sending Address_List" parameter.

(2) A given DST can be activated based on a signal from a user. As an example shown in FIG. 6, it is possible that the "RDS_Production_Schedule" parameter may not set with any value. Accordingly, User-1 may send a trigger request to DSCS Agent-1, which may further forward the trigger request to DSCS Agent-2 in LFA-1 in order to activate the work thread of DST-1. Alternatively, DSCS Agent-1 itself may send a trigger request to DSCS Agent-2 based on certain events as specified in the RDS_Production_Trigger parameter. For example, one trigger could be that as long as any user of DST-1 is logged into the system, DST-1 may be activated. The de-activation may be done in a reverse way.

In the case where a DST is shared by multiple users as indicated in DST_Users parameter, it may have the following mechanisms to activate or de-activate a DST:

For a given DST-1 that currently is not activated (as indicated by the "DST_Status" parameter as included in Table 1), a User-1 may directly activate this DST-1 by sending a trigger as mentioned above. In particular, this user may add its RDS sending address to the "RDS_Sending_Address_List" parameter as shown in Table 1.

Later, if another User-2 of DST-1 also wants to receive RDSs for DST-1, User-2 could just add its ID to the "DST_Users" of this DST and add its RDS sending address to the "RDS_Sending_Address_List" parameter as shown in Table 1 since DST-1 is already in the "activated" status.

Later, if User-1 does not want to receive RDSs for DST-1 for now, it may check how many users are currently receiving RDS of DST-1 by examining the "RDS_Sending_Address_List" parameter. If User-1 is not the only one user that currently is receiving RDSs, User-1 may just remove its RDS sending address from the "RDS_Sending_Address_List" parameter as shown in Table 1. If User-1 does not want to receive RDSs for DST-1 permanently, User-1 may further remove its ID from the "DST_Users" parameter.

If User-2 does not want to receive RDSs for DST-1 for now, it may check how many users are currently receiving RDS of DST-1 by examining the "RDS_Sending_Address_List" parameter. Since it finds that now it is the only one user that currently is receiving RDSs of DST-1, User-2 may not only remove its RDS sending address from the "RDS_Sending_Address_List" parameter as shown in Table 1, but also really deactivate this DST-1 (In other words, DST-1 may be really de-activated at this time). If User-2 does not want to receive RDSs for DST-1 permanently, User-2 may further remove its ID from the "DST_Users" parameter (In particular, if there is no user included in the "DST_Users" once User-2 is removed, DST-1 may not just be de-activated, instead, this DST-1 may be deleted.).

(3) A given DST can also be activated based on the events occurred in LFAs (as indicated in the RDS_Production_Trigger parameter). As an example shown in FIG. 6, if DST-1 is to generated RDSs related to real-time noise-level monitoring in LFA-1, it is possible that DST-1 may be activated by its in-field manager (e.g., the DSCS Agent-2) when traffic jams are detected in LFA-1. Once DST-1 is activated, the DSCS Agent-2 may inform DSCS Agent-1 in the CN in order to update the DST_Status parameter of DST-1.

In this case, when a user is creating a DST, it can directly provide its RDS sending address when sending the DST creation request (it may then be included in the "RDS_Sending_Address_List" parameter). Later, if another user also wants to re-use this whole DST, this new user may just send a request to DSCS agent by adding its ID to the "DST_Users" of this DST, and also add the its own RDS sending address to the "RDS_Sending Address_List" parameter.

Every time the DST status is changed, its latest status may be reflected in the "DST_Status" parameter in the DST and the field managers may also need to conduct certain actions (e.g., suspend/resume the corresponding work threads for those DSTs, based on their status).

The methods and systems disclosed herein may be implemented in a oneM2M Functional Architecture Embodiment, as discussed below.

Figure 15:
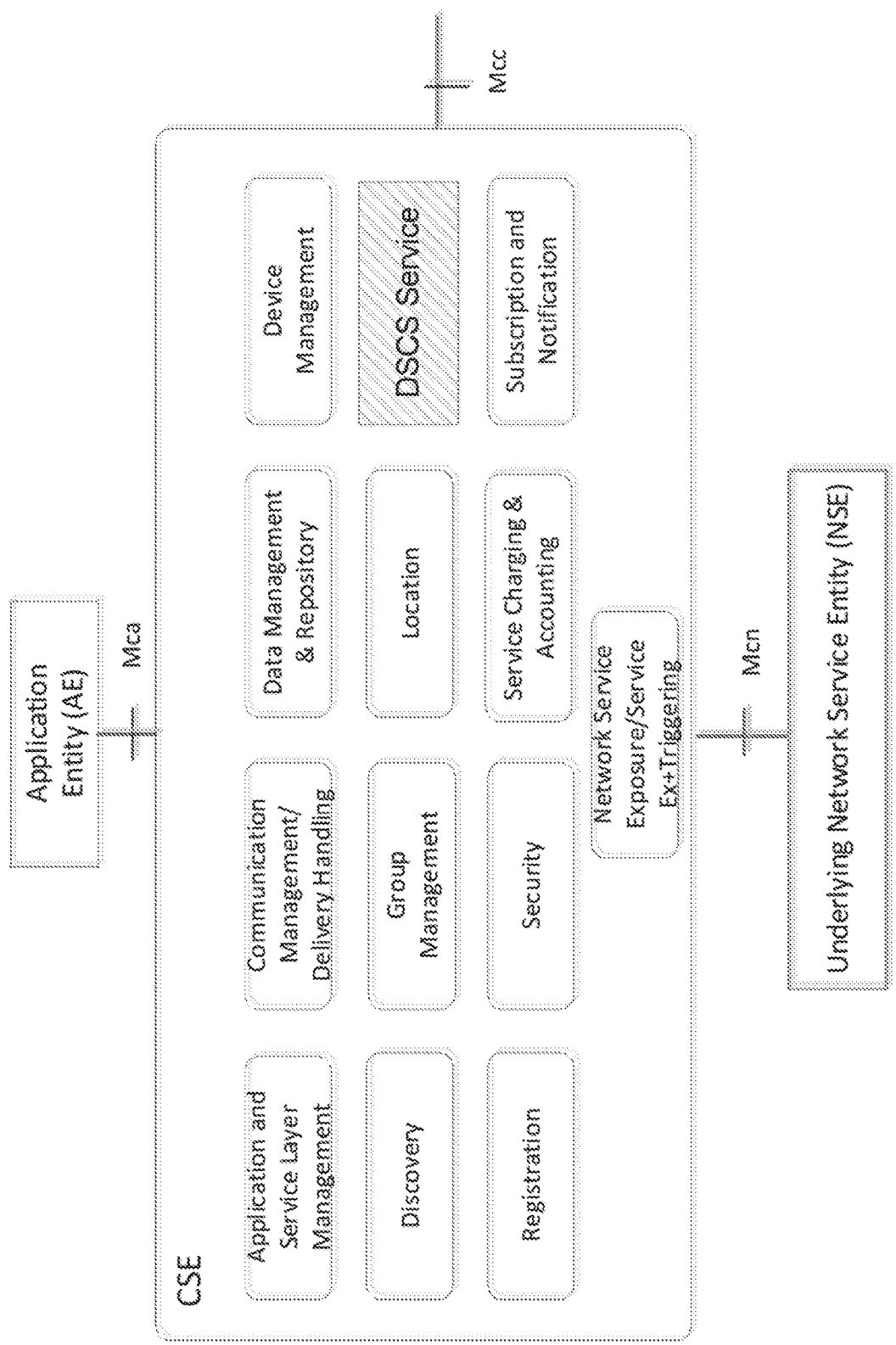
FIG. 15 shows a block diagram of an example new DSCS CSF for a oneM2M Service Layer.

The disclosed DSCS solution may be regarded as a new CSF in a oneM2M service layer, as shown in FIG. 15. It should be understood that different types of M2M nodes can implement the DSCS service, such as IoT devices, M2M Gateways, M2M Servers, mobile nodes (such as vehicle, cellphone, etc.), etc. In particular, depending on the various/different hardware/software capacities for those nodes, the capacities of DSCS services implemented by those nodes may also be variant.

The oneM2M embodiments for the related entities defined are as follows:

A Data Source (DS) can be an oneM2M AE or CSE. Accordingly, the raw data generated by an AE or an CSE could be stored in a <container>, <timeSeries> or <flexContainer> resource, which can be identified through oneM2M resource discovery during the DS identification process;

A Local Fog Node (LFN) can be a oneM2M CSE (e.g., ASN-CSE);

A LFN Leader (LFNL) and a Fog Node (FN) can be oneM2M CSE (such as MN-CSE);

A Cloud Node (CN) can be a oneM2M CSE (such as IN-CSE); and

A DSCS user can be an oneM2M AE (e.g., an IN-AE).

Figure 16:
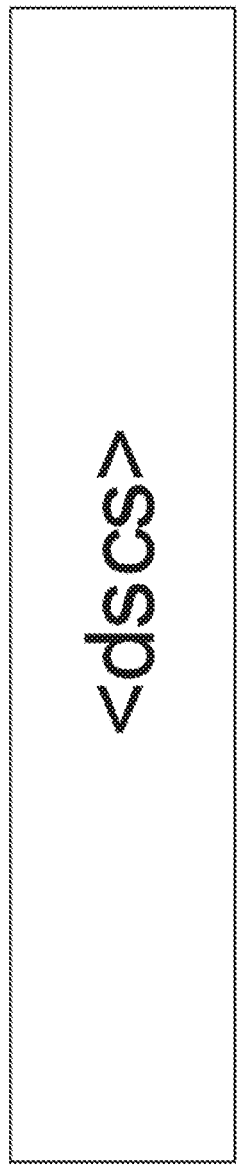
FIG. 16 shows an example of a new oneM2M Resource <dscs>.

A new resource called <dscs> is disclosed shown in FIG. 16. <dscs> includes common attributes for service layer resources, which is not shown in FIG. 16. If a CSE has DSCS capability (e.g., a DSCS agent is running on this CSE), it may have a <dscs> child resource. All the DSCS related requests can be towards this resource. For example, a user can send a DST creation request to the <dscs> resource hosted on CSE-1. Similarly, when CSE-1 intends to deploy a created DST-1, it can also send a DST deployment request to the <dscs> resource hosted by another CSE-2 at the edge.

An additional or alternative way to expose a DSCS is using a new attribute called "dscs_capability" is defined for <CSE> resource, which can indicate whether this CSE has the DSCS capability. Accordingly, all the DSCS related request can be sent towards the <CSEBase> resource.

A new <dst> resource is disclosed to represent a DST, in which all the resource attributes are corresponding to the parameters defined in a DST (See Table 1 for the detailed definition for a DST).

The <dst> resource may contain the child resources specified in Table 2.

TABLE 2

Child resources of <dst> resource

| Child Resources of <dst> | Child Type | Child Multiplicity | Resource Description | <dstAnnc> Child Resource Types |
|---|---|---|---|---|
| [variable] | <subscription> | 0 . . . n | See clause 9.6.8 in oneM2M-TS-0001, where the type of this resource is described. | <subscription> |
| <dstTriggering> | <dstTriggering> | 1 | This child resource is described in detail below. | <dstTriggering> |

The <dst> resource above contains the attributes specified in Table 3.

TABLE 3

Attributes of <dst> resource

| Attribute Name | Multiplicity | RW/ RO/ WO | Description | <factsAnnc> Attributes |
|---|---|---|---|---|
| resourceName | 1 | WO | See clause 9.6.1.3 in oneM2M-TS-0001. | NA |
| parentID | 1 | RO | See clause 9.6.1.3 in oneM2M-TS-0001. | NA |
| expirationTime | 1 | RW | See clause 9.6.1.3 in oneM2M-TS-0001. | NA |
| accessControlPolicyIDs | 0 . . . 1 (L) | RW | See clause 9.6.1.3 in oneM2M-TS-0001. | NA |
| labels | 0 . . . 1 (L) | RW | See clause 9.6.1.3 in oneM2M-TS-0001. | MA |
| creationTime | 1 | RO | See clause 9.6.1.3 in oneM2M-TS-0001. | MA |
| lastModifiedTime | 1 | RO | See clause 9.6.1.3 in oneM2M-TS-0001. | MA |
| announceTo | 0 . . . 1 (L) | RW | See clause 9.6.1.3 in oneM2M-TS-0001. | NA |
| announcedAttribute | 0 . . . 1 (L) | RW | See clause 9.6.1.3 in oneM2M-TS-0001. | NA |
| dynamicAuthorizationConsultationIDs | 0 . . . 1 (L) | RW | See clause 9.6.1.3 in oneM2M-TS-0001. | OA |
| creator | 0 . . . 1 | RO | See clause 9.6.1.3 in oneM2M-TS-0001. | NA |
| DST_ID | 1 | RW | See the detailed definition in Table 1. | OA |
| DST_Initiator | 1 | RW | See the detailed definition in Table 1. | OA |
| DST_Users | 1 . . . N | RW | See the detailed definition in Table 1. | OA |
| Type_of_DST | 1 | RW | See the detailed definition in Table 1. | OA |
| Targeted_Region | 1 | RW | See the detailed definition in Table 1. | OA |
| Invovled_LFAs | 0 . . . 1 | RW | See the detailed definition in Table 1. | OA |
| Sub_DST_List | 1 | RW | See the detailed definition in Table 1. | OA |
| Parent_DST_ID | 1 | RW | See the detailed definition in Table 1. | OA |
| Creating_DSCS_Agent_ID | 1 | RW | See the detailed definition in Table 1. | OA |
| In_Field_Manager_ID | 1 | RW | See the detailed definition in Table 1. | OA |
| Data_Sample_Frequency | 1 | RW | See the detailed definition in Table 1. | OA |
| DST_Status | 1 | RW | See the detailed definition in Table 1. | OA |
| RDS_Production_Schedule | 0 . . . 1 | RW | See the detailed definition in Table 1. | OA |
| RDS_Production_Trigger | 0 . . . 1 | RW | See the detailed definition in Table 1. | OA |
| RDS_Context | 1 | RW | See the detailed definition in Table 1. | OA |
| DE_ID_List | 1(L) | RW | This attribute contains all of the DE IDs included in the corresponding DST of this <dst> resource. | OA |
| Reused_List | 1(L) | RW | This attribute contains a list of the "Reused" parameters of all the DEs in the corresponding DST. The DE order should be as same as the order in DE_ID_List. | OA |
| Reused_Info_List | 1(L) | RW | This attribute contains a list of the "Reused_Info" parameters of all the DEs in the corresponding DST. The DE order should be as same as the order in DE_ID_List. | OA |

TABLE 3-continued

Attributes of <dst> resource

| Attribute Name | Multiplicity | RW/RO/WO | Description | <factsAnnc> Attributes |
|---|---|---|---|---|
| Raw_Data_Type_List | 1(L) | RW | This attribute contains a list of the "Raw_Data_Type" parameters of all the DEs in the corresponding DST. The DE order should be as same as the order in DE_ID_List. | OA |
| Unit_List | 1(L) | RW | This attribute contains a list of the "Unit" parameters of all the DEs in the corresponding DST. The DE order should be as same as the order in DE_ID_List. | OA |
| Data_Processing_Operation_List | 1(L) | RW | This attribute contains a list of the "Data_Processing_Operation" parameters of all the DEs in the corresponding DST. The DE order should be as same as the order in DE_ID_List. | OA |
| Customized_Processing_Details_List | 1(L) | RW | This attribute contains a list of the "Customized_Processing_Details" parameters of all the DEs in the corresponding DST. The DE order should be as same as the order in DE_ID_List. The "Customized_Processing_Details" parameter can be an URI, whether the processing code/snippet can be downloaded. | OA |
| Quality_Requirements | 1(L) | RW | This attribute contains a list of the "Quality_Requirements" parameters of all the DEs in the corresponding DST. The DE order should be as same as the order in DE_ID_List. | OA |

The following procedure may be used for creating a <dst> resource.

TABLE 4

|  | <dst> CREATE <dst> CREATE |
|---|---|
| Associated Reference Point | Mca, Mcc and Mcc'. |
| Information in Request message | All parameters defined in oneM2M-TS-0001 table 8.1.2-2 apply with the specific details for: Content: The resource content shall provide the information as defined in <dst> resource. |
| Processing at Originator before sending Request | According to clause 10.1.2 in oneM2M-TS-0001 |
| Processing at Receiver | According to clause 10.1.2 in oneM2M-TS-0001 |
| Information in Response message | According to clause 10.1.2 in oneM2M-TS-0001 |
| Processing at Originator after receiving Response | According to clause 10.1.2 in oneM2M-TS-0001 |
| Exceptions | According to clause 10.1.2 in oneM2M-TS-0001 |

The following procedure may be used for retrieving the attributes of a <dst> resource.

TABLE 5

|  | <dst> RETRIEVE <dst> RETRIEVE |
|---|---|
| Associated Reference Point | Mca, Mcc and Mcc'. |
| Information in Request message | All parameters defined in table 8.1.2-2 in oneM2M-TS-0001 apply with the specific details for: Content: attributes of the <dst> resource. |
| Processing at Originator before sending Request | According to clause 10.1.3 in oneM2M-TS-0001 |
| Processing at Receiver | According to clause 10.1.3 in oneM2M-TS-0001 |
| Information in Response message | All parameters defined in table 8.1.3-1 in oneM2M-TS-0001. |
| Processing at Originator after receiving Response | According to clause 10.1.3 in oneM2M-TS-0001 |
| Exceptions | According to clause 10.1.3 in oneM2M-TS-0001 |

The following procedure may be used for updating attributes of a <dst> resource.

TABLE 6

|  | <dst> UPDATE <dst> UPDATE |
|---|---|
| Associated Reference Point | Mca, Mcc and Mcc' |
| Information in Request message | All parameters defined in table 8.1.2-2 in oneM2M-TS-0001 apply with the specific details for: Content: attributes of the <dst> resource. |
| Processing at Originator before sending Request | According to clause 10.1.4 in oneM2M-TS-0001 |

TABLE 6-continued

| | |
|---|---|
| <dst> UPDATE | |
| <dst> UPDATE | |
| Processing at Receiver | According to clause 10.1.4 in oneM2M-TS-0001 |
| Information in Response message | According to clause 10.1.4 in oneM2M-TS-0001 |
| Processing at Originator after receiving Response | According to clause 10.1.4 in oneM2M-TS-0001 |
| Exceptions | According to clause 10.1.4 in oneM2M-TS-0001 |

The following procedure may be used for deleting a <dst> resource.

TABLE 7

| | |
|---|---|
| <dst> DELETE | |
| <dst> DELETE | |
| Associated Reference Point | Mca, Mcc and Mcc'. |
| Information in Request message | All parameters defined in table 8.1.2-2 in oneM2M-TS-0001. |
| Processing at Originator before sending Request | According to clause 10.1.5 in oneM2M-TS-0001. |
| Processing at Receiver | According to clause 10.1.5 in oneM2M-TS-0001. |
| Information in Response message | According to clause 10.1.5 in oneM2M-TS-0001. |
| Processing at Originator after receiving Response | According to clause 10.1.5 in oneM2M-TS-0001. |
| Exceptions | According to clause 10.1.5 in oneM2M-TS-0001. |

<dstTriggering> is a virtual resource because it does not have a representation. It is the child resource of a <dst> resource. This resource is used to activate or de-activate the parent <dst> resource. Note that, the latest status of a DST should be reflected in the "DST status" attribute of the <dst> resource.

The <dstTriggering> resource shall be created when the parent <dst> resource is created The Retrieve operation may not be applicable for <dst-Triggering>. The Update operation may be used for activating or de-activating the parent <dst> resource.

TABLE 8

| | |
|---|---|
| <dstTriggering> UPDATE | |
| <dstTriggering> UPDATE | |
| Associated Reference Point | Mca, Mcc and Mcc'. |
| Information in Request message | All parameters defined in table 8.1.2-2 in oneM2M-TS-0001 apply with the specific details for: Content: actions to be conducted (including "activating" or "deactivating"). |
| Processing at Originator before sending Response | According to clause 10.1.4 in oneM2M TS-0001 oneM2M-TS-0001. |
| Processing at Receiver | According to clause 10.1.4 in oneM2M TS-0001 |
| Information in Response message | According to clause 10.1.4 in oneM2M TS-0001 |
| Processing at Originator after receiving Response | According clause 10.1.4 in oneM2M-TS-0001 |
| Exceptions | According to clause 10.1.4 in oneM2M-TS-0001 |

The <dstTriggering> resource shall be deleted when the parent <dst> resource is deleted by the hosting CSE. The Delete operation is not applicable via Mca, Mcc or Mcc'.

A GUI interface is disclosed in FIG. 17 which can be used for a human user to create a DST based on his/her use. In general, those parameters may be transmitted to a DSCS agent (which may be the Creating_DSCS_Agent), where a DST may be created accordingly. In other words, the parameters on this user interface may be the parameters to be carried in the request message in the Step 2 in FIG. 6. As can been seen, the user may specify some general information for the whole DST such as the targeted region, RDS generation frequency, RDS context, etc. In the meantime, the user may also input the detailed definitions for each of the DEs in the DST. If user would like to have more than one DE in the DST, he/she can click the "Add-more-DEs" button such that more input area may appear on this panel for those DEs.

Referring back to the smart city use case example shown in FIG. 4, in order to build a smart city, the city authority adopts a standards-based Service Layer (SL) platform (such as oneM2M) and has deployed many IoT sensors and devices on city public infrastructure, such as on roads/streets, in public buildings, on buses/subways, etc. Due to a limited budget, the city authority also calls for the participation of private organizations and individuals for this smart city initiative. Accordingly, those IoT devices installed on private properties (such as private cars, cellphones, etc.) are also integrated into the system, which can generate a large amount of comprehensive IoT data that reflects the real-time running status of the city.

A city may have many geographical regions, such as a Central Business District (CBD), a suburban residential area, etc., which may be referred to as Local Fog Areas (LFA). Massive IoT devices may be deployed in those LFAs and a large amount of IoT data may be generated from those LFAs. From a communication network perspective, different city regions constitute multiple LFAs (e.g., the CBD corresponds to LFA-1 and a suburban residential area corresponds to LFA-2, as shown in FIG. 4).

A smart city control console is deployed in the cloud that allows users to pose various data analytics requests based on their needs. For example, a user from Organization-A has a Data Sample Collection Request (denoted as DSCR-1) which intends to evaluate the current weather and environmental pollution status for a given area (e.g., LFA-X as shown in FIG. 4, which is an area under large-scale roadwork and building construction). In reality, data analytics results are usually represented through various charts (e.g., a line chart or a bar chart). In addition to what type of analytic charts the user intends to see (e.g., a line chart), the user may also specify what the data samples should be, which the inputs should be for drawing the chart, etc. In order to prepare those data samples for drawing the charts, the related raw data needs to be collected from various IoT devices also referred to as Data Sources (DSs). In the smart city use case, the DS examples include temperature sensors, humidity sensors, pollution sensors, noise sensors, etc. In particular, those sensors or devices may be installed by different organizations other than Organization-A (which the user is affiliated with).

It may be assumed that in DSCR-1, the user intends to see a line chart for a LFA-X, which requires one data sample for every three minutes. In particular, each data sample may be constituted by the following two data elements, which are each associated with a quality requirement:

Data Element (DE)-1: the average temperature of LFA-X sampled every three minutes.

Quality Requirement of DE-1: the temperature readings need to be collected from at least 100 different temperature sensors deployed in LFA-X in order to guarantee the accuracy.

DE-2: The average noise level of LFA-X sampled every three minutes.

Quality Requirement of DE-2: The noise readings need to be collected from noise sensors deployed at 30 major traffic intersections in LFA-X.

In order to draw the line chart on the smart city control console deployed in the cloud, a data sample with the format of (DE-1, DE-2, Timestamp) may be needed every three minutes. Such a data sample may be referred to as a Ready-to-use Data Sample (RDS) for DSCR-1.

To produce RDSs as illustrated in the above use case, massive IoT raw data needs to be collected in LFAs and processed. A Fog computing paradigm is a nice fit for supporting such applications in the sense that the massive raw data does not have to be moved to the Cloud side for centralized processing and instead may be processed in LFAs for producing RDSs.

The user may not have knowledge about the available IoT DSs in the LFAs. For example, in the smart city use case, the deployed SL platform may also integrate many IoT DSs from different organizations and individuals. The user from the cloud side may not be the same party that deployed those IoT DSs. The user is often not the owner of many LFNs in LFAs that have data processing capability (such as gateways, road-side units, etc.) and the user usually does not have any capability for configuring any LFNs in LFAs for the desired data processing operations since those LFNs may be owned by different parties or organizations. It is worth noting that some existing IoT edge products (such as Microsoft IoT Edge or Amazon Greengrass) cannot work efficiently in such a heterogeneous scenario. For example, those products support a relatively simple case where users normally have both full knowledge of available DSs and full configuration capabilities for the processing nodes in LFAs.

To support such a heterogeneous scenario, a general solution is that the IoT system may provide a common data sample collection service, which can receive various DSCRs from users. A given DSCR describes all the details about what type of RDSs the user intends to receive. However, the user may not participate in any activities happening in the LFAs for serving this DSCR. In other words, users may just submit DSCRs to the IoT system, and the system will handle everything for delivering RDSs to the user.

When serving a specific DSCR, two specific technical issues may need to be considered:

DS Identification Process: For each of the DEs in a RDS corresponding to a given DSCR, there could be thousands of potential DSs in a LFA that need to be discovered and/or evaluated to determine whether they are the desired DSs for this given DSCR (such a process is called a DS Identification Process). To identify those DSs, certain LFNs having discovery capabilities can be utilized, which may act as DS Discoverers (DSDs). For example, in a oneM2M scenario, any AEs or CSEs having resource discovery capabilities can act as a DSD. However, it is essential to conduct the DS identification process in an efficient way. The major challenge is that there may be multiple LFNs in LFAs that can act as DSDs, however each of those LFNs may have different/limited DS identification capabilities or different access privileges. As an example, one LFN can identify certain DSs belonging to a specific organization A while another LFN can only identify certain DSs belonging to another organization B. Both of those LFNs may act as DSDs to help a specific DSCR, which may be required to identify desired DSs from both two organizations. Therefore, it can be seen that multiple LFNs in LFAs need to "collaboratively" work together to fully utilize and integrate their respective discovery capabilities in order to identify the desired DSs for a given DSCR. Currently however, various DS identification capabilities of different DSDs cannot be leveraged in a holistic way for realizing collaborative DS identification in LFAs.

RDS Production Process: After the DS identification process, the next step (called the RDS Production Process) is directed to how to process the collected raw data from the desired DSs, produce the RDSs, and deliver them to the user. In particular, the raw data collected from the DSs may be in a large amount and the data processing on the massive raw data may need to be done collaboratively. A LFN may act as a Raw Data Processor (RDP) if it can process the IoT raw data. However, the major challenge is that there may be multiple LFNs in LFAs that can act as RDPs, and those LFNs may belong to different organizations and each of those LFNs may have different and/or limited data processing capabilities (e.g., some can only do data pre-processing, some can do basic data aggregation processing, while some can conduct advanced data analytics processing). Therefore, it can also be seen that the multiple LFNs in LFAs need to collaboratively work together in order to fully utilize/integrate their respective data processing capabilities in order to produce RDSs for a given DSCR. Currently however, there is no solution for conducting collaborative RDS production in LFAs for serving DSCRs.

Disclosed herein are methods and systems for collaborative DS identification and RDS production for the fog-based Service Layer (SL). The methods and systems may include but are not limited to:

Collaborative Data Source (DS) Identification: For each of the DEs in a RDS corresponding to a DSCR, there could be thousands of potential DSs in a LFA that need to be discovered and/or evaluated to determine whether they are the desired DSs for serving this DSCR. Different Local Fog Nodes (LFNs) in a LFA that can act as Data Source Discovers (DSDs) may have different DS identification and discovery capabilities. Accordingly, methods and systems are provided that allow multiple LFNs (as DSDs) in one or more LFAs to collaboratively work together in order to identify the desired DSs for a given DSCR.

A given LFN may have DS identification capabilities, but may not have the data collection capability (e.g., to collect data from a desired/identified DS) or the specific data processing capability (e.g., to process the raw data for producing RDSs). Therefore, the DS identification process disclosed herein not only refers to identifying the desired DSs for each of DEs in the RDSs as required by a given DSCR, but also refers to finding appropriate LFNs that can act as the Raw Data Collectors (RDCs) for collecting raw data from those identified DSs as well as to find appropriate LFNs that can act as Raw Data Processors (RDPs) for processing raw data for producing RDSs. The solutions for collaborative DS identification disclosed herein include but are not limited to DS identification with RDC discovery and DS identification result integration and RDC/RDP job assignment.

Collaborative RDS Production: During the RDS production procedure, the major work is related to how to process the collected raw data and produce the RDSs. The raw data collected from the DSs may be in a large amount and the data processing on the massive raw data may also need to be done collaboratively. For a given DSCR, its data processing may cross multiple RDPs since different LFNs may have various data processing capabilities that are required for producing RDSs for this DSCR. The primary solutions for collaborative RDS production disclosed herein include but are not limited to triggering a RDS production for a given DSCR, RDS production for a given DE, and RDS assembling for a given DSCR.

Described below are example definitions for a number of terms used throughout this disclosure:

Cloud Node (CN): A node with cloud capabilities that manages the operations of other fog nodes lower in the deployment hierarchy. Note that in this disclosure, the term "cloud" may be used to refer to a Cloud Node. The cloud oversees and manages the interactions between different fog nodes that together enable a fog service layer for applications.

Data Sample Collection Request (DSCR): A user of DSCS may specify their needs in a DSCR, which may include the details about what type of RDSs they intend to receive.

Ready-to-use Data Sample (RDS): For a given DSCR, its corresponding RDSs refer to the data samples that are already in a ready-to-use stage for the user to consume (e.g., to draw analytics charts). RDSs may be obtained through the RDS production processes conducted by the LFNs in LFAs. For example, for a given DSCR, the DSCS may conduct efficient IoT raw data collection and data processing in order to produce RDSs by leveraging a Fog Computing paradigm. Using the smart city use case example, for DE-1 in DSCR-1 (which is the average temperature of LFA-1 in the last three minutes), DSCS deployed in LFA-1 needs to collect raw data from the involved temperature sensors in LFA-1, conduct average aggregation operation over the raw data, and produce the DE-1 part for every RDSs of DSCR-1. The DE-2 part for every RDS of DSCR-1 can also be produced in a similar manner. Through context alignment, data for the DE-1 part and data for the DE-2 part may be assembled accordingly for producing RDSs. For example, if one piece of data for the DE-1 part and one piece of data for the DE-2 part are for the same three minute time interval, these two pieces of data may be assembled together to form a single/complete RDS for this specific three minute time interval.

Data Element (DE): A DSCR defines what DEs may be included in a single RDS corresponding to this DSCR (e.g., it may describe what its corresponding RDSs look like). In other words, a RDS is a real data sample instance of its corresponding DSCR. As an example, consider a DSCR-1 that has the following two DEs: DE-1 (the average temperature of LFA-1 in the last three minutes) and DE-2 (the average noise level of LFA-1 in the last three minutes). Every RDS of DSCR-1 may have those two DEs (DE-1, DE-2, RDS_Contexts), in which RDS_Contexts gives the detailed context information about this RDS (e.g., which three minute time interval this particular RDS relates to).

Fog Node (FN): A node that has any fog resource such as compute, storage, communication, analytics, etc. A fog node may have at least one of these resources and may also have other software or services that are running on the fog node. A FN is assumed to be deployed at one level higher than the level of LFNs. There may be several levels of FN deployments, with the Cloud Node (CN) being at the highest level. in the smart city use case example, a FN could be a router at a higher level in the network.

Local Fog Area (LFA): A geographic region (e.g., a city) can be divided into multiple LFAs depending on different applications scenarios. In the smart city use case scenario, a specific residential area can be a LFA, or a Central Business District (CBD) in a downtown area can be a LFA.

Local Fog Node (LFN): A LFN can be a node in a LFA that has compute, storage, and communication capability. A LFN can communicate and/or interact with a LFN Leader (LFNL) in its corresponding LFA. An example LFN can be a cellphone of a person, a moving bus, a home gateway of a house, etc. The LFN is a type of FN that is at the lowest level of the network. A LFN can interact/collaborate with other LFNs in the same LFA and can conduct discovering, collecting and processing the IoT data from various DSs.

LFN Leader (LFNL): A given LFA has a LFN leader in that area. A LFNL is a LFN that manages, controls, and/or coordinates the activities of all the LFNs within that LFA and may be connected to FNs that are on a higher level. In the smart city use case example, a LFNL could be the main gateway of a specific residential area.

DS Identification Process: For each of the DEs in a RDS corresponding to a given DSCR, there could be thousands of potential DSs in a LFA that need to be discovered and/or evaluated to determine whether they are the desired DSs for this DSCR. Such a process may be referred to as a DS Identification Process.

RDS Production Process: A RDS Production Process refers to how to process the raw data collected from desired DSs and produce the RDSs.

Data Source (DS): A node can be a DS if it is a source of IoT data. For example, a node may be a sensor, a camera, a traffic light, or any IoT device that produces data. A roadside unit can also be a DS since it generates sensory data related to road surface. The road-side unit may also be a LFN since it can perform certain data processing capabilities and/or can communicate with a LFNL. In general, a node in a LFA that not only has sensing, but also has computing, storage and communication capabilities, may be a LFN as well as a DS.

Data Source Discoverer (DSD): This is a logical role. If a given LFN is involved in discovering DSs for a given DSCR during a DS identification process, it may be regarded as a DSD for this DSCR.

Raw Data Collector (RDC): This is a logical role. If a given LFN is involved in collecting raw data from some DSs for serving a given DSCR, it may be regarded as a RDC for this DSCR.

Raw Data Processor (RDP): This is a logical role. If a given LFN is involved in processing the collected raw data for a given DSCR during a RDS production process, it may be regarded as a RDP for this DSCR. Note that, in general, a LFN may take on multiple logical roles of RDC, DSD, and RDP at the same time, or those logical roles may be taken on by different LFNs when serving a given DSCR. In particular, by defining three different logical roles, work collaboration can be facilitated since different tasks are decoupled and may be conducted by different roles.

It is worth noting that although the ideas proposed in this disclosure are described using Fog-related terms, the ideas proposed in this disclosure can also be applied to the edge scenario. For example, a LFA could also interpreted as a specific area at the edge, a LFN can be a node at the edge side, a LFNL can be a gateway at the edge or a roadside unit at the edge, etc.

Figure 18:
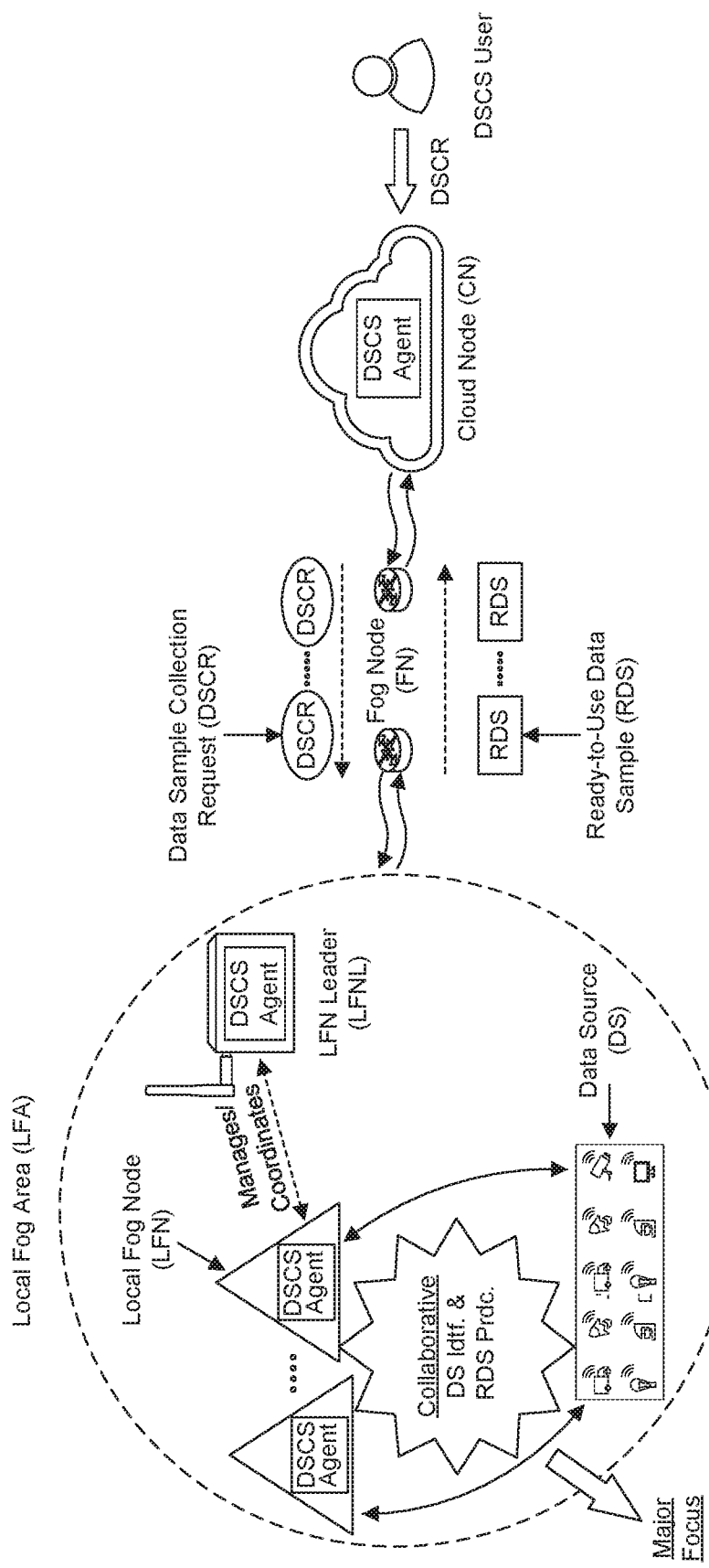
FIG. 18 shows an architecture diagram of an example data sample collection service.

Disclosed herein are two key features of a common service for the service layer called a Data Sample Collection Service (DSCS). A high-level architecture of a DSCS is shown in FIG. 18. The DSCS can receive various DSCRs from users and handle all the details on behalf of its users. In a DSCR, the user can clearly depict what their desired data samples (e.g., RDSs) look like, along with various quality requirements regarding the data samples. A service layer node (such as on a LFN, a LFNL, a FN or a CN) may have a DSCS agent if this node intends to provide a data sample collection related service. A DSCS agent on a SL node is a piece of software that not only can interact with DSCS users but also can collaborate with other DSCS agents in order to serve DSCRs posed by users. With the DSCS, once users pose their DSCRs, the users do not have to be involved in any details regarding how to identify the qualified DSs in LFAs and how to configure the LFNs in those LFAs for raw data processing and RDS production. As an example shown in FIG. 18, after the DSCS Agent in the CN receives a DSCR from a user, it may figure out which LFA(s) are involved. If a user just wants to collect data samples from a specific LFA (e.g., the one shown in the left side of FIG. 18), the corresponding task of this DSCR may be assigned to the DSCS agent on the LFNL in that LFA. This LFNL may act as the central controller, manager, and/or coordinator for the activities to be conducted by all the LFNs in this LFA, which may involve two specific technical issues disclosed herein (e.g., DS identification and RDS production):

Collaborative Data Source (DS) Identification: For each DE in a RDS corresponding to a DSCR, there could be thousands of potential DSs in a LFA that need to be discovered and/or evaluated to determine whether they are the desired DSs for this DSCR. LFNs in LFAs may have different DS identification capabilities. Accordingly, it is disclosed herein that multiple LFNs in LFAs can collaboratively work together in order to identify the desired DSs for a given DSCR. It may be assumed that a LFN-1 has participated in a DS identification task and identified a desired DS for a given DSCR-1. In this case, LFN-1 acted as a DS Discoverer (DSD). However, LFN-1 may not further act as the Raw Data Collector (RDC) for this DS due to its limited workload capacity. Thus, another LFN-2 may need to act as a RDC, which is responsible for further collecting raw data from this DS. Similarly, LFN-2 may not further act as the Raw Data Processor (RDP) for this DS. Thus, another LFN-3 may need to act as a RDP, which is responsible for further processing of the raw data collected from this DS. Therefore, DS identification process considered in this disclosure not only refers to identifying the desired DSs for each of the DEs in the RDSs as required by a given DSCR, but also refers to finding appropriate LFNs that can act as the RDCs as well as RDPs for those identified DSs.

Collaborative RDS Production: During the RDS production process, the major work is related to how to process the collected raw data, produce RDSs, and deliver them to the user. The raw data collected from the DSs may be in a large amount and the data processing on the massive raw data may need to be done collaboratively (e.g., IoT data processing may cross multiple RDPs during a given RDS production process). For example, if a LFN-1 acting as a RDP is temporally overloaded due to an unexpected and/or large raw data arrival, it can offload some of its data processing to another LFN-2 that currently has a very light workload and can also acts as a RDP. As another example, if a LFN-1 is only able to conduct some simple data processing due to its limited data processing capability, it can send its pre-processed data to another more powerful RDP (e.g., LFN-2) for deep data processing.

Using the methods and systems disclosed herein, different LFNs can take different roles that are involved in a DS identification process or a RDS production process. For example, LFNs acting as DSDs can work together to discover desired DSs. Other nodes can further act as RDCs and/or RDPs for collecting raw data from desired DSs (identified during the DS identification process), processing the raw data, and producing RDSs.

It is worth noting that the disclosed methods also account for the dynamics and uncertainty in the heterogonous fog scenario. For example, since different LFNs may belong to different organizations and have different primary usage purposes, there is no stringent requirement for LFNs to participate and keep contributing to a specific task related to DS identification or RDS production. Therefore, in a given task, the capabilities from different LFNs may need to be integrated together to make those LFNs work in a collaborative manner.

FIG. 18 (as well other figures of this disclosure) shows that a user in the cloud sends a DSCR to the DSCS Agent in the CN. It is understood that users may additionally or alternatively come from LFAs and in such a case, users may send their DSCRs to the DSCS Agent on the corresponding LFNLs in those LFAs. The proposed procedures and solutions in this disclosure also support this case.

In a LFN capability registration procedure, a LFNL in a given LFA may be responsible for managing or coordinating all the activities of LFNs in the LFA. Accordingly, in order to facilitate the management work of the LFNL, each of LFNs may need to first report and/or register its potential capabilities to the LFNL before they may participate in any tasks related to DS identification and RDS production. The utilization of the capabilities/functionalities of different LFNs can be maximized since those capabilities can be shared when serving different DSCRs. Multiple LFNs having the same capability may additionally or alternatively be integrated, which may improve the scalability when conducting DS identification and RDS production procedures.

Figure 19:
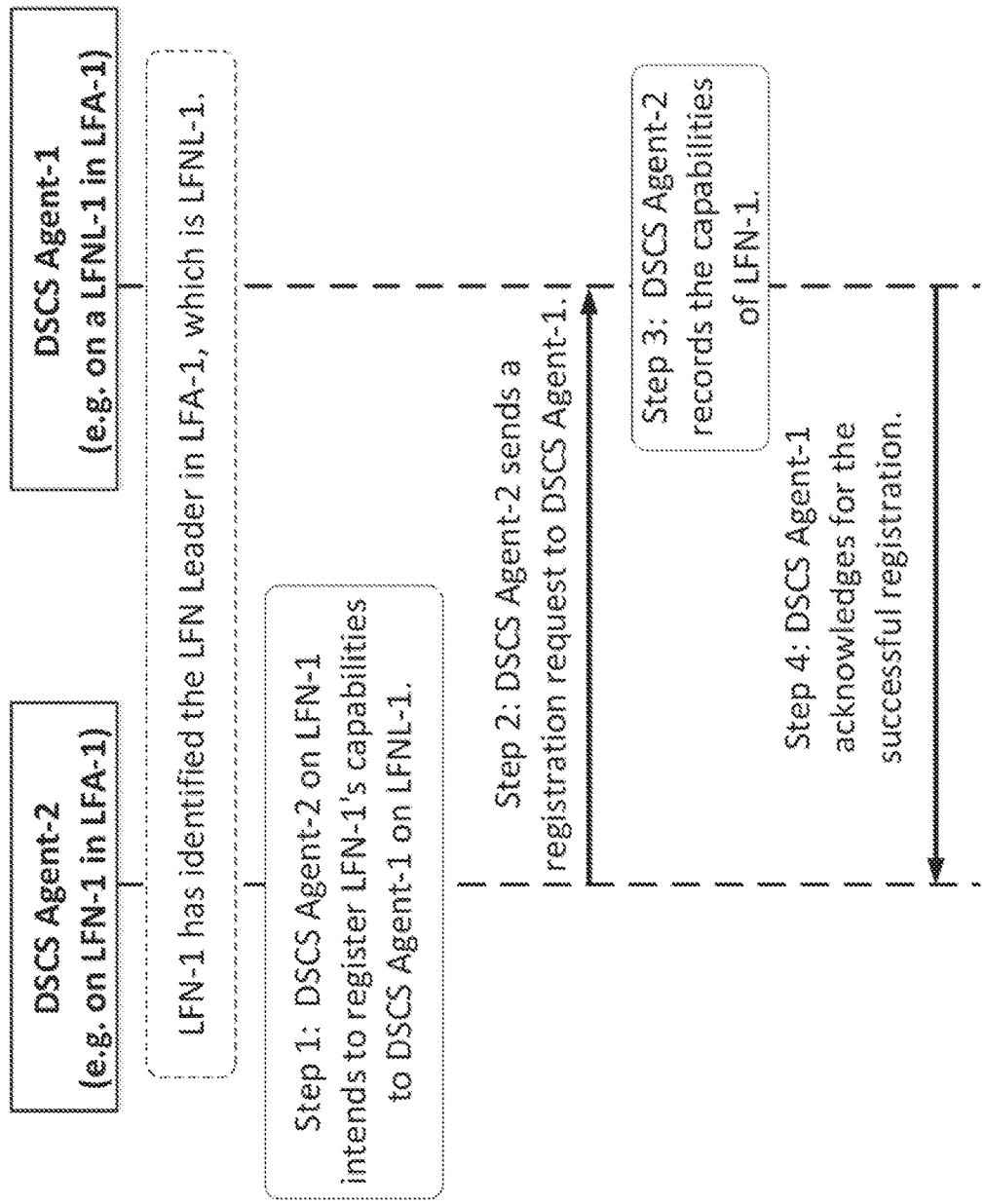
FIG. 19 shows a flow chart of an example method for local fog node capability registration to a local fog node leader.

An example procedure for LFN capability registration to a LFN leader is shown in FIG. 19 and discussed below:

As a precondition, it is understood that LFN-1 may have identified the LFNL in LFA-1, which is LFNL-1, which can be based on any existing technologies. For example, LFNL-1 can broadcast to all the LFNs in LFA-1 to claim that it has been selected as the LFNL in this LFA.

At step 1, DSCS Agent-2 on LFN-1 intends to register LFN-1's capabilities to DSCS Agent-1 on LFNL-1 in order to participate in future tasks related to DS identification and RDS production.

At step 2, DSCS Agent-2 sends a registration request to DSCS Agent-1, which includes the detailed information about the potential capabilities and identifiers of LFN-1. The information reported to the LFNL may describe whether LFN-1 can serve any of the roles related to DSD, RDC and RDP (it is possible that a given LFN can serve multiple logical roles). The following example three parameters describe whether LFN-1 can be a potential DSD:

DSD_Capability_List: This parameter may list all the capabilities of LFN-1 that can enable it as a DSD. For example, in a oneM2M system, a given CSE can be a DSD if it has the oneM2M basic resource discovery capability. The resource discovery capability may additionally or alternatively be included in this parameter. If this CSE has advanced semantic resource discovery capabilities, these capabilities may be included in this parameter.

DSD_Work_Schedule_Availability_List: For each of the capabilities as listed in the "DSD_Capability_List," the corresponding work schedule may be included in this parameter. For example, LFN-1 may not want to provide its advanced semantic resource discovery capability for the collaborative DS identification during 10 am-2 pm since LFN-1 normally has a heavy workload from its own organization around this time (which has the first priority).

DSD_Capability_Scope: This parameter can be used to indicate any limitation, constraint, or scope for the DSD capabilities as listed in "DSD_Capability_List." For example, this parameter may indicate that LFN-1 can only conduct DS identification on certain nodes or in certain locations. It is possible that LFN-1 can only identify DSs that belong to the same organization as LFN-1. In other words, LFN-1 can only identify DSs within its own organization. In another example, it may be possible that LFN-1 can only conduct DS identification within a certain geographical area (e.g., in a single building located in LFA-1). Note that such limitations and/or constraints indicated in this parameter are only coarse-grained in the sense that more fine-grained limitations and/or constraints may need to be further considered. For example, it is possible that LFN-1 can conduct DS identification in a single building, but for a given DS-1 in this building, it may have further discovery rules or policies that define whether LFN-1 is allowed to discover such a specific DS-1 in that building.

Similarly, the following three parameters describe whether LFN-1 can be a potential RDC:

RDC_Capability: This parameter is to convey whether LFN-1 has the IoT raw data collection capability.

RDC_Work_Availability_Schedule: This parameter indicates the work schedule of the RDC capability for LFN-1. For example, LFN-1 may not want to contribute its raw data collection capability during 10 am-2 pm since LFN-1 normally has a heavy workload from its own organization around this time (which has the first priority).

RDC_Capability_Scope: This parameter can be used to indicate any limitation, constraint, or scope for the RDC capability. For example, this parameter may indicate that LFN-1 can only collect raw data on certain nodes or in certain locations. It is possible that LFN-1 can only collect raw data from DSs within its own organization. As another example, it is also possible that LFN-1 can only collect raw data from DSs deployed in certain geographical area (e.g., a single building located in LFA-1).

Similarly, the following three parameters describe whether LFN-1 can be a potential RDP:

RDP_Capability_List: This parameter is to list all the capabilities of LFN-1 that can enable it as a RDP. For example, LFN-1 may support the simple data aggregation capability (such as conducting AVERAGE, MAX, MIN operations, etc.). Accordingly, the simple data aggregation capability may be included in this parameter. If LFN-1 also has the advanced data processing capabilities (such as classification, regression, or other machine learning based approaches), this capability may also be included in this parameter.

RDP_Work_Schedule_Availability_List: For each of the capabilities as listed in the "RDP_Capability_List," one or more corresponding work schedules may also be included in this parameter.

RDP_Capability_Scope: This parameter can be used to indicate any limitation, constraint, or scope for the RDP capabilities as listed in "RDP_Capability_List." For example, this parameter may indicate that a specific data format should be used when sending or inputting data to LFN-1 for processing. Accordingly, if the input data (e.g., the raw data collected from DSs) is not compatible to the required data format as indicated in this parameter, another RDP (e.g., acted by LFN-2) may be needed before LFN-1, which can first transform the original input data to the desired data format as required by LFN-1.

Additionally or alternatively, each LFN may register some other context information about itself, such as its geographical location, its affiliated organization, etc.

At step 3, DSCS Agent-1 records the capabilities of LFN-1 for future usage. A capability registration table may be available on DSCS Agent-1 for recording all the information, which is shown in Table 9.

TABLE 9

LFN Capability Registration Table

| Row Items | Multiplicity | Description |
|---|---|---|
| LFN_ID | 1 | The "LFN_ID" is the identifier of a LFN. |
| DSD_Capability_List | 1 | The description may be the same as the corresponding parameter description introduced in Step 2. |
| DSD_Work_Schedule_Availability_List | 1 | The description may be the same as the corresponding parameter description introduced in Step 2. |
| DSD_Capability_Scope | 0 . . . 1 | The description may be the same as the corresponding parameter description introduced in Step 2. |
| RDC_Capability | 1 | The description may be the same as the corresponding parameter description introduced in Step 2. |
| RDC_Work_Availability_Schedule | 1 | The description may be the same as the corresponding parameter description introduced in Step 2. |
| RDC_Capability_Limitation_Scope | 0 . . . 1 | The description may be the same as the corresponding parameter description introduced in Step 2. |
| RDP_Capability_List | 1 | The description may be the same as the corresponding parameter description introduced in Step 2. |
| RDP_Work_Availability_Schedule_List | 1 | The description may be the same as the corresponding parameter description introduced in Step 2. |
| RDP_Capability_Limitation_Scope | 0 . . . 1 | The description may be the same as the corresponding parameter description introduced in Step 2. |

TABLE 9-continued

LFN Capability Registration Table

| Row Items | Multiplicity | Description |
|---|---|---|
| Other_Context_Information | 1 | Such as its geographical location, its affiliated organization, etc. |

At step 4, DSCS Agent-1 acknowledges the successful registration. In other words, the DSCS Agent-1 now has a pool of resources in terms of which LFNs can act as DSD, RDC, and RDP. Accordingly, when receiving future DSCRs, the DSCS Agent-1 can use those resource in the pool for serving those DSCRs.

It is possible that a LFN may dynamically update its capability (e.g., adding a new capability, updating a work schedule for an existing capability, deleting a capability, etc.) which may also lead to the updates for the capability registration table shown in Table 9. The update procedure may be similar to the procedure shown in FIG. 19.

In an example collaborative DS identification procedure, when a LFNL receives a DSCR (e.g., a user posed a DSCR to a CN and the CN further assigned this DSCR to a related LFNL), the LFNL may start to initiate a collaborative DS identification process by utilizing the DS identification capabilities provided and/or registered by multiple LFNs managed by this LFNL. In general, a specific collaborative DS identification process involves two stages, as discussed in more detail below.

Stage 1 may comprise DS identification with RDC discovery. At stage 1, the major task is to identify all the desired DSs that can serve a specific received DSCR. A desired DS may be the entity that provides the raw data to a specific DE in the corresponding RDSs of this specific DSCR. In order to do so, the LFNL may first need to select a list of LFNs that can act as DSDs based on the information as described in the LFN capability registration table. Then, the LFNL designates those selected DSDs to conduct DS identification operations collaboratively. In many cases, a LFN-1 may act as a DSD and identify desired DSs for the received DSCRs. However, since the real RDS production process may be started at a later time, the LFN-1 may not be available anymore around that time and therefore another LFN-2 may be needed to serve as a RDC for the later raw data collection. Another possibility is that LFN-1 is a specialized node that is equipped with sophisticated DS identification capabilities in the sense that its work specialty is just DS identification. In other words, it is possible that in order to facilitate LFN physical node implementation, different LFNs may have their respective work specialties. Accordingly, when a DSD (e.g., LFN-1) identifies a desired DS, it may also need to collect related information regarding who is allowed to retrieve raw data from this DS, and such information may be needed to find an appropriate RDC for this DS in the later stage. Taking oneM2M as an example, a <container-1> resource has been discovered by a CSE (as a DSD) which stores all the readings of a temperature sensor (as a desired DS). The CSE can check the Access Control Policy (ACP) related to this <container-1> resource. For example, if the <container-1> resource is using the access control policy described in the <ACP-1> resource, the CSE may further check the <ACP-1> resource in order to identify which entities have the "Retrieve" privilege for the <container-1> resource. LFN-1 may send its DS identification result as well as the RDC candidates back to LFNL.

In one example, a data sample collection service may be configured to perform operations comprising: receiving a data sample collection request that identifies one or more data elements associated with a data sample; determining, for at least one of the data elements, one or more data source discoverers configured to identify one or more data sources for the at least one data element; sending, to the one or more data source discoverers, a request to identify one or more data sources for the at least one of the data elements; receiving, from the one or more data source discoverers, a data source identification result that identifies one or more data sources for the at least one of the data elements; selecting, based on the data source identification result, a local fog node configured to perform at least one of collecting raw data from the data source and processing the raw data collected from the data source; and sending, to the selected local fog node, an indication to perform the at least one of collecting raw data from the data source and processing the raw data collected from the data source.

The data sample collection request may comprise information associated with the data sample, the information comprising one or more of how frequently the data samples should be produced, a schedule for when the data sample collection request should be implemented, an identifier of where the data sample should be sent, and context information associated with the data sample. A data element of the one or more data elements may comprise at least one of an identifier of the data element, a type of raw data to be collected for the data element, a unit associated with the raw data for the data element, and a data processing operation for the data element. The request to identify one or more data sources may comprise at least one of a type of data source to identify and a work scope for performing the data source identification. The data source identification result may comprise at least one of a data rate of the data source, a data unit of the data source, a geo-location of the data source, an availability schedule of the data source, and one or more local fog nodes that are configured to access the data source. The indication to perform the at least one of collecting raw data from the data source and processing the raw data collected from the data source may comprise at least one of a task description and a task identifier. The data sample collection service may be implemented in one of a local fog node, a local fog node leader, a fog node, or a cloud node. The operations mat further comprise integrating one or more data source identification results received from a plurality of the data source discoverers; and determining, based on the integrated data source identification results, a list of one or more data sources from which to collect data.

Figure 20:
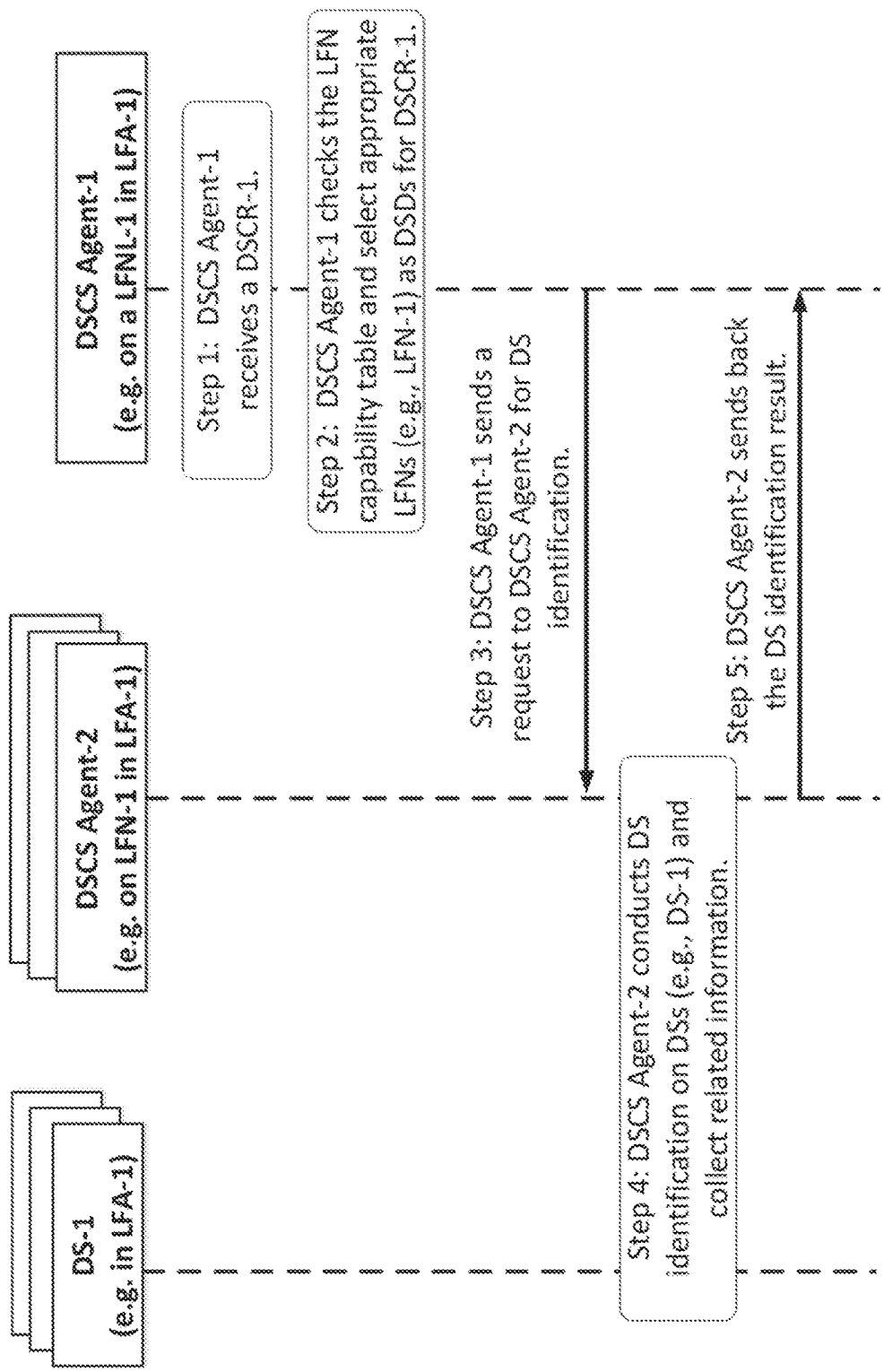
FIG. 20 shows a flow chart of an example method for data sample identification with raw data collector discovery.

An example procedure for DS identification with RDS discovery is shown in FIG. 20 and discussed further below.

At step 1, DSCS Agent-1 on LFNL-1 in LFA-1 receives a DSCR-1. A user may directly pose a DSCR-1 to the DSCS Agent-1 on LFNL-1 if the user resides in LFA-1, or if the user is in the cloud, it can pose DSCR-1 to another DSCS agent in the CN which then forwards DSCR-1 to the DSCS Agent-1 on LFNL-1 for processing. In general, DSCR-1 describes all the details about what kind of RDSs the user intends to receive. As shown below, a DSCR may include the following information:

The first part of the parameters is for the overall information and requirements for the RDS of a specific DSCR-1:

Data_Sample_Frequency: The "Data_Sample_Frequency" indicates how frequently RDSs should be produced. For example, a user may need a RDS for every one minute. In another example used in the smart city analytics use case, since two DEs are to calculate the average temperature and humidity for every three minutes respectively, an RDS should be created every three minutes.

RDS_Production_Schedule: This is an optional parameter. The "RDS_Production_Schedule" indicates when the RDS production for this DSCR-1 should be conducted. In other words, the RDS production process of DSCR-1 does not have to be started immediately after LFNL-1 processes the DSCR-1. In fact, this is one of the approaches regarding how to control the RDS production of DSCR-1. For example, this parameter may indicate that the RDS production should only be conducted between 8 am-10 am and 5 pm-8 pm every day. Alternatively, another approach to control a RDS production can be based on certain triggers (e.g., RDS production process can be started up based on a specific triggering request or based on certain events).

RDS_Contexts: This parameter indicates that for every single RDS of this DSCR, in addition to all the DEs to be included, what other context information should also be included in a RDS. For example, it is may be necessary to embed the timestamp and DSCR_ID information in a RDS such that others can know to which DSCR this RDS is compliant with and for which time interval this RDS is generated for. In general, any useful context information should be carried in RDSs if they are needed for later usage. Therefore, a given RDS-1 may have the following form: RDS-1=(DE-1, DE-2 . . . DE-N, RDS-context-1, RDS-Context-2, . . . ).

RDS_Sending_Address_List: This attribute indicates a list of addresses where the RDSs of this DSCR-1 may be sent to. For example, there could be the following two cases:

It is possible that the RDSs of DSCR-1 may be sent to the user if the DSCR-1 was directly sent from the user. This is the simplest case in the sense that the DSCR-1 is not split during processing.

In a more advanced scenario, DSCR-1 may be split during processing since DSCR-1 may interact with multiple LFAs due to the fact that the data to be collected for DSCR-1 may come from different LFAs. Consider the following example: DSCR-1 was created by splitting a parent DSCR into two DSCRs (e.g., DSCR-1a and DSCR-1b). In other words, the user originally posed a parent DSCR-1, which involves a big geographical area that covers two LFAs (e.g., LFA-1 and LFA-2). Accordingly, this parent DSCR-1 got split in order to get processed appropriately. For example, DSCR-1a is one of the sub DSCRs and it was sent to the LFNL-1 in LFA-1 since DSCR-1a's task is to handle DS identification and RDS production within LFA-1. Similarly, DSCR-1b may handle DS identification and RDS production related to another LFA-2. As a result, the RDSs of DSCR-1a (from the parent DSCR-1 perspective, a RDS of DSCR-1a may be just a partial RDS for the parent DSCR-1) and DSCR-1b may need to be further combined and/or assembled together by a RDP in order to produce the RDSs for the parent DSCR-1. The RDS_Sending_Address_List of DSCR-1 may be the RDS receiving address provided by the user of DSCR-1. The RDS_Sending_Address_List of DSCR-1a and DSCR-1b may be a RDP for RDS assembling for the parent DSCR-1.

Each RDS of DSCR-1 may have a list of DEs. Each of the DEs in a RDS may have the following items which define all the details for this DE:

DE_ID: The "DE_ID" is the identifier of a DE in this DSCR-1. As an example used in the smart city analytics use case, there are two DEs in each RDS of a DSCR and DE-1 and DE-2 are their DE_IDs, respectively.

Raw_Data_Type: This is to indicate which type of raw data should be collected for this DE. As an example used in the smart city analytics use case, the raw data type of DE-1 may be the temperature.

Unit: This is to indicate what the units of this DE should be. Per the example used in the smart city analytics use case, the raw data type of DE-1 is temperature. In particular, although the raw data of DE-1 may either be in Celsius or in Fahrenheit, it may required that in the RDSs, the DE-1 part should be in Celsius (which is the unit of DE-1).

Data_Processing_Operation: This is to indicate for a given DE in an RDS which type of data processing operations should be conducted over the raw data collected for this DE. The common operations include but are not limited to: average, max, min, etc. As an example used in the smart city analytics use case, the data processing type of DE-1 should be "performing the average aggregation operation." The user may also use a customized data processing operation. In this case, this parameter may have the value of "customized."

Customized_Processing_Details: If the "Data_Processing_Operation" has the value of "customized," this parameter may indicate how to conduct such customized data processing operations. For example, it may have the following operations:

The user works out a mathematical formula or model, which is obtained through a machine learning process and this model can be used to process the raw data collected for this DE. In this case, the formula may be directly embedded in this parameter.

The user has its own data processing code snippet, which can be run by a RDP in the LFA to process the raw data collected for this DE. In this case, this parameter may indicate the store location (such URI) of the data processing code snippets.

Quality_Requirements: This is to indicate any quality requirements for this DE. As an example used in the smart city analytics use case, for DE-1 in a single RDS, it is required that the temperature readings need to be collected from at least 100 different temperature sensors deployed in LFA-X in order to guarantee the accuracy.

At step 2, DSCS Agent-1 checks the LFN capability table (as shown in Table 9) and selects the appropriate LFNs (e.g., LFN-1) as the DSDs for DSCR-1. As an example used in the smart city analytics use case, two DEs (e.g., DE-1 and DE-2) may calculate the average temperature and humidity for every three minutes, respectively. Accordingly, for each DE-1 and DE-2, DSCS Agent-1 may select a list of one or more DSDs. In order to do so, the DSCS Agent-1 may need to check the detailed information about the potential DSDs candidates, such as its capability, work schedule, as well as the DSD scope as indicated in Table 9. Multiple DSDs may be needed for identifying DSs needed for DE-1 if the temperature sensors deployed in LFA-X belong to different organizations and each of the selected DSDs also have a certain capability limitations (e.g., each DSD can only conduct DS identification on the specific DSs that belong to the same organization). As another example, LFA-X may cover a very large geographical area. Accordingly, multiple DSDs may be needed and each of them may conduct DS identification for a smaller area in LFA-X. In general, there may be many other cases that need multiple DSDs for conducting DS identification for a given DE, and the methods and systems disclosed herein may be applied to all of those cases.

Overall, DSCS Agent-1 may select a list of DSDs for each DE and assign each of selected DSDs with a detailed DS identification plan, which may include the following information:

What types of DS is to be identified. For example, for a given DE, the "Raw_Data_Type" as introduced in Step 1 indicates what type of DSs are to be identified. It is possible that a given DSD may be used to identify the potential DSs for multiple DEs. In such a case, a given DSD may have multiple DS identification plans, each of them corresponding to a given DE.

What the work scope is for conducting DS identification operations (e.g., within which organization, or within which geographical area, etc.).

Any other requirement on a DS. Per the example used in the smart city analytics use case, DE-1 is to calculate the average temperature for every three minutes. Accordingly, for DE-1, one of the requirements for the potential DSs of DE-1 may be that the temperature sensors (as DSs) should be outdoor temperature sensors, not indoor temperature sensors.

At step 3, for each DE, DSCS Agent-1 sends a request to each of the selected DSDs (e.g., DSCS Agent-2 on LFN-1) for conducting DS identification operation for that DE along with a detailed DS identification plan created for each of those selected DSDs. In other words, for each DE, the DS identification plan for each of the selected DSDs are different so that they can work together to collaboratively accomplish a DS identification task for this DE. If a selected DSD participates in DS identification tasks for multiple DEs, the DSCS Agent-1 may send a single request to this selected DSD in which all the DS identification tasks for different DEs are included.

At step 4, the DSCS Agent on each of the selected DSDs may conduct DS identification according to its respective DS identification plan. For example, DSCS Agent-2 on LFN-1 is responsible for conducting DS identification on DS-1 in order to evaluate whether DS-1 is a desired DS (e.g., to evaluate whether DS-1 is a temperature sensor, and whether it is located outdoors). LFN-1 may need to access DS-1 for conducting DS identification. Taking oneM2M as an example, if a semantic-capable CSE-1 (as a DSD) intends to discover a temperature data source, it can use a semantic discovery mechanism in order to identify a <container-1> resource (as DS-1) that is hosted on CSE-2 and store temperature readings. Additionally or alternatively, the DS-1 may be registered with the CSE-1 (e.g., the <container-1> resource is hosted by CSE-1) and CSE-1 may be acting as a DSD. In such a case, CSE-1 may directly check the registration information of DS-1 for DS identification and may not need to talk to DS-1. The DSCS agent on each of the DSDs may also need to collect further useful information about each identified/candidate DS. The related information may include but is not limited to the following aspects (taking DS-1 as an example):

The data rate of DS-1;
The data unit of DS-1;
The geo-location of DS-1;
The LFNs (i.e., to be as RDC candidates) that have access rights to retrieve raw data from DS-1; and
The availability schedule of DS-1.

At step 5, the DSCS Agent on each of the selected DSDs (e.g., the DSCS Agent-2 on LFN-1) sends back its DS identification result along with the related information about the identified DSs as introduced in step 4.

Figure 21:
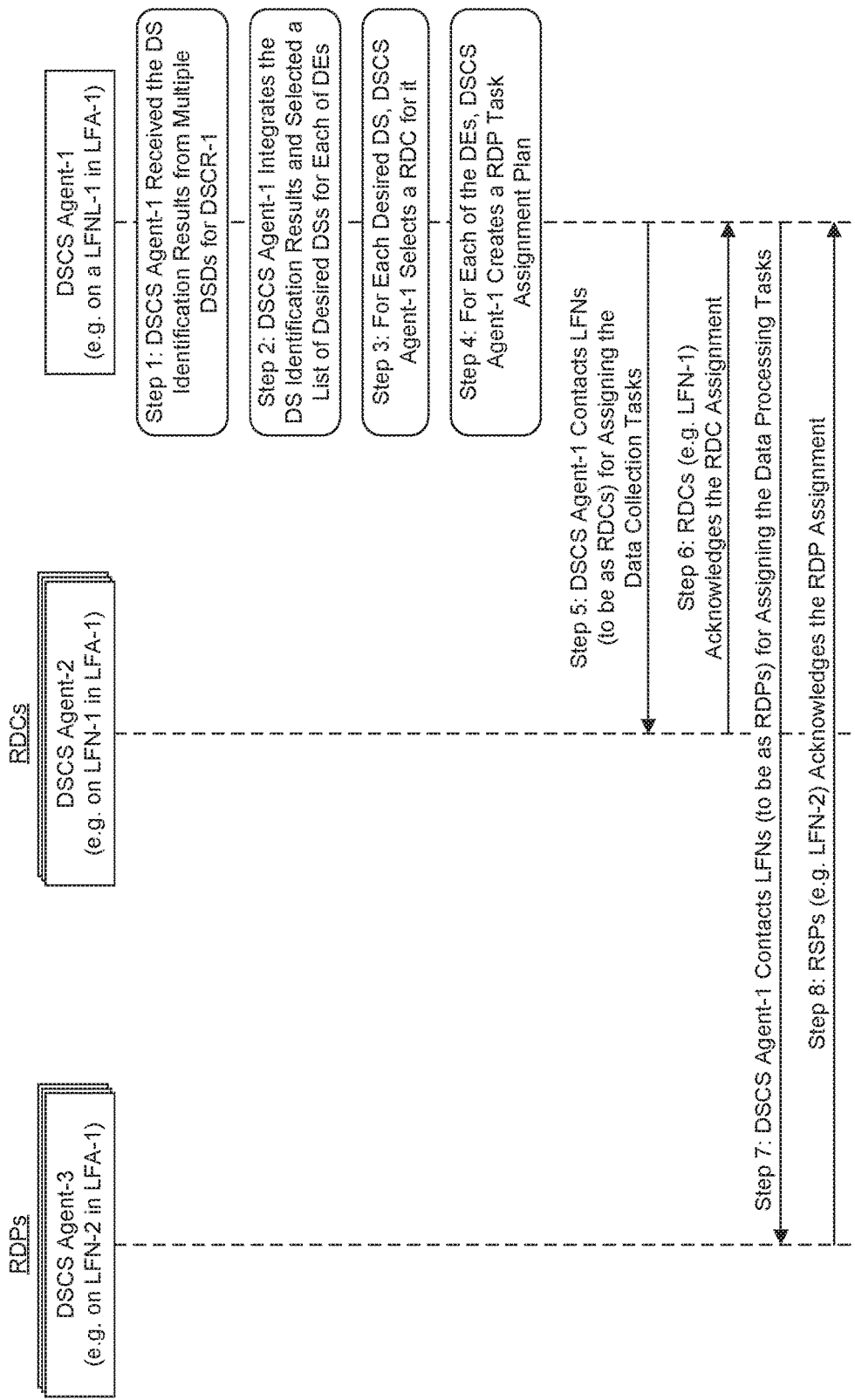
FIG. 21 shows a flow chart of an example method for data source identification result integration.

Stage 2 may comprise DS identification result integration and RDC/RDP task assignment. At stage 2, the major task of the LFNL is to integrate all the DS identification results from the DSDs during stage 1 and determine a list of desired DSs for each of DEs. In other words, the raw data may be collected from those selected DSs. For each of selected DSs, the LFNL may need to assign the appropriate RDC(s) to it based on the related information about this DS as identified during stage 1. The LFNL may also need to assign the appropriate RDPs for each of selected DSs and those RDPs may be responsible for processing the raw data of those selected DSs and producing RDSs. An example procedure for DS identification result integration and RDC/RDP task assignment is shown in FIG. 21 and discussed below.

At step 1, DSCS Agent-1 received the DS identification results from multiple DSDs for DSCR-1 (this is the result of the step 5 of FIG. 20). For example, for each DE in the RDSs of DSCR-1, there could be multiple DSs that have been identified by different DSDs. Accordingly, DSCS Agent-1 may evaluate all the identified DSs for each of DE. Note that all the identified DSs can be recorded by DSCS Agent-1 even if not all of them will be selected as the desired DSs for DSCR-1. The reason is that such DS identification results may be re-used when serving other/future DSCRs. Accordingly, one of the additional improvement for stage 1 is that during step 2 of FIG. 20, before selecting appropriate LFNs as DSDs for a specific DSCR, the DSCS Agent-1 may first check the DS identification result history records and to see if any existing DSs identified for previous DSCRs can be re-utilized for serving this new DSCR. In this way, the overhead of DS identification operations may be reduced.

At step 2, DSCS Agent-1 selects a list of desired DSs for each of the DEs. This step may be performed to choose which DSs the raw data is to be collected from among all the identified DSs for this DE.

For a given DS, the related information to be considered and included may comprise the following, which may have been obtained during the DS identification process (e.g., in the step 4 of FIG. 20):

The data rate of a DS;
The data unit of a DS;
The geo-location of a DS;
The LFNs that have access rights to retrieve raw data from a DS; and
The availability schedule of a DS.

As an example used in the smart city analytics use case, for DE-1 (which is the average temperature every three minutes), it is assumed that 200 temperature sensors (as DS candidates for DE-1) have been identified by multiple DSDs during Stage 1 and those temperatures are distributed over the whole geographical area covered by LFA-X.

Certain information about a DE itself may also need to be considered, which was described in the DSCR-1 as introduced in the step 1 of FIG. 20 (e.g., in the "Quality_Requirements" parameter). Per the example used in the smart city analytics use case, for DE-1, it is required that the temperature readings need to be collected from at least 100 different temperature sensors deployed in LFA-X in order to guarantee the accuracy.

By considering the information about both a given DE and its corresponding identified DSs, DSCS Agent-1 may decide which DSs are the desired DSs from which the raw data is to be collected from. Per the example used in the smart city analytics use case, for DE-1 (which is the average temperature every three minutes), 100 temperature sensors may be selected as desired DSs for DE-1 among the total 200 temperature sensors in LFA-X (as DS candidates).

At step 3, for each desired DS, DSCS Agent-1 further selects a RDC for it. In general, a RDC is needed for each of the selected DS and such a RDC is the one to collect raw data from the DS and send the raw data to the corresponding RDP for processing. To make the proposed solution more general, it is worth noting that RDC and RDP are just logical roles, therefore, it is also possible that a LFN can be a RDC for a given DS as well as a RDP for this DS. Although a RDC may be selected for each of desired DSs, a given LFN can be acting as the RDC for multiple DSs. In other words, a given LFN may be responsible for collecting data from multiple DSs. In the following descriptions for ease of illustration, it is assumed that for a given DS, its RDC and RDP may be taken by different LFNs.

In order to further select a RDC for each desired DS, the following information may need to be evaluated:

The DSCS Agent-1 may need to check the related information about the DS regarding which LFNs that have the access rights to retrieve raw data from this DS (which may have been obtained during stage 1). Such information can be described as either coarse-grained or fine-grained. As an example, a given DS-1 may have a coarse-grained access control information, such as any LFNs that belong to the same organization as DS-1 can retrieve data from DS-1. As another example, it may have another coarse-grained access control information, such as any LFN that is within 200 meters from DS-1 can retrieve data from DS-1. For the fine-grained access control information, an example could be that only the specific LFNs (e.g., LFN-1 and LFN-27) can retrieve data from DS-1. Another example can be a oneM2M example where the ACP rules of a specific <container> resource (as a DS) indicates a list of specific CSEs/AEs (as RDC candidates) that have the "Retrieve" privilege to this resource.

The DSCS Agent-1 may need to check the LFN capability table in order to identify which LFNs can act as and are willing to act as a RDC. It is possible that a given LFN may have a sophisticated DS identification capability but it is not willing to contribute. In such a case, when it registers its capabilities to the corresponding LFNL (as introduced in the LFN capability registration process), it may not indicate that it is willing to act as a RDC. The "Other_Context_Information" parameter describes the general context of a specific LFN, such as its affiliated organization and its geographical location, etc.

The access control information about a specific DS may be compared with the access privilege information related to specific LFNs in order to select an appropriate LFN as a RDC for this DE. Continuing the previous example, for a given LFN-1, if it is affiliated with the same organization as DS-1, then LFN-1 can be selected as the RDC for DS-1 if the access control rule of DS-1 defines that any LFNs belonging to the same organization as DS-1 can retrieve data from DS-1 (e.g., the access control policy of DS-1 is matched with the access privilege of LFN-1). Note that in order to improve the reliability, multiple RDCs can be selected for a given DS such that one RDC can be designated as the master RDC for this DS while others are the secondary/back-up RDCs. As a result, the master RDC is the primary or "master" RDC for collecting raw data from this DS, but it can be replaced by the secondary RDCs if the master RDC is not able to conduct raw data collection.

At step 4, DSCS Agent-1 creates a RDP task assignment plan for each DE. An example workflow for a given DE-1 may be as follows:

For DE-1, DSCS Agent-1 first figures out how many data processing phases are needed between the raw data collected from the DSs of DE-1 to the final form of DE-1 in the RDSs. Per the example used in the smart city analytics use case, DE-1 is the average temperature every three minutes. In other words, in a single RDS, the final form of DE-1 is "the average temperature for LFA-X during a given three minute time interval" while the raw data for DE-1 are the temperature readings collected from multiple temperature sensors during that three minute time interval. Accordingly, this example may have two data processing phases:

Data Processing Phase 1: For one piece of temperature reading, the first processing is to extract the data reading and other useful context information (such as timestamp) from the original raw data collected from a temperature sensor. Other pre-processing may be needed as well. For example, if the final form of DE-1 requires the data to be in Celsius, a unit transformation is needed if the raw data is in Fahrenheit. Accordingly, RDP(s) may be decided for this phase, which is as the first-level RDP node for receiving the raw data collected by RDCs.

Data Processing Phase 2: The raw data collected from all the desired DSs of DE-1 may need to be processed together in order to calculate the average temperature for every three minutes, which is the final form of DE-1 in each of RDSs. Accordingly, the RDP(s) may also be decided for this phase, which is the second-level RDP node for receiving the processed data output by the RDP(s) in the data processing phase 1. Note that there could be further phases after this phase if the data needs to be further processed using more specific data processing operations.

The next step is to select appropriate LFNs for each of the above defined phases. For example, for Phase 1, a certain customized data processing code snippet may be needed for extracting useful data pieces from the raw data. Accordingly, the LFNs as RDP candidates are those LFNs that the customized code or software can be run on. In another example, the LFNs having simple data aggregation capabilities may be needed as the RDPs for Phase 2. The DSCS Agent-1 may further check the LFN capability table in order to identify which LFNs can act as RDPs for each of the above phases. Since the raw data to be collected and/or processed may be in a large amount, multiple LFNs may be needed and selected as RDPs for each of specific data processing phases. Per the example used in the smart city analytics use case, for DE-1 (which is the average temperature every three minute), 100 temperature readings may be collected from 100 desired DSs (e.g., temperature sensors). It is possible that two LFNs are selected as two RDPs for Phase 1. Each RDP may responsible for processing the raw data from half of the DSs (e.g., 50 temperature sensors) during Phase 1. When there are multiple RDPs for a given phase, one RDP can be designated as the master RDP for this phase while others are the secondary/back-up RDPs. As a result, the master RDP is the major RDP for data processing during this phase, but it can be replaced by the secondary RDPs if the master RDP is not able to conduct the required data processing operations. If the master RDP is overloaded, it can also offload its workload to those secondary RDPs. For Phase 2, since it is to calculate the average value of 100 temperature readings (which are the processed 100 temperature readings after Phase 1), the average operation may need to be executed in a single LFN. Accordingly, a powerful LFN may be selected as the RDP for Phase 2.

The last step is to connect or link the selected RDPs in different data processing phases together in order to construct a complete data processing flow plan. When multiple RDPs are selected for the first phase (e.g., the Phase 1 in the smart city analytics use case), the DSCS Agent-1 may need to allocate each of the DSs to a specific RDP in the first phase. In other words, the raw data from a given DS should be sent to its allocated RDP for processing in the first phase. If only one RDP was selected for the first phase (e.g., Phase 1), then the raw data of all the DSs may be sent to this single RDP in the first phase. Since RDCs are responsible for collecting the raw data from desired DSs, for a given DS, its corresponding RDC may need to be informed with such a RDP allocation decision so that the RDCs can know where (e.g., which RDPs) to send the raw data for processing.

Similarly, for the RDPs in the last phase (e.g. the Phase 2 in the smart city analytics use case), the DSCS Agent-1 may also need to decide where the processed data should be sent to after this phase. Per the smart city analytics use case, when an average temperature reading for a specific three minutes is produced during Phase 2, it is still not a complete RDS since this data is just for DE-1. A full RDS may include two DEs (e.g., DE-1 and DE-2). Therefore, the next step may be to generate a complete RDS by assembling the final-form data of DE-1 and DE-2 (which can be done by another RDP called a RDS-Assembling RDP). For the RDPs in two different/adjacent phases, the DSCS Agent-1 may also need to decide which of the processed data by a RDP in Phase i should be sent to which RDP in the next Phase i+1.

Finally, DSCS Agent-1 selects a LFN as a RDS-Assembling RDP, which receives the processed data by the RDPs in the last data processing phase for each of the DEs and assembles the data of different DEs together to construct the RDSs. Taking the smart city use case as an example, for DE-1, the output/processed data of its last data processing phase may be the average temperature for a specific three minute time interval. Such data may be assembled with other data for DE-2 (e.g., the average humidity for the same three minute time interval). The two pieces of data may be assembled together as a complete RDS since according to the RDS definition in this example, each RDS has the format of (DE-1, DE-2, Timestamp).

At step 5, for each of selected LFNs (as RDCs) for a given/desired DS (as determined in Step 3), the DSCS Agent-1 may contact those LFNs for assigning the data collection tasks. For example, when DSCS Agent-1 sends a RDC task assignment request to a specific LFN-1, the following information describes an example raw data collection task for a specific DS (in other words, a RDC task assignment to a specific LFN may include a list of data collection tasks for multiple DSs):

Task ID. This is a specific task ID for this task. When the RDC sends the raw data to a RDP in the first data processing phase, it may need to indicate which task this raw data is related to (and may further indicate that this task is related to which DSCR and which DE);

The ID of DS (e.g., a URL);

Data collection schedule (e.g., when to collect data from this DS). This schedule may be aligned with the RDS_Production_Schedule parameter for DSCR-1; and The ID of the RDP. This indicates where the raw data of DS should be sent to. In other words, the RDC may collect raw data from a DS and send the raw data to the RDP as indicated in this parameter.

It is possible that some LFNs may not be able to accept the task assignment as required by DSCS Agent-1. Accordingly, there could be multiple negotiation processes during this step.

At step 6, DSCS Agent-1 selects LFN-1 as a RDC for a specific DE related to DSCR-1, and DSCS Agent-2 on LFN-1 acknowledges the RDC assignment.

At step 7, for each of the selected LFNs (as RDP) (as determined in step 4), the DSCS Agent-1 may contact those LFNs for assigning the data processing tasks. For example, DSCS Agent-1 may send a RDP task assignment request to a specific LFN-2, which may also include multiple tasks assigned to LFN-2. For example, a given LFN can act as a RDP in different data processing phases for a specific DE. More general, a given LFN can function as a RDP for data processing for different DEs. For example, LFN-2 may act as a RDP for DE-1, during which LFN-2 conducts the required data processing for the Data Processing Phase 1 of DE-1. LFN-2 may also act as a RDP for DE-2, during which LFN-2 conducts the required data processing for the Data Processing Phase 2 of DE-2. The following information may be included in order to describe what the LFN (e.g., LFN-2) needs to do for each of those involved tasks:

Task ID: This is a specific task ID for this task. When the upstream data sender sends the processed data to the downstream data receiver, it may need to indicate which task this processed data is for.

IDs of Upstream Data Sender and related Task ID: This is to indicate who will send processed data to LFN-2 for processing. The data sent from the upstream sender may also be associated with another task ID (which is the ID of the task done by the upstream data sender). For example, if LFN-2 is a RDP for the first data processing phase for DE-1, then the RDCs of DE-1 may be the upstream data senders who will collect the raw data from the desired DSs of DE-1 and send them to LFN-2 for processing. In another example, if LFN-2 is a selected RDP for the second data processing phase for DE-1, then the upstream data senders of LFN-2 may be RDPs in the first data processing phase for DE-1, who send their processed data to LFN-2 for conducting processing for the second phase. It is worth noting that a role of an RDC can also be taken by a LFN that acts as a RDP. For example, it is possible that LFN-2 is a selected as a RDC for collecting raw data for a specific DE-1. LFN-2 may also have data processing capabilities and it is also selected as a RDP for the first data processing phase for DE-1. In this case, LFN-2 is taking a combined role as both a RDC and RDP.

Required_Data_Processing_Operation: This indicates what specific data processing operations are to be conducted. If the customized code needs to be downloaded, this parameter also indicates where to download the data processing code.

IDs of Downstream Data Receiver: This is to indicate where to send the processed data once LFN-2 completes the processing for this specific task. For example, if LFN-2 is the selected RDP for the first data processing phase for DE-1, then the RDPs for the second data processing phase for DE-1 may be the downstream data receivers that conduct the further data processing operations based on the processed data by LFN-2. When LFN-2 sends its processed data to its downstream data receiver, it may also need to associate the processed data with a task ID, which is the ID of the task done by LFN-2 itself (e.g., as defined in the Task ID).

It is also possible that some LFNs may not be able to accept the task assignment as required by DSCS Agent-1. Accordingly, there could be multiple negotiation steps during this process.

In addition, for a given LFN, if it is selected as a RDC as well as a RDP for serving a given DSCR, then the DCCS Agent-1 may only send one message to this LFN for RDC and RDP task assignment. In such a case, the step 5 and step 7 may be combined.

At step 8, DSCS Agent-3 on LFN-2 acknowledges the RDP assignment.

Finally, the DSCS Agent-1 may create a job assignment profile for DSCR-1, which may include all the details about which LFNs are selected as RDCs for each of the DEs or which LFNs are selected as RDPs for data processing operations required for producing RDSs for DSCR-1.

Methods and systems for collaborative RDS production and delivery are disclosed herein. In the example below, a process for starting up a RDS production process in a LFA is disclosed.

For a given DSCR, after the DS identification and RDC/RDP assignment are complete, it may not be necessary to immediately start to produce RDSs for this DSCR. In other words, the RDS production can be started up at a later time (e.g., based on a trigger) or based on a certain schedule (e.g., the information as indicated in the "RDS_Production_Schedule" parameter included in the step 1 of FIG. 21). In general, the RDS production activation may be initiated by the user (e.g., a RDS production trigger may be sent from the CN to the LFAs). For a given DSCR, the LFNL may need to determine, for each DE of the RDSs of this DSCR, which DSs are the desired or selected DSs. Additionally or alternatively, the LFNL may need to determine, for each of desired DS, which LFN is the selected RDC, and/or for each of the DEs, which LFNs are the selected RDPs for processing the data collected from the desired DSs of this DE (all of those task assignments may have been decided during the Stage 1 and Stage 2 of the collaborative DS identification process). The LFNL may then send triggers to each of the involved LFNs, along with the guideline about which specific tasks need to be executed now.

In one example, a data sample collection service may be configured to perform operations comprising: receiving a trigger comprising an indication to initiate production of a data sample associated with a particular data sample collection request; determining at least one local fog node configured to perform raw data collection and at least one local fog node configured to perform raw data processing; sending, to the at least one local fog node configured to perform raw data collection, an indication to initiate raw data collection; receiving, from the at least one local fog node configured to perform raw data collection, an indication that raw data collection has been initiated; sending, to the at least one local fog node configured to perform raw data processing, an indication to initiate raw data processing; and receiving, from the at least one local fog node configured to perform raw data processing, an indication that raw data processing has been initiated.

Each of the indication to initiate raw data collection and the indication to initiate raw data processing may comprise a task identifier. The trigger may be received from a cloud node. Determining at least one local fog node configured to perform raw data collection and at least one local fog node configured to perform raw data processing comprises accessing a job assignment profile stored at the data sample collection service. The at least one local fog node configured to perform raw data collection and the at least one local fog node configured to perform raw data processing may be implemented in the same local fog node. The data sample collection service may be implemented in a local fog node leader.

In another example, a local fog node may be configured to perform operations comprising: receiving, from a data sample collection service, a request to perform at least one of raw data collection and raw data processing operations, wherein the data sample collection service is implemented in a local fog node leader; initiating the at least one of the raw data collection and the raw data processing operations; and sending, to the data sample collection service, an indication that at least one of the raw data collection and raw data processing operations has been initiated.

The request to perform at least one of raw data collection and raw data processing operations may comprise a task identifier. Receiving the request to perform at least one of raw data collection and raw data processing operations may comprise receiving a first request to perform raw data collection, the first request comprising a first task identifier, and receiving a second request to perform raw data processing, the second request comprising a second task identifier. The request to perform at least one of raw data collection and raw data processing operations may be based on a job assignment profile stored at the data sample collection service. The data processing operation may be performed automatically based on at least a partial completion of the data collection operation. The request to perform at least one of raw data collection and raw data processing operations may be based on a schedule stored at the data sample collection service.

Figure 22:
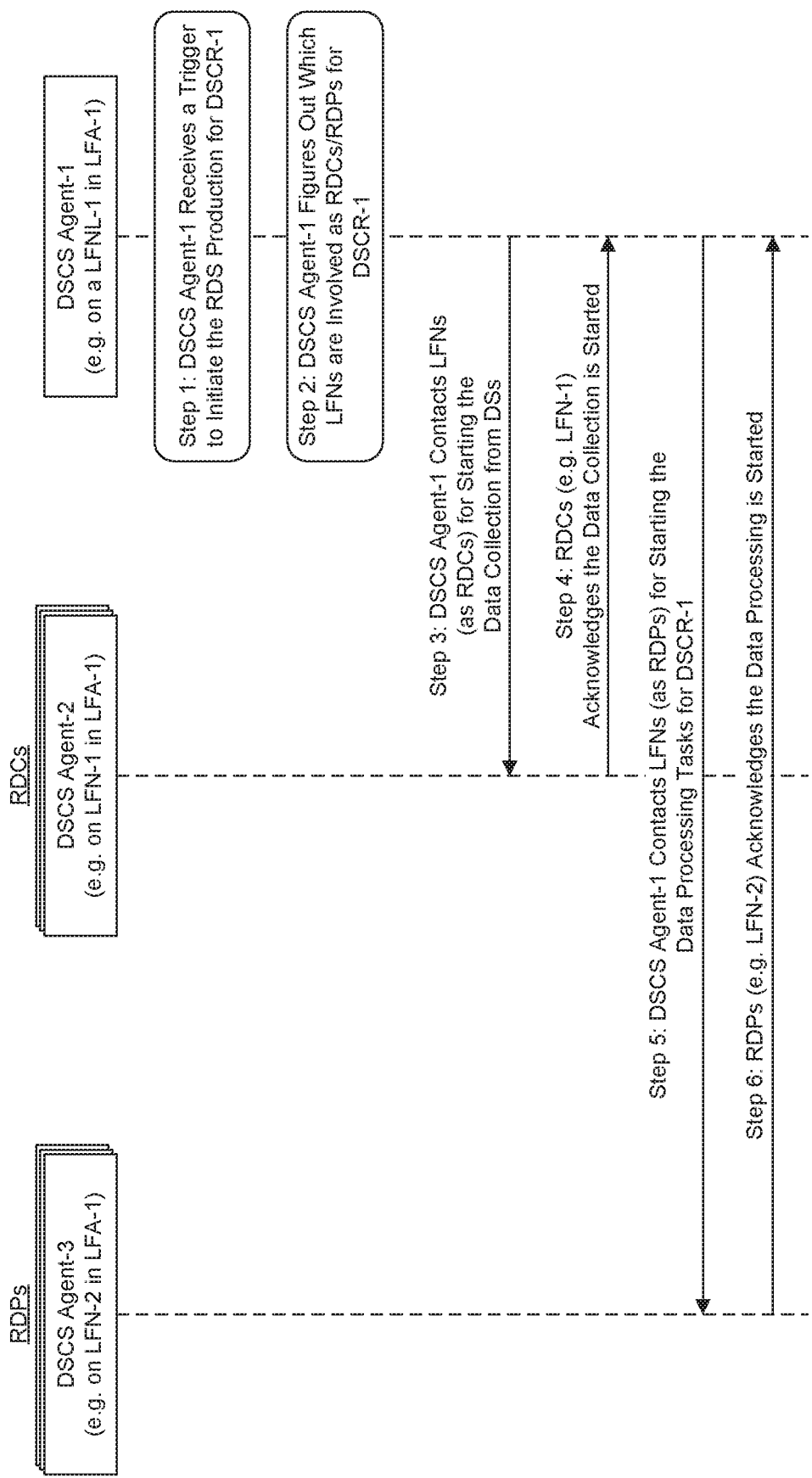
FIG. 22 shows a flow chart of an example method for initiating a ready to use data sample production procedure in local fog areas.

An example procedure for triggering a RDS production in LFAs is shown in FIG. 22 and described below:

At step 1, DSCS Agent-1 receives a trigger to initiate the RDS production for DSCR-1. For example, the user who initiated DSCR-1 may directly activate this DSCR-1 by sending a trigger request to a CN. The CN may further forward this trigger request to the LFNL in LFA-1.

At step 2, DSCS Agent-1 figures out which LFNs are involved as RDCs/RDPs for DSCR-1. In particular, DSCS Agent-1 may check the job assignment profile of DSCR-1 (as created in the end of procedure shown in FIG. 21) which includes all the details about which LFNs are selected as RDCs or RDPs during the RDC/RDP task assignment.

At step 3, DSCS Agent-1 contacts the involved LFNs (which were selected as RDCs for serving DSCR-1) in order to start the data collection from the desired DSs. For each of DEs of the corresponding RDSs of DSCR-1, the DSCS Agent-1 may check which DSs are the desired DSs for each DE. The DSCS Agent-1 may additionally or alternatively check which LFN have been assigned as the RDC for each of the DSs based on the information as included in the job assignment profile of DSCR-1. Note that it may be possible that a given LFN can be a RDC for multiple DSs. Therefore, when DSCS Agent-1 sends an activation trigger to a specific LFN (as RDC), which may also include all the involved task IDs, all of the data collection tasks related to DSCR-1 that were assigned to this LFN may be started.

At step 4, the RDCs (e.g., LFN-1) acknowledge that the data collection is started. For a given LFN (e.g., LFN-1), the RDC may start the raw data collection activities according to the task list as indicated in step 3.

At step 5, DSCS Agent-1 contacts the involved LFNs (which were selected as RDPs for serving DSCR-1) in order to start the data processing tasks as configured during the RDC/RDP task assignment (as described in the job assignment profile which was created in the end of procedure shown in FIG. 21). DSCS Agent-1 may check which LFNs are the assigned RDPs for each of the DEs of DSCR-1 based on the information as included in the job assignment profile of DSCR-1. Note that it is possible that for a given DE, a specific LFN can be a RDP during multiple data processing phases of this DE. A specific LFN may be a RDP for different DEs. Therefore, when DSCS Agent-1 sends an activation trigger to a specific LFN (as RDP), which also includes all the involved task IDs, all the data processing tasks related to DSCR-1 that were assigned to this LFN may be started now.

At step 6, the RDPs (e.g., LFN-2) acknowledge that the data processing for serving DSCR-1 has started (e.g., it is ready to receive data from RDCs for processing). For a given LFN (e.g., LFN-2), the RDP may start the data processing activities according to the task list as indicated in step 5. As an alternative, step 5 and step 6 may be performed before step 3 and/or step 4.

Note that, as an alternative solution, step 5 and/or step 6 may not be needed in the sense that it is only necessary to send triggers to RDCs. The reason is that RDCs may be the ones collecting the data from DSs and know where to send the data for processing. Accordingly, the RDPs can be triggered when receiving data sent from RDCs for the first time. For example, when a RDC is sending the first batch of data to a RDP, the RDC may include a task ID so that the RDP may start its corresponding task to process the received data.

If the RDS production of DSCR-1 is based on a certain schedule as indicated in the "RDS_Production_Schedule" parameter included in the step 1 of FIG. 21, then one or more the involved LFNs that have been selected as RDCs or RDPs for serving DSCR-1 may start to work automatically by following the work schedule.

Figure 23:
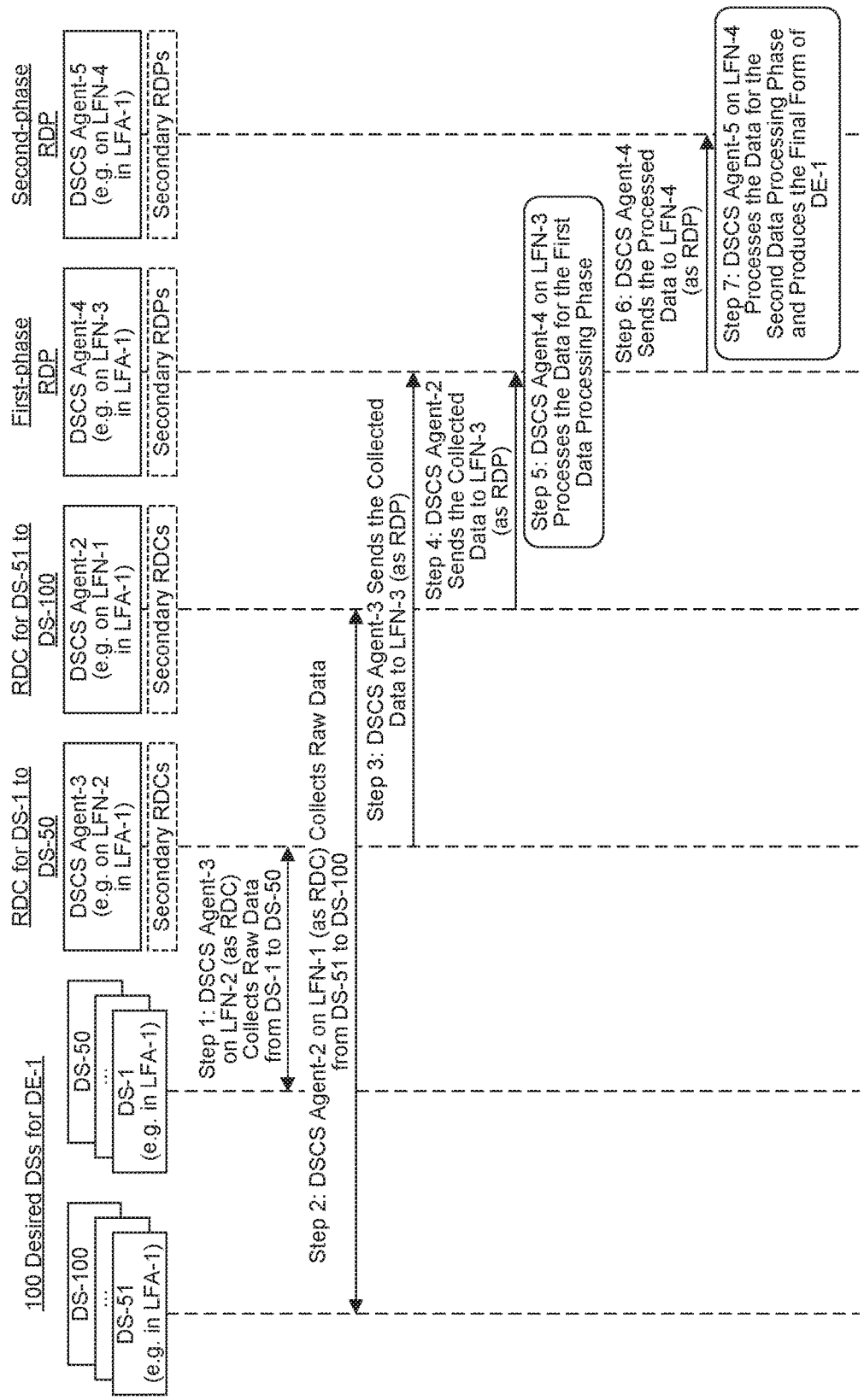
FIG. 23 shows a flow chart of an example method for ready to use data sample production for a given data element.

Once RDS production is started up for a given DSCR, the involved RDCs/RDPs may start to work. An example procedure for a real RDS production for a specific DE is shown in FIG. 23 and described below. The procedure takes the smart city analytics use case as an example, in which DE-1 in a single RDS is the average temperature every three minutes. In particular, 100 temperature sensors have already been identified as the desired DSs for DE-1.

At step 1, it is assumed that according to the RDC task assignment, DSCS Agent-3 on LFN-2 (as RDC) is responsible for collecting raw data from DS-1 to DS-50. DSCS Agent-3 may periodically access DS-1 and DS-50 to see if there is new data being generated. Additionally or alternatively, instead of collecting raw data from desired DSs by conducting retrieval operations, the RDC may make subscriptions on the desired DSs such that those DSs can send their new data to the RDC through notifications.

At step 2, it is assumed that according to the RDC task assignment, DSCS Agent-2 on LFN-1 (as RDC) is responsible for collecting raw data from DS-51 to DS-100.

At step 3, DSCS Agent-3 sends the raw data (collected from DS-1 to DS-50) to LFN-3, which is acting as a RDP for the first data processing stage of DE-1. In particular, when DSCS Agent-3 is sending the first batch of data to LFN-3, it may include a task ID so that LFN-3 will know how to process the received data.

At step 4, similar to DSCS Agent-3 on LFN-2, DSCS Agent-2 sends the raw data (collected from DS-51 to DS-100) to LFN-3, which is acting as a RDP for the first data processing phase of DE-1.

At step 5, DSCS Agent-4 on LFN-3 processes the raw data for the first data processing phase of DE-1. For example, the major data processing operation during the first phase is for one piece consisting of a raw temperature reading. The RDP is to extract the data reading and other useful context information (such as timestamp) from the original raw data. If the final form of DE-1 requires the data to be in Celsius, a unit transformation may be conducted if the raw data is originally in Fahrenheit.

At step 6, once DSCS Agent-4 on LFN-3 completes its data processing for the first data processing phase, it may send the processed data to LFN-4, which is acting as a RDP for the second data processing phase of DE-1. Similarly, when DSCS Agent-4 on LFN-3 is sending its processed data to LFN-4, it may include a task ID so that LFN-4 will know how to process the received data.

At step 7, DSCS Agent-5 on LFN-4 processes the data for the second data processing phase and produces the data for DE-1, which may be in the final form. The data for DE-1 is the average temperature value in a specific three minute time interval, which is the final form of DE-1. Accordingly, the output of LFN-4 may be the average temperature value of LFA-1 for every three minutes, which is calculated based on the processed data sent from the two RDPs in the first data processing phase (e.g., from LFN-2 and LFN-3). After that, DSCS Agent-5 on LFN-4 may send the processed data to the corresponding RDS-Assembling RDP of DSCR-1, which is the last RDP that generates final RDSs for DSCR-1. For a LFN (which either acts as a RDC or a RDP), it may be associated with a number of peer LFNs that are the secondary RDCs or RDPs respectively. Accordingly, if the originally-selected RDC or RDP cannot conduct the required tasks as expected (e.g., either gets overloaded or stop working), the workloads can be offloaded to the corresponding secondary RDCs or RDPs.

The RDCs/RDPs may just be "logical" entities. In particular, in the example shown in FIG. 23, different roles may be taken on by different LFNs for the ease of illustration (which should not limit the generality of the proposed ideas). It is understood that it is possible that a LFN can be both as a RDC and a RDP for conducting the data processing for the first data processing phase. For example, DSCS Agent-3 may both act as a RDC and a first-phase RDP. As a different example configuration, assuming that now DSCS Agent-3 can collect data from all the 100 DSs, it can then collect data from those 100 DSs, directly conduct the AVERAGE operation over the raw data, and send the processed data to DSCS Agent-5 for further processing, which is the second-phase RDP.

Figure 24:
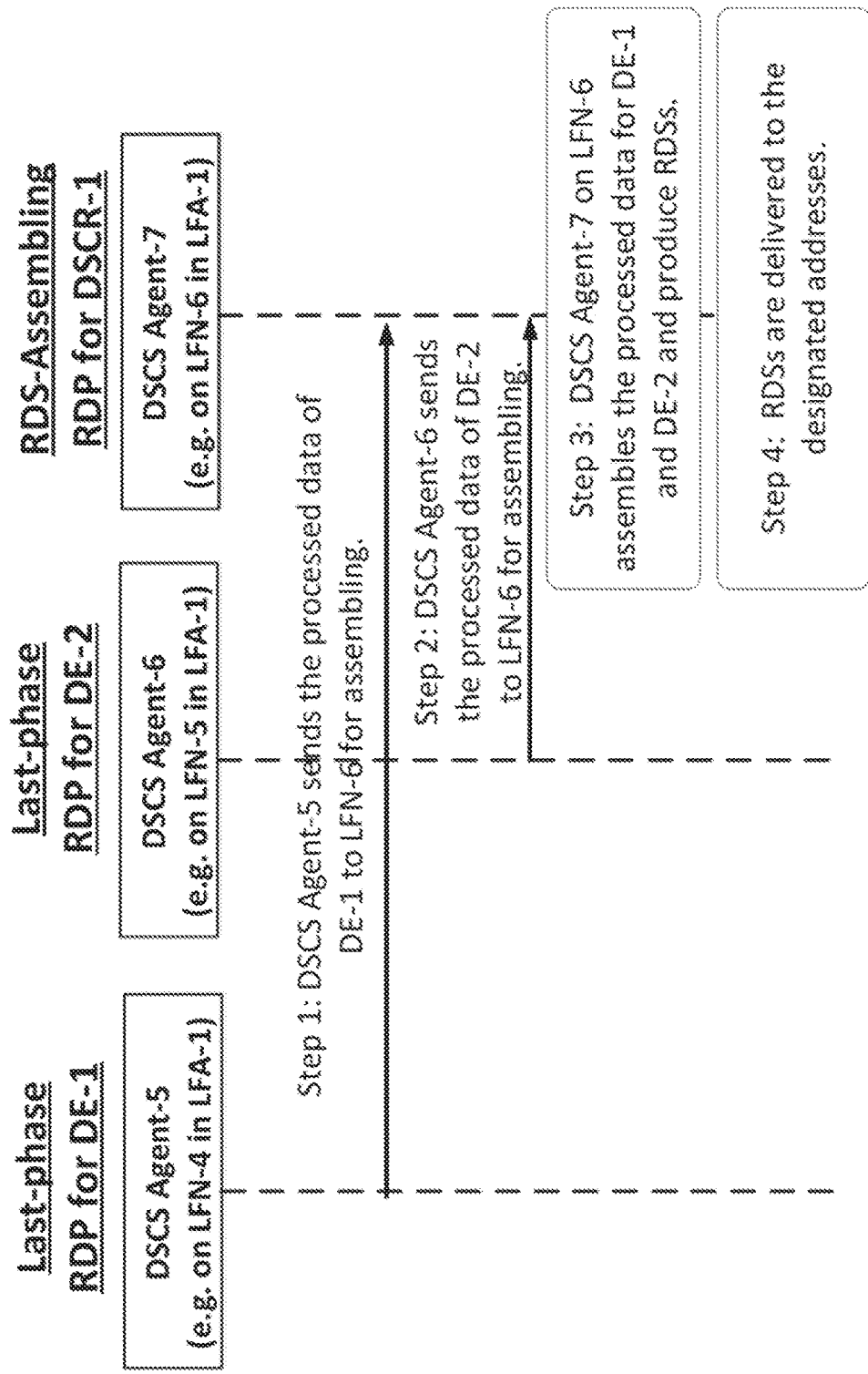
FIG. 24 shows a flow chart of an example method for ready to use data sample production for a given data sample collection request.

Once data is fully processed for a given DE, it may be in its final form and may be ready to be assembled. An example procedure for RDS assembling for a given DSCR is shown in FIG. 24 and is discussed further below. The procedure of FIG. 24 takes the smart city analytics use case as an example, in which DE-1 in a single RDS is the average temperature every three minutes for a given LFA-1, and DE-2 in a single RDS is the average humidity every three minutes for the same given LFA-1. Accordingly, the output of step 7 in FIG. 24 is the final form of DE-1.

At step 1 (continuing from the step 7 of FIG. 24), DSCS Agent-5 on LFN-4 processed the data for the second data processing phase and produced the final-form data for DE-1. DSCS Agent-5 sends the processed data to LFN-6 for assembling. In particular, each of output data of DE-1 from DSCS Agent-5 on LFN-4 may be associated with certain context information which may be used during the later RDS assembling. For a given piece of data of DE-1 produced during the step 7 in FIG. 23, the associated information may indicate that the calculated average temperature corresponds to a specific three minute time internal.

At step 2, it is assumed that DSCS Agent-6 on LFN-5 is the RDP in the last data processing phase of DE-2, which produced the final-form data for DE-2. Here, DE-2 is the average humidity every three minutes. Similarly, each of the final-form data of DE-2 may also be associated with certain context information which may be used during the later RDS assembling. DSCS Agent-6 may send the processed data related to DE-2 to LFN-6 for final RDS assembling.

At step 3, DSCS Agent-7 on LFN-6 assembles the final-form data of DE-1 and DE-2 and produces RDSs for DSCR-1. One piece of data for DE-1 and one piece of data for DE-2 can be assembled together if they are related to the same specific three minute time internal. As a result, a RDS can be generated with the format of (DE-1, DE-2, context_information) which is compliant to the RDS definition as described in the DSCR-1.

At step 4, the produced RDSs are delivered to the designated addresses. Typically, the RDS delivery may have the following options:

Option 1: RDS-Assembling RDP can send a RDS data sample to the user of DSCR-1 one by one;

Option 2: RDS-Assembling RDP can send RDSs in a batch (e.g., every 100 RDS samples);

Option 3: RDS-Assembling RDP can send a RDS data sample at a specific time point as required by the user of DSCR-1; and/or Option 4: RDS-Assembling RDP can store RDSs locally and let the user of DSCR-1 to pull the data back.

The proposed DSCS solution could be regarded as a new CSF in the oneM2M service layer, as shown in FIG. 15. It should be understood that different types of M2M nodes can implement the DSCS service, such as IoT devices, M2M Gateways, M2M Servers, mobile nodes (such as vehicle, cellphone, etc.), etc. In particular, depending on the various/different hardware/software capacities for those nodes, the capacities of the DSCS services implemented by those nodes may also be variant.

The oneM2M embodiments for the related entities defined are as follows:

A Data Source (DS) can be a oneM2M AE or CSE. Accordingly, the raw data generated by an AE or an CSE could be stored in a <container>, <timeSeries> or <flexContainer> resource, which can be identified through a oneM2M resource discovery during the DS identification process;

A Local Fog Node (LFN) can be a oneM2M CSE (e.g., ASN-CSE);

A LFN Leader (LFNL) and a Fog Node (FN) can be a oneM2M CSE (such as MN-CSE);

A Cloud Node (CN) can be a oneM2M CSE (such as IN-CSE); and

A DSCS user can be a oneM2M AE (e.g., an IN-AE) or a CSE.

A new virtual resource called <dscs> is shown in FIG. 16. If a CSE has DSCS capabilities (e.g., a DSCS agent is running on this CSE), it may have <dscs> child resource. All the DSCS related requests can be made towards this resource. For example, a user can send a DSCR creation request to the <dscs> resource hosted on CSE-1. Similarly, when CSE-1 intends to conduct the DS identification for a DSCR-1, it can send DSCR-1 to the <dscs> resource hosted by another CSE-2 in the LFA, which acts as the LFNL and manages and coordinates all the DS identification and RDS production activities to be conducted by LFNs in this LFA. When a CSE (as a LFN) registers its capability to another CSE acting as a LFNL, a <lfnCapability> resource may be created on the CSE acting on the LFNL. This resource may describe all the information about what capabilities a given LFN can provide (e.g., whether could acts as a DSD, RDC and/or RDP). In addition, for all the communications between a LFNL and a LFN (e.g., when the LFNL assigns a RDC or RDP related task to a LFN, or the LFNL sends a trigger to a LFN to start an assigned RDC or RDP related task), the request originator (e.g., the CSE acting as LFNL) can send their requests towards the <dscs> resource of the receiver (e.g., the CSE acting as a LFN, which is managed by the LFNL).

An alternate way to expose DSCS is that a new attribute called "dscs_capability" is defined for the <CSE> resource, which can indicate whether this CSE has the DSCS capability. Accordingly, all the DSCS related requests can be sent towards the <CSEBase> resource.

A new <lfnCapability> resource is proposed to record the capability of a LFN (e.g., when a LFN registers its capabilities to a corresponding LFNL, a <lfnCapability> resource may be created). The resource attributes may correspond to the parameters defined in Table 9.

Normally, when a LFN (e.g., a CSE-1) registers its capability to another CSE-2 acting as a LFNL, a <lfnCapability> resource may be created on the CSE-2 acting on the LFNL. For example, the <lWfCapabilty> resource may act as the child resource of the <CSEBase> resource of the CSE-2. Additionally or alternatively, the <lfnCapability> resource may act as the child resource of the <remoteCSE> resource of the CSE-1 acting as a LFN.

A new attribute called "lfnCapability" can also be defined for the <remoteCSE> resource of the CSE-1 acting as a LFN, which can be used to indicate the LFN capability of CSE-1. The <lfnCapability> resource may contain the child resources specified in Table 10.

TABLE 10

| Child resources of <lfnCapability> resource | | | | |
|---|---|---|---|---|
| Child Resources of <lfnCapability> | Child Resource Type | Multiplicity | Child Description | <lfnCapabilityAnnc> Resource Types |
| [variable] | <subscription> | 0 . . . n | See clause 9.6.8 in oneM2M where the type of this resource is described. | <subscription> |

The <lfnCapability> resource may contain the attributes specified in Table 11.

TABLE 11

Attributes of <lfnCapability> resource

| Attribute Name | Multiplicity | RW/RO/WO | Description | <lfnCapability Annc> Attributes |
|---|---|---|---|---|
| resourceName | 1 | WO | See clause 9.6.1.3 in oneM2M. | NA |
| parentID | 1 | RO | See clause 9.6.1.3 in oneM2M. | NA |
| expirationTime | 1 | RW | See clause 9.6.1.3 in oneM2M. | NA |
| accessControlPolicyIDs | 0 . . . 1 (L) | RW | See clause 9.6.1.3 in oneM2M. | NA |
| labels | 0 . . . 1 (L) | RW | See clause 9.6.1.3 in oneM2M. | MA |
| creationTime | 1 | RO | See clause 9.6.1.3 in oneM2M. | MA |
| lastModifiedTime | 1 | RO | See clause 9.6.1.3 in oneM2M. | MA |
| announceTo | 0 . . . 1 (L) | RW | See clause 9.6.1.3 in oneM2M. | NA |
| announcedAttribute | 0 . . . 1 (L) | RW | See clause 9.6.1.3 in oneM2M. | NA |
| dynamicAuthorization-ConsultationIDs | 0 . . . 1 (L) | RW | See clause 9.6.1.3 in oneM2M. | OA |
| creator | 0 . . . 1 | RO | See clause 9.6.1.3 in oneM2M. | NA |
| LFN_ID | 1 | RW | See the detailed definition in Table 9. | OA |
| DSD_Capability_List | 1 (L) | RW | See the detailed definition in Table 9. | OA |
| DSD_Work_Avaialbility_Schedule_List | 1 | RW | See the detailed definition in Table 9. | OA |
| DSD_Capability_Scope | 0 . . . 1 | RW | See the detailed definition in Table 9. | OA |
| RDC_Capability | 1 | RW | See the detailed definition in Table 9. | OA |
| RDC_Work_Avaialbility_Schedule | 1 | RW | See the detailed definition in Table 9. | OA |
| RDC_Capability_Limitation_Scope | 0 . . . 1 | RW | See the detailed definition in Table 9. | OA |
| RDP_Capability_List | 1 (L) | RW | See the detailed definition in Table 9. | OA |
| RDP_Work_Avaialbility_Schedule_List | 1 (L) | RW | See the detailed definition in Table 9. | OA |
| RDP_Capability_Limitation_Scope | 0 . . . 1 | RW | See the detailed definition in Table 9. | OA |
| Other_Context_Information | 1 (L) | RW | See the detailed definition in Table 9. | OA |

The procedure shown in Table 12 may be used for creating a <lfnCapability> resource.

TABLE 12

| | <lfnCapability> CREATE |
|---|---|
| | <lfnCapability> CREATE |
| Associated Reference Point | Mca, Mcc and Mcc' |
| Information in Request message | All parameters defined in oneM2M table 8.1.2-2 apply with the specific details for: Content: The resource content shall provide the information as defined in <lfnCapability> resource. |
| Processing at Originator before sending Response | According to clause 10.1.2 in oneM2M |
| Processing at Receiver | According to clause 10.1.2 in oneM2M |
| Information in Response message | According to clause 10.1.2 in oneM2M |
| Processing at Originator after receiving Response | According to clause 10.1.2 in oneM2M |
| Exceptions | According to clause 10.1.4 in oneM2M |

The procedure shown in Table 13 may be used for retrieving the attributes of a <lfnCapability> resource.

TABLE 13

| | <lfnCapability> RETRIEVE |
|---|---|
| | <lfnCapability> RETRIEVE |
| Associated Reference Point | Mca, Mcc and Mcc'. |

TABLE 13-continued

| | |
|---|---|
| | <lfnCapability> RETRIEVE |
| | <lfnCapability> RETRIEVE |
| Information in Request message | All parameters defined in table 8.1.2-2 in oneM2M-TS-0001 apply with the specific details for: Content: attributes of the <lfnCapability> resource. |
| Processing at Originator before sending Response | According to clause 10.1.3 in oneM2M |
| Processing at Receiver | According to clause 10.1.3 in oneM2M |
| Information in Response message | All parameters defined in table 8.1.3-1 in oneM2M. |
| Processing at Originator after receiving Response | According to clause 10.1.3 in oneM2M |
| Exceptions | According to clause 10.1.3 in oneM2M |

The procedure shown in Table 14 may be used for updating attributes of a <lfnCapability> resource.

TABLE 14

| | |
|---|---|
| | <lfnCapability> UPDATE |
| | <lfnCapability> UPDATE |
| Associated Reference Point | Mca, Mcc and Mcc' |
| Information in Request message | All parameters defined in table 8.1.2-2 in oneM2M-TS-0001 apply with the specific details for: Content: attributes of the <lfnCapability> resource. |
| Processing at Originator before sending Response | According to clause 10.1.3 in oneM2M |
| Processing at Receiver | According to clause 10.1.4 in oneM2M |
| Information in Response message | According to clause 10.1.4 in oneM2M |
| Processing at Originator after receiving Response | According to clause 10.1.4 in oneM2M |
| Exceptions | According to clause 10.1.4 in oneM2M |

The procedure shown in Table 15 may be used for deleting a <lfnCapability> resource.

TABLE 15

| | |
|---|---|
| | <lfnCapability> DELETE |
| | <lfnCapability> DELETE |
| Associated Reference Point | Mca, Mcc and Mcc' |
| Information in Request message | All parameters defined in table 8.1.2-2 in oneM2M. |
| Processing at Originator before sending Request | According to clause 10.1.5 in oneM2M. |
| Processing at Receiver | According to clause 10.1.5 in oneM2M. |
| Information in Response message | According to clause 10.1.5 in oneM2M. |
| Processing at Originator after receiving Response | According to clause 10.1.5 in oneM2M. |
| Exceptions | According to clause 10.1.5 in oneM2M. |

An example GUI interface is shown in FIG. 25 which can be used for a human user to monitor the DS identification and RDS production process. A user using the interface may specify some general information about which specific LFA they would like to check. In one example, the user may have two ways to use this user interface: First, the user can check LFNs that acts as a specific role (e.g., RDC or RDP). Accordingly, all the LFNs acting as the selected role may be displayed for user to review. Second, the user can directly input an ID of a specific LFN. Accordingly, all the registered capabilities of this LFN (e.g., its RDC capability, DSD capability or RDP capability) may be displayed to the user for review.

Figure 26A:
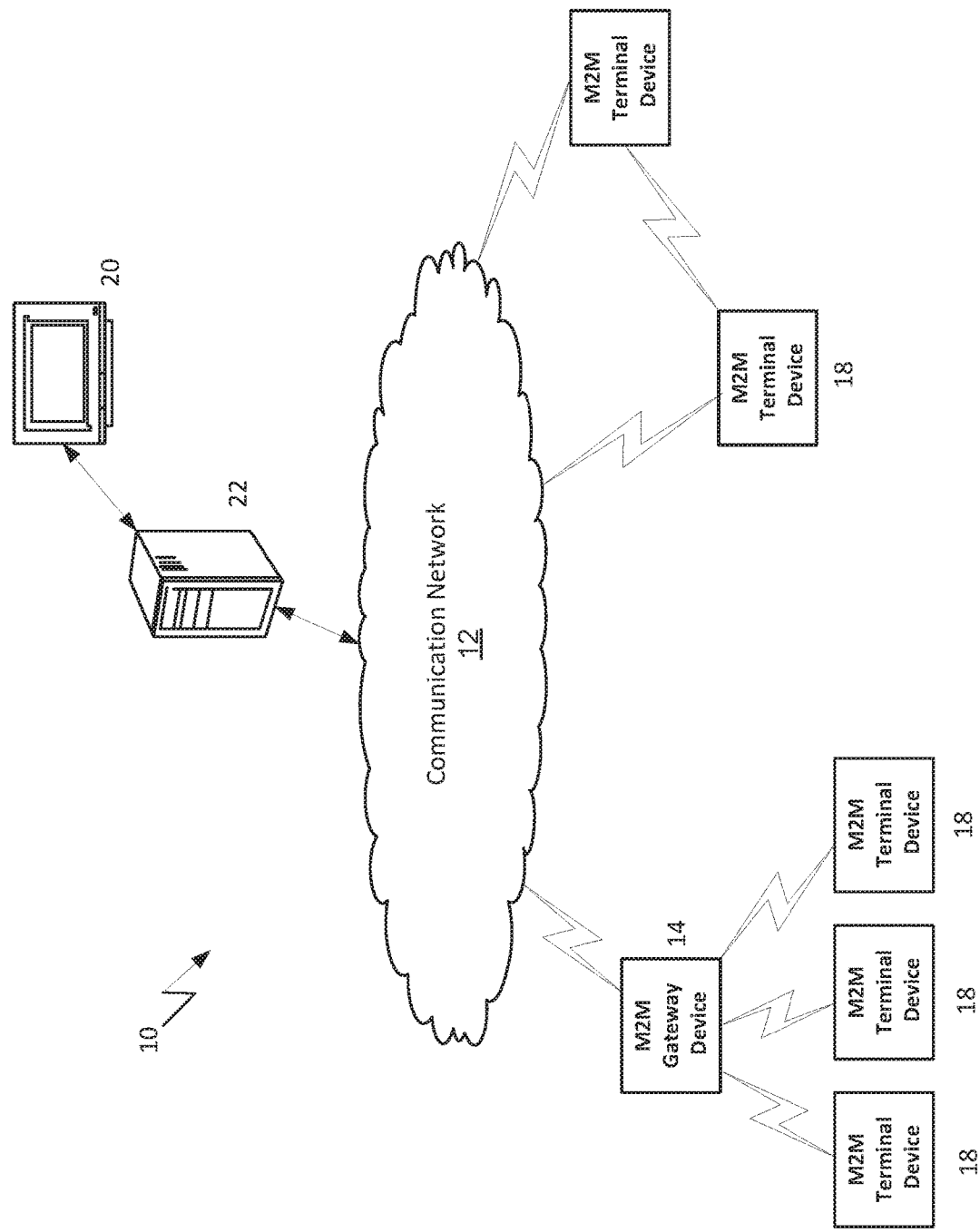
FIG. 26A shows an example system diagram of an example machine-to-machine (M2M) or Internet of Things (IoT) communication system in which one or more disclosed embodiments may be implemented.
Figure 26B:
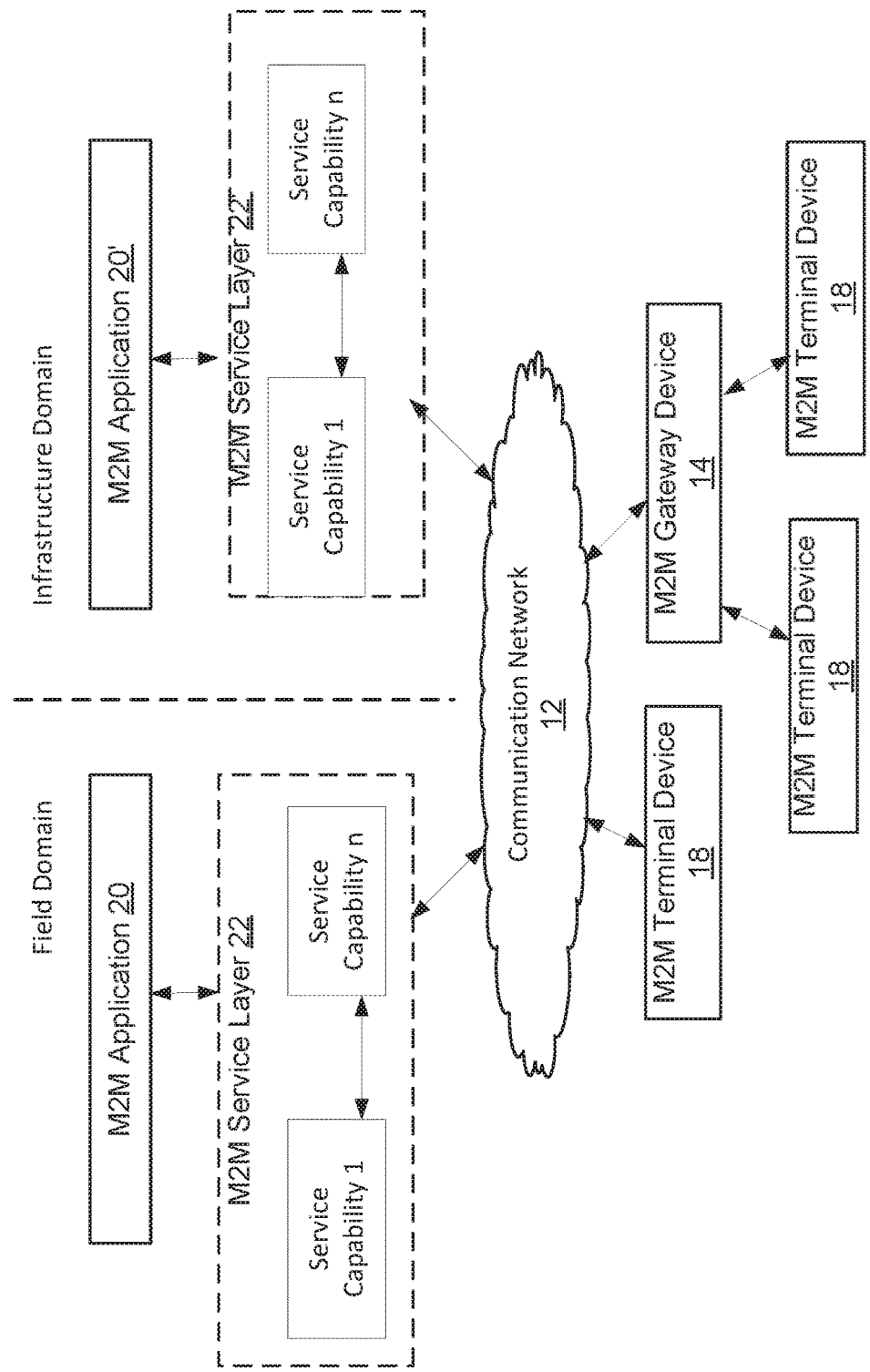
FIG. 26B shows an example system diagram of an example architecture that may be used within the M2M/IoT communications system illustrated in FIG. 26A.
Figure 26C:
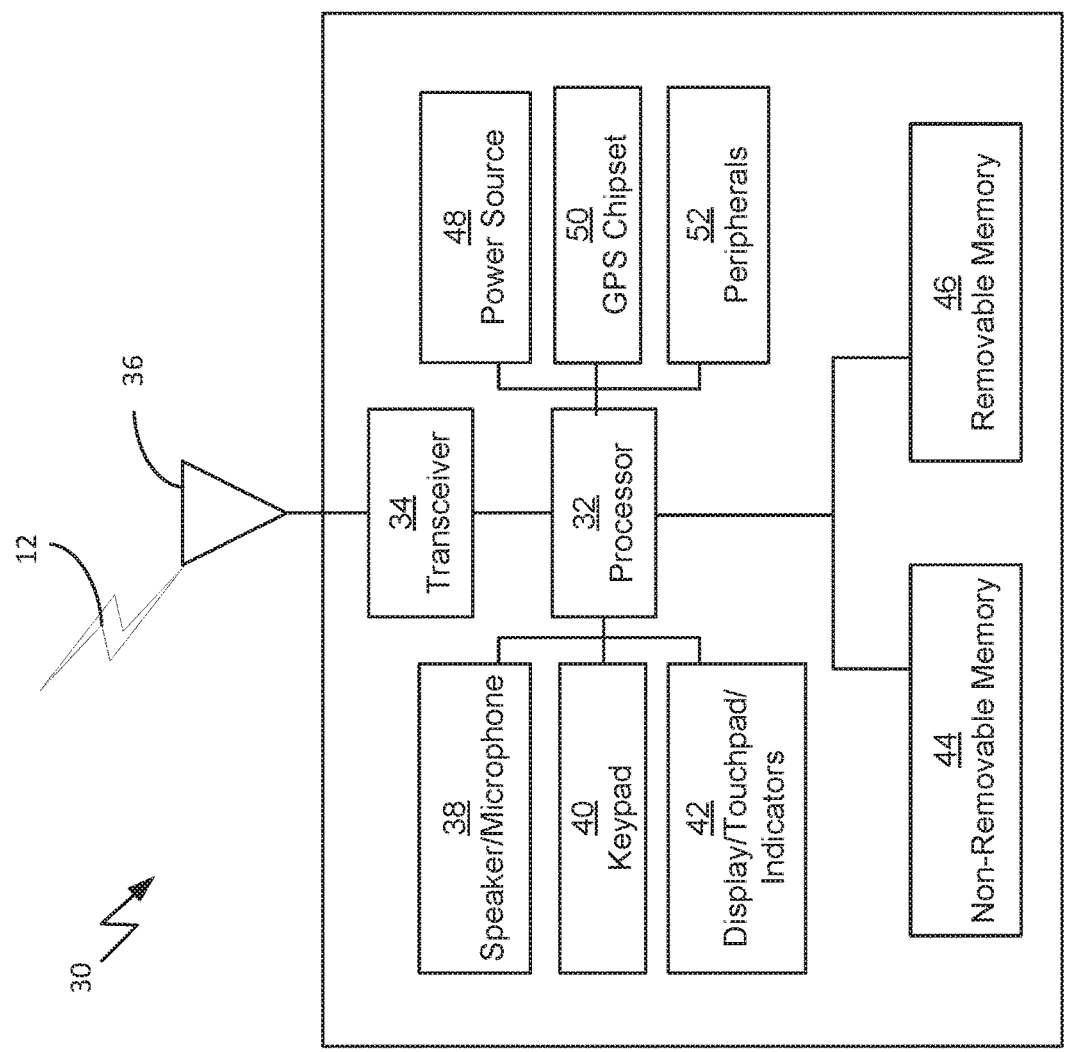
FIG. 26C shows an example system diagram of an example M2M/IoT terminal or gateway device that may be used within the communications system illustrated in FIG. 26A.
Figure 26D:
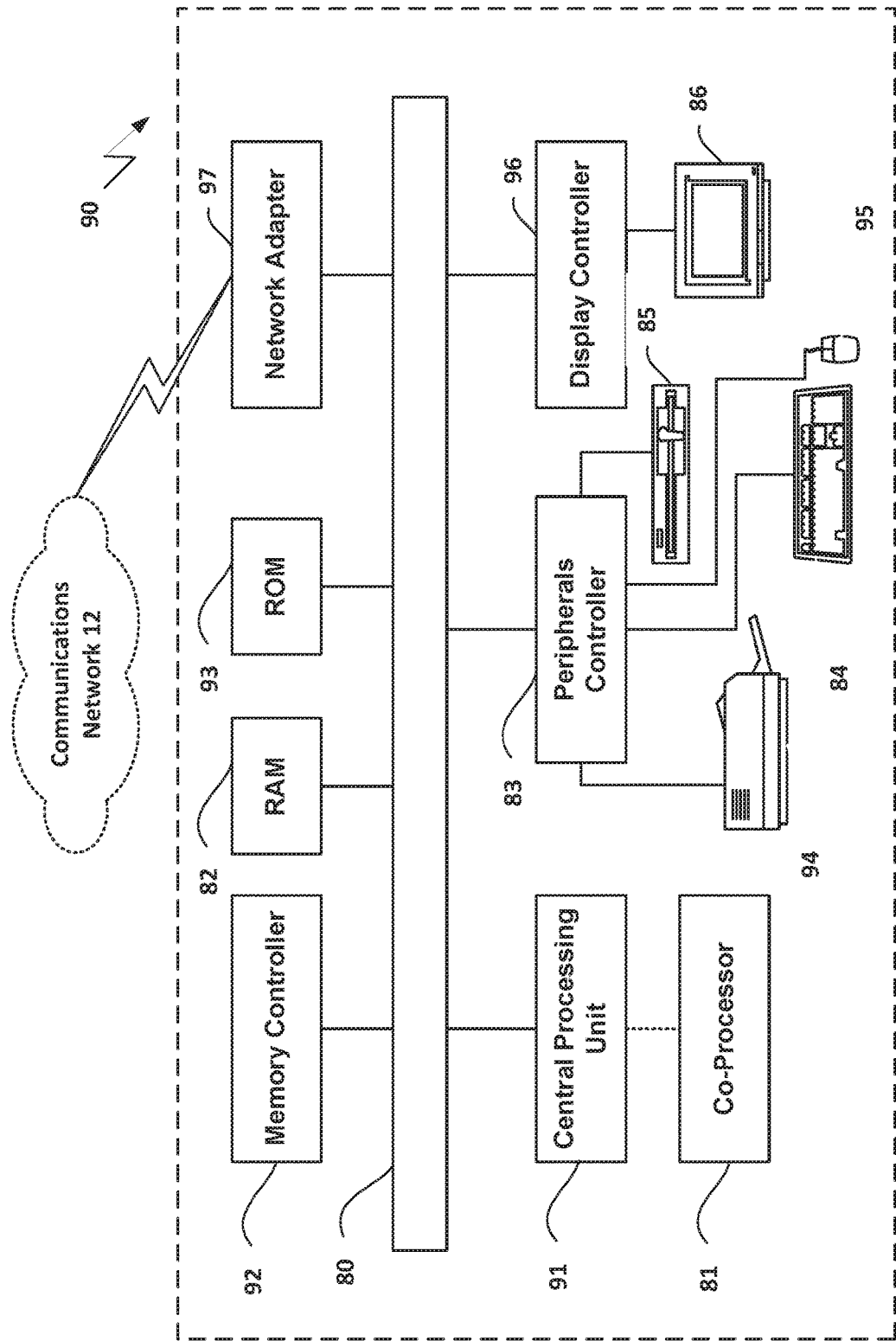
FIG. 26D shows an example block diagram of an example computing system in which aspects of the communication system of FIG. 26A may be embodied.

Any of the entities performing the steps illustrated in FIGS. 1, 4-14 and 18-24 such as the service layer, service layer device, service layer application, application entity, and the like, may be logical entities that may be implemented in the form of software (i.e., computer-executable instructions) stored in a memory of, and executing on a processor of, an apparatus configured for wireless and/or network communications or a computer system such as those illustrated in FIG. 26C or FIG. 26D. That is, the method(s) illustrated in FIGS. 1, 4-14 and 18-24 may be implemented in the form of software (i.e., computer-executable instructions) stored in a memory of an apparatus, such as the apparatus or computer system illustrated in FIG. 26C or FIG. 26D, which computer executable instructions, when executed by a processor of the apparatus, perform the steps illustrated in FIGS. 1, 4-14 and 18-24. It is also understood that any transmitting and receiving steps illustrated in FIGS. 1, 4-14 and 18-24 may be performed by communication circuitry of the apparatus/entity under control of the processor of the apparatus and the computer-executable instructions (e.g., software) that it executes.

FIG. 26A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 1-25 may comprise a network apparatus of a communication system, such as the ones illustrated in FIGS. 26A-26D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 26A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 26A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Example M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 26B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 26B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 26B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 26C or FIG. 26D described below.

Further, the methods and functionalities described herein may be implemented as part of an M2M network that uses a Service Oriented Architecture (SOA) and/or a Resource-Oriented Architecture (ROA) to access services.

From a deployment perspective, a service layer can be deployed on various types of network nodes including servers, gateways and devices as shown in the various figures herein. Any such node, server, gateway, device, apparatus, or other logical entity of a communications network that implements service layer functionality or otherwise incorporates an instance of a service layer may be referred to herein as a service layer entity.

FIG. 26C is a block diagram of an example hardware/software architecture of an apparatus of a network, such as one of the entities illustrated in FIGS. 1-25, which may operate as an M2M server, gateway, device, or other network apparatus in an M2M network such as that illustrated in FIGS. 26A and 26B. As shown in FIG. 26D, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the methods for data sample template (DST) management for enabling fog based data protection, such as the methods and operations illustrated and described in relation to FIGS. 1-25.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 26C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 1-25) and in the claims. While FIG. 26C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 26C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 26D and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

FIG. 26C is a block diagram of an example computing system 90 which may also be used to implement one or more network apparatuses of a network, such as the entities illustrated in FIGS. 1-25 and described herein, which may operate as an M2M server, gateway, device, or other network apparatus in an M2M network such as that illustrated in FIGS. 26A and 26B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 26D and its accompanying description.

Further, computing system 90 may contain communication circuitry, such as for example a network adaptor 97, that may be used to connect computing system 90 to an external communications network, such as network 12 of FIG. 26A-26D, to enable the computing system 90 to communicate with other apparatuses of the network. The communication circuitry, alone or in combination with the CPU 91, may be used to perform the transmitting and receiving steps described herein (e.g., in FIGS. 1-25) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

| Acronym | Term |
| --- | --- |
| ADN | Application Dedicated Node |
| AE | Application Entity |
| ASN | Application Service Node |
| CBD | Central Business District |
| CN | Cloud Node |
| CSE | Common Services Entity |
| CSF | Common Services Function |
| CRUD | CREATE, RETRIEVE, UPDATE, DELETE |
| DE | Data Element |
| DS | Data Source |
| DSCR | Data Sample Collection Request |
| DSCS | Data Sample Collection Service |
| DSD | Data Source Discoverer |
| DST | Data Sample Template |
| FN | Fog Node |
| IN | Infrastructure Node |
| IN-CSE | CSE which resides in the Infrastructure Node |
| IoT | Internet of Things |
| LFA | Local Fog Area |
| LFN | Local Fog Node |
| LFNL | LFN Leader |
| M2M | Machine to Machine |
| MN | Middle Node |
| MN-CSE | CSE which resides in the Middle Node |
| NSE | Network Service Entity |
| PB | Petabyte |
| RDC | Raw Data Collector |
| RDP | Raw Data Processor |
| RDS | Ready-to-use Data Sample |
| SL | Service Layer |

The following is a list of terms and definitions relating to service layer technologies that may appear in the above description. Unless otherwise specified, the terms and definitions used herein refer to the corresponding term listed below:

| Term | Definition |
| --- | --- |
| Cloud Node (CN) | A node with cloud capabilities that manages the operations of other fog nodes lower in the deployment hierarchy. Note that in this disclosure, the term "cloud" may be used to refer to a Cloud Node. Furthermore, the cloud oversees and manages the interactions between different fog nodes that together enable a fog service layer for applications. |
| Data Element (DE) | A DST defines what DEs will be included in a single RDS of this DST (e.g., it describes what its corresponding RDSs look like). In other words, a RDS is a real instance of its corresponding DST. As an example, consider a DST-1 that has the following two DEs: DE-1: The average temperature of LFA-1 in the last 3 minutes. DE-2: The average noise level of LFA-1 in the last 3 minutes. Accordingly, every RDS of DST-1 may have those two DEs (DE-1, DE-2). |
| Data Sample Collection Request (DSCR) | A user of DSCS can just specify his/her needs in a DSCR, which includes all the details about what type of RDSs they intend to receive. |
| Data Sample Collection Service (DSCS) | DSCS is a new service at SLs based on the fog computing paradigm. It is designed to work in a heterogeneous scenario, where various IoT sensors/devices (as raw data sources), IoT nodes (such as LFNs, FNs that can act as data processing nodes), and users may come from different organizations/parties. The users of DSCS can specify their needs for what type of RDSs they intend to receive (in terms of DST), and DSCS may handle everything and produce desired RDSs for users by conducting efficient IoT data collection and processing in the heterogeneous scenario. |
| Data Sample Template (DST) | A user of DSCS can just specify his/her needs in a DST, which includes all the details about what type of RDSs they intend to receive. |
| Local Fog Area (LFA) | A geographic region (e.g., a city) can be divided into multiple LFAs depending on different applications scenarios. For example, in a smart city scenario, a specific residential area can be a LFA, or a Central Business District (CBD) in a downtown area can be a LFA. |

-continued

| Term | Definition |
| --- | --- |
| Local Fog Node (LFN) | A LFN can be a node in a LFA that has compute, storage, communication capability and a LFN can communicate/interact with a LFN Leader (LFNL) in its corresponding LFA. For example, a LFN can be a cellphone of a person, a moving bus, or a home gateway of a house, etc. The LFN is a type of FN that is at the lowest level of the network. A LFN can interact/collaborate with other LFNs in the LFA and can conduct discovering, obtaining and processing data from DSs. |
| Data Source (DS) | Anode can be a DS if it is a source of IoT data. For example, a node may be a sensor, a camera, a traffic light, or any IoT devices that produces data. A road-side unit can also be a DS since it generates sensory data related to road surface. In the meantime, the road-side unit is also a LFN since it can conduct certain data processing capability and/or can communicate with a LFNL. In general, a node in a LFA that not only has sensing, but also has computing, storage and communication capabilities will be as a LFN as well as a DS. |
| Data Source Discoverer (DSD) | This is a logical role. For a given LFN, if it is involved in discovering DSs for a given DSCR during a DS identification process, it is regarded as a DSD for this DSCR. |
| DS Identification Process | Consider a given DSCR, for each of DEs in a RDS corresponding to this DSCR, there could be thousands of potential DSs that need to be discovered/evaluated whether they are the desired DSs for this DSCR. Such a process is called a DS Identification Process. |
| LFN Leader (LFNL) | A given LFA has an LFN leader in that area. A LFNL manages all the LFNs within that LFA and is also connected to FNs that are on a higher level. For example, in the smart city example, a LFNL could be the main gateway of a specific residential area. |
| Fog Node (FN) | A node that has any fog resource such as compute, storage, communication, analytics, etc. A fog node may have at least one of these resources and may also have other software or services that are running on the fog node. A FN is assumed to be deployed at one level higher than the level of a LFNs. There may be several levels of FN deployments with the Cloud Node (CN) being at the highest level. For example, in the smart city example, a FN could be a router at a higher level in the network. |
| Raw Data Collector (RDC) | This is a logical role. For a given LFN, if it is involved in collecting raw data from some DSs for serving a given DSCR, it is regarded as a RDC for this DSCR. |
| Raw Data Processor (RDP) | This is a logical role. For a given LFN, if it is involved in processing the collected raw data for a given DSCR during a RDS production process, it is regarded as a RDP for this DSCR. Note that, in general, a LFN may take multiple logical roles of DSD, RDC, RDP at the same time or those logical roles may be taken by different LFNs when serving a given DSCR. |
| Ready-to-use Data Sample (RDS) | RDSs refer to the data samples that are already in a ready-to-use stage for users (who define/use this DST) to consume (e.g., to draw analytics charts). RDSs are obtained through certain data processing operations over the raw data collected in LFAs. For a given DST, DSCS will conduct efficient IoT raw data collection and processing in order to produce RDSs according to this DST by leveraging Fog Computing paradigm. Using a previous example, for DE-1 in DST-1 (which is the average temperature of LFA-1 in the last 3 minutes), DSCS deployed in LFA-1 may need to collect raw data from the involved temperature sensors in LFA-1, then conduct average aggregation operation over the raw data and finally produce the DE-1 part for every RDSs of DST-1. |
| RDS Production Process | RDS Production Process refers to how to process the raw data collected from desired DSs and produce RDSs. |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method performed at a first agent of a data sample collection service, the method comprising:
    receiving one or more requests to create a data sample template, the one or more requests to create the data sample template comprising information associated with one or more data elements, wherein the one or more requests to create the data sample template comprises an indication of a type of data sample to be created and an indication of a second agent of the data sample collection service associated with the type of data sample, the second agent is located on a local fog node, and a data processing operation is performed by the second agent on the one or more data elements based on the type of data sample;
    creating, based on the information associated with the one or more data elements, the data sample template comprising the indication of the type of data sample to be created and the indication of the second agent on the local fog node;
    sending, to the second agent on the local fog node, the data sample template to identify one or more data sources associated with the one or more data elements; and
    receiving, from the second agent on the local fog node based on the data sample template, data samples associated with the one or more data sources.

2. The method of claim 1, wherein the one or more requests to create the data sample template further comprises an indication of one or more parameters, the one or more parameters comprising:
    a targeted region associated with the data sample;
    a frequency associated with the data sample;
    a production schedule associated with the data sample; and
    a context associated with the data sample.

3. The method of claim 2, further comprising determining, based on the one or more parameters, which of a plurality of local fog nodes to target.

4. The method of claim 1, wherein the information associated with the one or more data elements comprises one or more of:
    a raw data type of the data element;
    a unit of the data element;
    a data processing operation of the data element;
    one or more customized processing details of the data element; and
    one or more quality requirements of the data element.

5. The method of claim 1, wherein the second agent on the local fog node is configured to generate, based on the configured data sample template, a ready to use data sample.

6. An apparatus comprising a processor and a memory, the memory storing computer-executable instructions which, when executed by the processor, cause the apparatus to implement a first agent of a data sample collection service, the first agent of the data sample collection service being configured to perform operations comprising:
    receiving one or more requests to create a data sample template, the one or more requests to create the data sample template comprising information associated with one or more data elements, wherein the one or more requests to create the data sample template comprises an indication of a type of data sample to be created and an indication of a second agent of the data sample collection service associated with the type of data sample, wherein the second agent is located on a local fog node, and a data processing operation is performed by the second agent on the one or more data elements based on the type of data sample;
    creating, based on the information associated with the one or more data elements, the data sample template comprising the indication of the type of data sample to be created and the indication of the second agent on the local fog node;
    sending, to the second agent on the local fog node, the data sample template to identify one or more data sources associated with the one or more data elements; and
    receiving, from the second agent on the local fog node based on the data sample template, data samples associated with the one or more data sources.

7. The apparatus of claim 6, wherein the one or more requests to create the data sample template further comprises an indication of one or more parameters, the one or more parameters comprising:
    a targeted region associated with the data sample;
    a frequency associated with the data sample;
    a production schedule associated with the data sample; and
    a context associated with the data sample.

8. The apparatus of claim 7, wherein the instructions, when executed, further cause the first agent of the data sample collection service to perform operations comprising determining, based on the one or more parameters, which of a plurality of local fog nodes to target.

9. The apparatus of claim 6, wherein the information associated with the one or more data elements comprises one or more of:
    a raw data type of the data element;
    a unit of the data element;
    a data processing operation of the data element;
    one or more customized processing details of the data element; and
    one or more quality requirements of the data element.

10. The apparatus of claim 6, wherein the second agent on the local fog node is configured to generate, based on the configured data sample template, a ready to use data sample.

11. A computer-readable storage medium storing instructions which, when executed by a processor, cause a first agent of a data sample collection service to perform operations comprising:
    receiving a request to create a data sample template, the one or more requests to create the data sample template comprising information associated with one or more data elements, wherein the one or more requests to create the data sample template comprises an indication of a type of data sample to be created and an indication of a second agent of the data sample collection service associated with the type of data sample, wherein the second agent is located on a local fog node, and a data processing operation is performed by the second agent on the one or more data elements based on the type of data sample;

creating, based on the information associated with the one or more data elements, the data sample template comprising the indication of the type of data sample to be created and the indication of the second agent on the local fog node;

sending, to the second agent on the local fog node, the data sample template to identify one or more data sources associated with the one or more data elements;

receiving, from the second agent on the local fog node based on the data sample template data samples associated with the one or more data sources.

12. The computer-readable storage medium of claim 11, wherein the one or more requests to create the data sample template further comprises an indication of one or more parameters, the one or more parameters comprising:

a targeted region associated with the data sample;
a frequency associated with the data sample;
a production schedule associated with the data sample; and
a context associated with the data sample.

13. The computer-readable storage medium of claim 12, wherein the instructions, when executed, further cause the first agent of the data sample collection service to perform operations comprising determining, based on the one or more parameters, which of a plurality of local fog nodes to target.

14. The computer-readable storage medium of claim 11, wherein the information associated with the one or more data elements comprises one or more of:

a raw data type of the data element;
a unit of the data element;
a data processing operation of the data element;
one or more customized processing details of the data element; and
one or more quality requirements of the data element.

* * * * *